(12) United States Patent
Yasui

(10) Patent No.: US 12,179,755 B2
(45) Date of Patent: Dec. 31, 2024

(54) TRAJECTORY GENERATION DEVICE AND TRAJECTORY GENERATION METHOD

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 359 days.

(21) Appl. No.: 17/705,290

(22) Filed: Mar. 26, 2022

(65) Prior Publication Data
US 2022/0314981 A1    Oct. 6, 2022

(30) Foreign Application Priority Data

Mar. 29, 2021    (JP) .................................. 2021-056089

(51) Int. Cl.
*B60W 30/095*    (2012.01)
*B60W 50/00*    (2006.01)
*G05B 17/02*    (2006.01)

(52) U.S. Cl.
CPC .... *B60W 30/0956* (2013.01); *B60W 50/0097* (2013.01); *G05B 17/02* (2013.01); *B60W 2050/0028* (2013.01)

(58) Field of Classification Search
CPC ......... B60W 30/0956; B60W 50/0097; B60W 2050/0028; B60W 2554/4029; B60W 60/0027; B60W 60/00276; B60W 60/0011; G05B 17/02; G06F 30/20; G08G 1/166; G08G 1/0125; G08G 1/096805
See application file for complete search history.

(56) References Cited

U.S. PATENT DOCUMENTS

| 10,875,545 B2 * | 12/2020 | Iwamoto | B60W 40/09 |
| 11,004,000 B1 * | 5/2021 | Gutmann | B60W 30/0956 |
| 2013/0314503 A1 * | 11/2013 | Nix | G06V 20/58 |
| | | | 348/46 |

(Continued)

FOREIGN PATENT DOCUMENTS

| EP | 2994358 B1 * | 12/2017 | ......... B60K 31/0008 |
| JP | 2019-220054 A | 12/2019 | |

OTHER PUBLICATIONS

Ylanan, N., "How to properly turn at multi-lane intersections" from Autodeal.com via Wayback machine. Published Jun. 11, 2019. https://web.archive.org/web/20210227150745/https://www.autodeal.com.ph/articles/car-features/how-properly-turn-multi-lane-intersections (Year: 2019).*

(Continued)

*Primary Examiner* — Calvin Cheung
(74) *Attorney, Agent, or Firm* — WHDA, LLP

(57) ABSTRACT

A trajectory generation device 1 determines first to third predicted trajectories by using model formulas (1) to (20) that model a trajectory of a host vehicle 3 on the basis of peripheral information of an information detection device 4, calculates a risk potential $R\_p\_mi\_vj\_v\_r$ by using the first to third predicted trajectories, and determines moving average values $P\_c1$ to $P\_c3$ so that the risk potential $R\_p\_mi\_vj\_v\_r$ decreases. In a case where the moving average values $P\_c1$ and $P\_c2$ have the same sign, the first predicted trajectory is determined while reflecting the moving average value $P\_c2$ for correcting the second predicted trajectory.

18 Claims, 38 Drawing Sheets

(56) References Cited

U.S. PATENT DOCUMENTS

| | | | |
|---|---|---|---|
| 2015/0166062 A1* | 6/2015 | Johnson | G08G 1/167 |
| | | | 701/41 |
| 2019/0220021 A1* | 7/2019 | Yasui | G01C 21/14 |
| 2020/0089238 A1* | 3/2020 | McGill, Jr. | G05D 1/0257 |

OTHER PUBLICATIONS

DE 112020005298 T5 with English translation. Date filed Dec. 4, 2020; Date published Oct. 27, 2022. (Year: 2022).*

Wu, R.; Zheng, X.; Xu, Y.; Wu, W.; Li, G.; Xu, Q.; Nie, Z. Modified Driving Safety Field Based on Trajectory Prediction Model for Pedestrian-Vehicle Collision. Sustainability 2019, 11, 6254. https://doi.org/10.3390/su11226254 (Year: 2019).*

* cited by examiner

WHEN $P\_c2 \geq 0$ & $P\_c3 \geq 0$

WHEN $P\_c2 < 0$ & $P\_c3 < 0$

FIG.25

| PATTERN | P_c1 | P_c2 | P_c3 | P_c2·K_bp_21 | P_c3·K_bp_31 | CALCULATION VALUE OF P_m1 |
|---|---|---|---|---|---|---|
| A1 | 0<P_c1 | POSITIVE | POSITIVE | P_c2 | P_c3 | REFLECT P_c2, P_c3 |
| A2 | P_c1<0 | NEGATIVE | NEGATIVE | P_c2 | P_c3 | REFLECT P_c2, P_c3 |
| A3 | 0≦P_c1≦Pref2 | NEGATIVE | NEGATIVE | ABSOLUTE VALUE LESS THAN OR EQUAL TO P_c2 | ABSOLUTE VALUE LESS THAN OR EQUAL TO P_c3 | REFLECT P_c2, P_c3 WITH REDUCED DEGREE OF REFLECTION |
| A4 | -Pref1≦P_c1≦0 | POSITIVE | POSITIVE | ABSOLUTE VALUE LESS THAN OR EQUAL TO P_c2 | ABSOLUTE VALUE LESS THAN OR EQUAL TO P_c3 | REFLECT P_c2, P_c3 WITH REDUCED DEGREE OF REFLECTION |
| A5 | Pref2<P_c1 | NEGATIVE | NEGATIVE | 0 | 0 | NO REFLECTION OF P_c2, P_c3 |
| A6 | P_c1<-Pref1 | POSITIVE | POSITIVE | 0 | 0 | NO REFLECTION OF P_c2, P_c3 |
| A7 | 0<P_c1 | POSITIVE | NEGATIVE | P_c2 | 0 | REFLECT ONLY P_c2 |
| A8 | P_c1<0 | NEGATIVE | POSITIVE | P_c2 | 0 | REFLECT ONLY P_c2 |
| A9 | Pref2<P_c1 | NEGATIVE | POSITIVE | 0 | 0 | NO REFLECTION OF P_c2, P_c3 |
| A10 | P_c1<-Pref1 | POSITIVE | NEGATIVE | 0 | 0 | NO REFLECTION OF P_c2, P_c3 |
| A11 | 0≦P_c1≦Pref2 | NEGATIVE | POSITIVE | ABSOLUTE VALUE LESS THAN OR EQUAL TO P_c2 | 0 | REFLECT ONLY P_c2 WITH REDUCED DEGREE OF REFLECTION |
| A12 | -Pref1≦P_c1≦0 | POSITIVE | NEGATIVE | ABSOLUTE VALUE LESS THAN OR EQUAL TO P_c2 | 0 | REFLECT ONLY P_c2 WITH REDUCED DEGREE OF REFLECTION |

FIG. 26

| PATTERN | P_c2 | P_c3 | P_c3·K_bp_32 | CALCULATION VALUE OF ρ_m2 |
|---|---|---|---|---|
| B1 | POSITIVE | POSITIVE | P_c3 | REFLECT P_c3 |
| B2 | NEGATIVE | NEGATIVE | P_c3 | REFLECT P_c3 |
| B3 | $0 \leq P\_c2 \leq Pref4$ | NEGATIVE | ABSOLUTE VALUE LESS THAN OR EQUAL TO P_c3 | REFLECT P_c3 WITH REDUCED DEGREE OF REFLECTION |
| B4 | $-Pref3 \leq P\_c2 \leq 0$ | POSITIVE | ABSOLUTE VALUE LESS THAN OR EQUAL TO P_c3 | REFLECT P_c3 WITH REDUCED DEGREE OF REFLECTION |
| B5 | $Pref4 < P\_c2$ | NEGATIVE | 0 | NO REFLECTION OF P_c3 |
| B6 | $P\_c2 < -Pref3$ | POSITIVE | 0 | NO REFLECTION OF P_c3 |

WHEN $P2\_c2 \geq 0$ & $P2\_c3 \geq 0$

WHEN $P2\_c2 < 0$ & $P2\_c3 < 0$

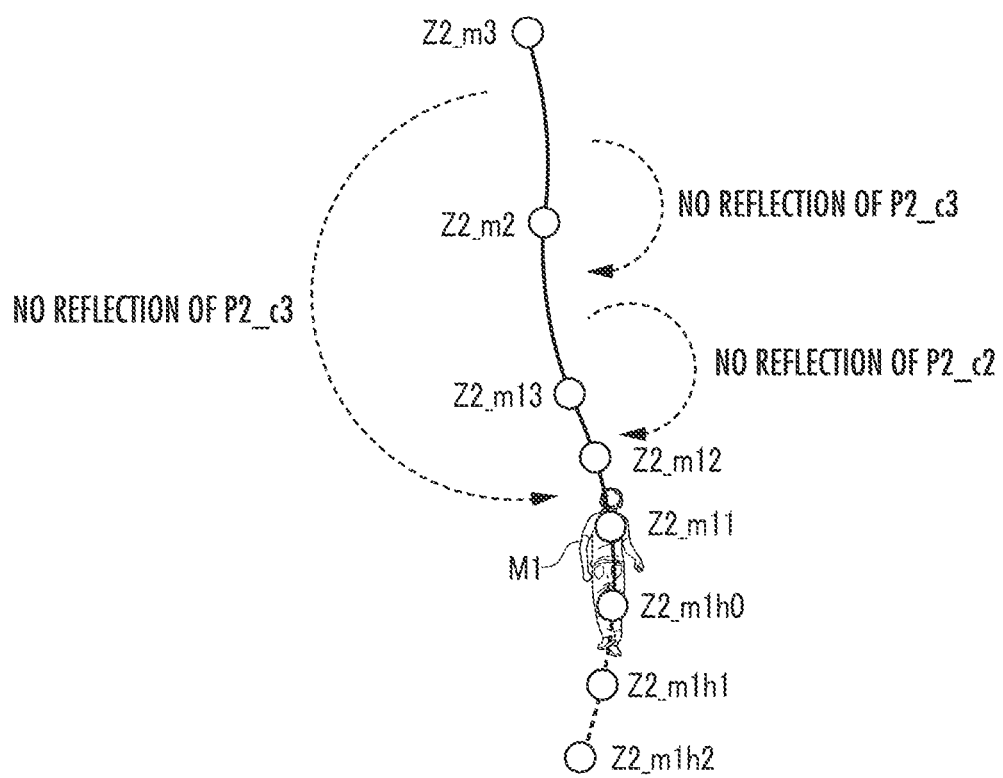

FIG. 50

| PATTERN | P2_c1 | P2_c2 | P2_c3 | P2_c2·K2_bp_21 | P2_c3·K2_bp_31 | CALCULATION VALUE OF P2_m1 |
|---|---|---|---|---|---|---|
| C1 | 0<P2_c1 | POSITIVE | POSITIVE | P2_c2 | P2_c3 | REFLECT P2_c2, P2_c3 |
| C2 | P2_c1<0 | NEGATIVE | NEGATIVE | P2_c2 | P2_c3 | REFLECT P2_c2, P2_c3 |
| C3 | 0≦P2_c1≦Pref6 | NEGATIVE | NEGATIVE | ABSOLUTE VALUE LESS THAN OR EQUAL TO P2_c2 | ABSOLUTE VALUE LESS THAN OR EQUAL TO P2_c3 | REFLECT P2_c2, P2_c3 WITH REDUCED DEGREE OF REFLECTION |
| C4 | −Pref5≦P2_c1≦0 | POSITIVE | POSITIVE | ABSOLUTE VALUE LESS THAN OR EQUAL TO P2_c2 | ABSOLUTE VALUE LESS THAN OR EQUAL TO P2_c3 | REFLECT P2_c2, P2_c3 WITH REDUCED DEGREE OF REFLECTION |
| C5 | Pref6<P2_c1 | NEGATIVE | NEGATIVE | 0 | 0 | NO REFLECTION OF P2_c2, P2_c3 |
| C6 | P2_c1<−Pref5 | POSITIVE | POSITIVE | 0 | 0 | NO REFLECTION OF P2_c2, P2_c3 |
| C7 | 0<P2_c1 | POSITIVE | NEGATIVE | P2_c2 | 0 | REFLECT ONLY P2_c2 |
| C8 | P2_c1<0 | NEGATIVE | POSITIVE | P2_c2 | 0 | REFLECT ONLY P2_c2 |
| C9 | Pref6<P2_c1 | NEGATIVE | POSITIVE | 0 | 0 | NO REFLECTION OF P2_c2, P2_c3 |
| C10 | P2_c1<−Pref5 | POSITIVE | NEGATIVE | 0 | 0 | NO REFLECTION OF P2_c2, P2_c3 |
| C11 | 0≦P2_c1≦Pref6 | NEGATIVE | POSITIVE | ABSOLUTE VALUE LESS THAN OR EQUAL TO P2_c2 | 0 | REFLECT ONLY P2_c2 WITH REDUCED DEGREE OF REFLECTION |
| C12 | −Pref5≦P2_c1≦0 | POSITIVE | NEGATIVE | ABSOLUTE VALUE LESS THAN OR EQUAL TO P2_c2 | 0 | REFLECT ONLY P2_c2 WITH REDUCED DEGREE OF REFLECTION |

FIG.51

| PATTERN | P2_c2 | P2_c3 | P2_c3·K2_bp_32 | CALCULATION VALUE OF ρ2_m2 |
|---|---|---|---|---|
| D1 | POSITIVE | POSITIVE | P2_c3 | REFLECT P2_c3 |
| D2 | NEGATIVE | NEGATIVE | P2_c3 | REFLECT P2_c3 |
| D3 | 0≦P2_c2≦Pref8 | NEGATIVE | ABSOLUTE VALUE LESS THAN OR EQUAL TO P2_c3 | REFLECT P2_c3 WITH REDUCED DEGREE OF REFLECTION |
| D4 | -Pref7≦P2_c2≦0 | POSITIVE | ABSOLUTE VALUE LESS THAN OR EQUAL TO P2_c3 | REFLECT P2_c3 WITH REDUCED DEGREE OF REFLECTION |
| D5 | Pref8<P2_c2 | NEGATIVE | 0 | NO REFLECTION OF P2_c3 |
| D6 | P2_c2<-Pref7 | POSITIVE | 0 | NO REFLECTION OF P2_c3 |

TRAJECTORY GENERATION DEVICE AND TRAJECTORY GENERATION METHOD

BACKGROUND

Technical Field

The present invention relates to a trajectory generation device that generates a future trajectory of a mobile body.

Related Art

Conventionally, a trajectory generation device described in JP 2019-220054 A is known. This trajectory generation device generates a trajectory of a mobile body so that the mobile body can avoid interference with an interference object, using a model formula obtained by modeling the trajectory of the mobile body as an arc. In this trajectory generation device, an evaluation function is calculated on the basis of the model formula, and a curvature of the arc is determined by an extreme value search controller so that the evaluation function has an extreme value. Then, a future trajectory of the mobile body is generated on the basis of the curvature.

SUMMARY

Under a normal traffic environment, when the mobile body avoids interference with the interference object, the trajectory of the mobile body is not limited to a trajectory that bends only in the left direction or the right direction, and may be, for example, a trajectory that bends in the left direction and then turns in the right direction (see FIG. 24 described later). According to the trajectory generation device of JP 2019-220054 A, it is necessary to use a plurality of extreme value search controllers in the case of trying to generate such a trajectory.

In the case of using the plurality of extreme value search controllers as described above, when one evaluation function is shared in the extreme value search controllers, it is necessary to set frequencies of reference inputs in the respective extreme value search controllers to values that do not interfere with each other. In that case, the number of taps of a moving average filter in each extreme value search controller increases, and a response delay occurs accordingly. In this case, there is a possibility that a time margin for the mobile body to avoid interference with the interference object decreases.

To avoid this, in a case where evaluation functions different from each other are used in the plurality of extreme value search controllers, a problem occurs as described below. That is, in a case where the future trajectory of the mobile body is generated by each extreme value search controller, there is a possibility that a trajectory is generated in which interference with the interference object is avoided at a position where the mobile body is considerably close to the interference object (see FIG. 22 described later). In that case, there is a possibility that a spatial margin for the mobile body to avoid interference with the interference object decreases. Since restriction on a feasible trajectory is generally large especially in a case where the mobile body is a vehicle, this problem becomes remarkable.

The present invention has been made to solve the above problem, and an object of the present invention is to provide a trajectory generation device and the like capable of appropriately generating a future trajectory of a mobile body so that interference with an interference object can be avoided.

To achieve the above object, the present invention is a trajectory generation device that generates a future trajectory of a mobile body, the trajectory generation device including: a surrounding situation recognizer that recognizes a surrounding situation of the mobile body; a predicted trajectory generator that generates a plurality of predicted trajectories that are predicted values of a plurality of the future trajectories when the future trajectory of the mobile body is divided into a plurality of trajectories, by using a plurality of trajectory models that models a trajectory of the mobile body, on the basis of a result of recognition of the surrounding situation by the surrounding situation recognizer; an interference degree parameter calculator that calculates a plurality of interference degree parameters representing a degree of interference of an interference object around the mobile body with the mobile body by using the plurality of predicted trajectories; and a correction amount determiner that determines a plurality of amounts of correction for respectively correcting the plurality of predicted trajectories to cause the degree of interference represented by the plurality of interference degree parameters to be decreased, in which the predicted trajectory generator generates the plurality of predicted trajectories by using the plurality of trajectory models and the plurality of amounts of correction on the basis of the result of recognition of the surrounding situation, and in a case where two of the amounts of correction for correcting two of the predicted trajectories adjacent to each other are determined to correct the two predicted trajectories in an identical direction, the predicted trajectory generator generates one of the predicted trajectories closer to a current position of the mobile body out of the two predicted trajectories while reflecting one of the amounts of correction for correcting one of the predicted trajectories farther from the current position of the mobile body.

According to the trajectory generation device, the plurality of interference degree parameters representing the degree of interference of the interference object around the mobile body with the mobile body is calculated, and the plurality of amounts of correction for respectively correcting the plurality of predicted trajectories is determined to cause the degree of interference represented by the plurality of interference degree parameters to be decreased. Then, since the plurality of predicted trajectories is generated by using the plurality of trajectory models and the plurality of amounts of correction on the basis of the result of recognition of the surrounding situation, the plurality of predicted trajectories is generated to cause the degree of interference with the mobile body of the interference object to be decreased.

At that time, in a case where the two amounts of correction for correcting the two predicted trajectories adjacent to each other are determined to correct the two predicted trajectories in the same direction, the predicted trajectory closer to the current position of the mobile body out of the two predicted trajectories is generated while reflecting the amount of correction for correcting the predicted trajectory farther from the current position of the mobile body.

Here, in a case where the interference object exists in a traveling direction of the mobile body, the predicted trajectory farther from the current position is a trajectory closer to the interference object than the predicted trajectory closer to the current position of the mobile body. Thus, by generating the predicted trajectory farther from the interference object (that is, closer to the mobile body) while reflecting the amount of correction for correcting the predicted trajectory closer to the interference object, it is possible to further increase an avoidance margin for avoiding interference with the interference object in the predicted trajectory farther from the interference object.

As a result, also in a case where the trajectory feasible by the mobile body is limited, for example, in a case where the mobile body is a vehicle, the future trajectory of the mobile body can be appropriately generated so that interference with the interference object can be avoided. Note that the "trajectory" in the present specification is not limited to a curved one, and includes a combination of line segments. In addition, "generating a future trajectory" in the present specification includes calculating the future trajectory, determining the future trajectory, and predicting the future trajectory. Further, "recognizing a surrounding situation" in the present specification includes acquiring the surrounding situation and detecting the surrounding situation in addition to recognizing the surrounding situation.

In the trajectory generation device of the present invention, it is preferable that in a case where the two of the amounts of correction are determined to correct the two predicted trajectories in directions different from each other, the predicted trajectory generator generates one of the predicted trajectories closer to the current position of the mobile body independently of one of the amounts of correction for correcting one of the predicted trajectories farther from the current position of the mobile body.

In this case, in a case where the two amounts of correction are determined to correct the two predicted trajectories in the directions different from each other, the two predicted trajectories are corrected in the directions different from each other to avoid the interference object. Thus, under such a condition, when the amount of correction for correcting the predicted trajectory farther from the current position of the mobile body is reflected in the predicted trajectory closer to the current position, the avoidance margin for the interference object is reduced in the predicted trajectory closer to the current position.

On the other hand, according to the trajectory generation device, when the two predicted trajectories are corrected in the directions different from each other to avoid the interference object, the predicted trajectory closer to the current position of the mobile body is generated independently of the amount of correction for correcting the predicted trajectory farther from the current position of the mobile body. As a result, it is possible to appropriately secure the avoidance margin for the interference object in the predicted trajectory closer to the current position.

In the trajectory generation device of the present invention, it is preferable that one of the predicted trajectories closer to the current position of the mobile body is generated in a state of being divided into a plurality of predicted trajectories shorter than one of the predicted trajectories farther from the current position of the mobile body.

In the case of the predicted trajectory closer to the current position of the mobile body, when the interference object exists in the vicinity of the predicted trajectory, it is necessary to generate the predicted trajectory so that interference with the interference object can be more reliably avoided, due to a short distance from the mobile body. On the other hand, according to the trajectory generation device, since the predicted trajectory closer to the current position of the mobile body is generated in a state of being divided into the plurality of predicted trajectories shorter than the predicted trajectory farther from the current position of the mobile body, the plurality of predicted trajectories can be generated to more reliably avoid interference with the interference object.

In the trajectory generation device of the present invention, it is preferable that the mobile body includes the surrounding situation recognizer, the predicted trajectory generator, the interference degree parameter calculator, and the correction amount determiner.

According to the trajectory generation device, in the case where the interference object exists in the traveling direction of the mobile body, the avoidance margin for the interference object can be increased in the predicted trajectory farther from the interference object of the mobile body. As a result, also in a mobile body (for example, a mobile body such as a vehicle that cannot move to right beside thereof) in which restriction on a feasible trajectory is generally large, the future trajectory of the mobile body can be appropriately generated so that interference with the interference object can be avoided.

In the trajectory generation device of the present invention, it is preferable that the mobile body is a second mobile body other than a first mobile body including the surrounding situation recognizer, the predicted trajectory generator, the interference degree parameter calculator, and the correction amount determiner, and the predicted trajectory generator generates the plurality of predicted trajectories by using a past position of the second mobile body, the plurality of trajectory models, and the plurality of amounts of correction.

According to the trajectory generation device, it is possible to appropriately generate the plurality of predicted trajectories of the second mobile body other than the first mobile body while reflecting a past trajectory of the second mobile body. As a result, when a moving state of the first mobile body is controlled, the first mobile body can be controlled to move while avoiding interference with the second mobile body.

In the trajectory generation device of the present invention, it is preferable that the predicted trajectory generator generates one of the predicted trajectories closer to the current position of the second mobile body to cause a difference to be reduced between a time series of the past position of the second mobile body and a time series of a plurality of estimated positions on a trajectory when the one of the predicted trajectories closer to the current position of the second mobile body is extended to a past position side of the second mobile body along the one of the predicted trajectories.

According to the trajectory generation device, the predicted trajectory closer to the current position of the second mobile body is generated to cause the difference to be reduced between the time series of the past position of the second mobile body and the time series of the plurality of estimated positions. That is, the predicted trajectory closer to the current position of the second mobile body can be generated in consideration of followability to the past position of the second mobile body, and accuracy of the generation can be improved.

Another of the present invention is a trajectory generation method for generating a future trajectory of a mobile body by a calculation processing device, the trajectory generation method including: a surrounding situation recognition step of recognizing a surrounding situation of the mobile body; a predicted trajectory generation step of generating a plurality of predicted trajectories that are predicted values of a plurality of the future trajectories when the future trajectory of the mobile body is divided into a plurality of trajectories, by using a plurality of trajectory models that models a trajectory of the mobile body, on the basis of a result of recognition of the surrounding situation by the surrounding situation recognition step; an interference degree parameter calculation step of calculating a plurality of interference degree parameters representing a degree of interference of an interference object around the mobile body with the mobile body by using the plurality of predicted trajectories; and a correction amount determination step of determining a plurality of amounts of correction for respectively correcting the plurality of predicted trajectories to cause the degree of interference represented by the plurality of interference degree parameters to be decreased, executed by the calculation processing device, in which in the predicted trajectory generation step, the plurality of predicted trajectories is generated by using the plurality of trajectory models and the plurality of amounts of correction on the basis of the result of recognition of the surrounding situation, and in a case where two of the amounts of correction for correcting two of the predicted trajectories adjacent to each other are determined to correct the two predicted trajectories in an identical direction, one of the predicted trajectories closer to a current position of the mobile body out of the two predicted trajectories is generated while reflecting one of the amounts of correction for correcting one of the predicted trajectories farther from the current position of the mobile body.

BRIEF DESCRIPTION OF DRAWINGS

FIG. 25 is a diagram illustrating a relationship between moving average values and a calculation value of a predicted curvature;

FIG. 26 is a diagram illustrating a relationship between moving average values and a calculation value of a predicted curvature;

FIG. 49 is a diagram illustrating another example of the result of determination of the first to third predicted trajectories of the pedestrian;

FIG. 50 is a diagram for explaining a relationship between moving average values and a calculation value of a predicted curvature; and FIG. 51 is a diagram for explaining a relationship between moving average values and a calculation value of a predicted curvature.

DETAILED DESCRIPTION

Figure 1:
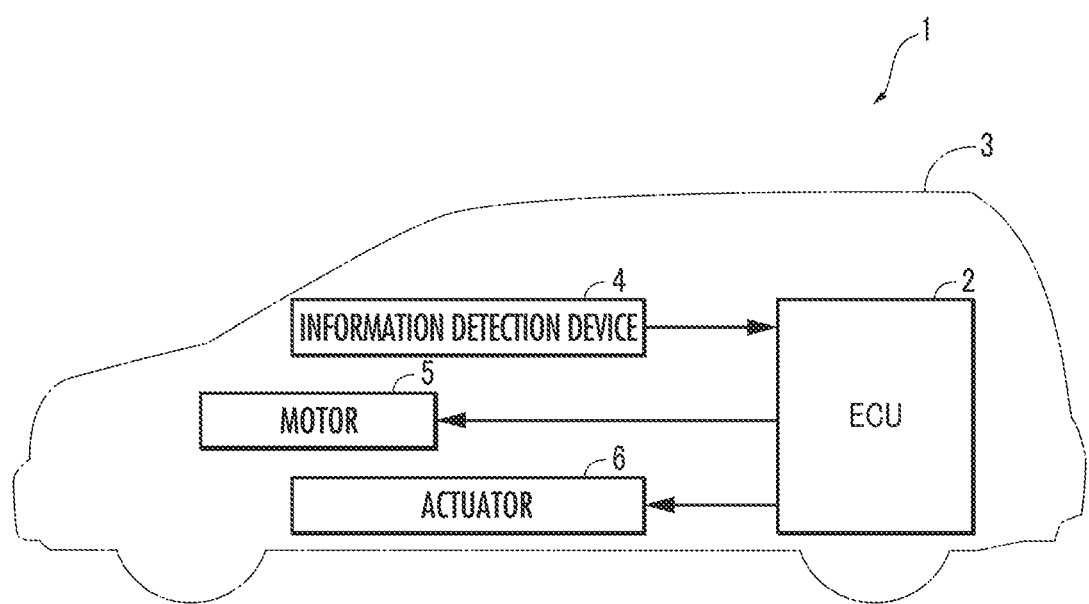
FIG. 1 is a diagram schematically illustrating a configuration of a vehicle including a trajectory generation device according to a first embodiment of the present invention.

Hereinafter, a trajectory generation device according to a first embodiment of the present invention will be described with reference to the drawings. As illustrated in FIG. 1, a trajectory generation device 1 is applied to a four-wheeled vehicle 3 (hereinafter referred to as a "host vehicle 3") capable of automatic driving. Note that, in the present embodiment, the host vehicle 3 corresponds to a mobile body. In the trajectory generation device 1, a future travel trajectory of the host vehicle 3 is determined by an algorithm described later to execute automatic driving control of the host vehicle 3.

The trajectory generation device 1 includes an ECU 2, and an information detection device 4, a motor 5, and an actuator 6 are electrically connected to the ECU 2. The information detection device 4 includes a camera, a millimeter wave radar, a LIDAR, a laser radar, a sonar, a GPS, various sensors, a device for receiving information from an infrastructure called ITS or VTS, and the like.

The information detection device 4 detects a position of the host vehicle 3 and peripheral information in a traveling direction of the host vehicle 3 and outputs the information to the ECU 2. In this case, the peripheral information includes information on a roadway, a sidewalk, a crosswalk, a signal, a boundary between the roadway and the sidewalk, traffic participants (a pedestrian, another vehicle, an obstacle), and the like. Note that, in the present embodiment, the information detection device 4 corresponds to a surrounding situation recognizer.

The motor 5 includes, for example, an electric motor, and the like, and an output of the motor 5 is controlled by the ECU 2 so that the host vehicle 3 travels along the travel trajectory when the future travel trajectory of the host vehicle 3 is determined.

The actuator 6 includes a braking actuator, a steering actuator, and the like, and operation of the actuator 6 is controlled by the ECU 2 so that the host vehicle 3 travels along the travel trajectory when the future travel trajectory of the host vehicle 3 is determined.

Meanwhile, the ECU 2 includes a microcomputer including a CPU, a RAM, a ROM, an I/O interface, various electric circuits (all not illustrated), and the like. As described later, the ECU 2 predicts an action of a traffic participant (for example, a traffic participant TP1 described later) other than the host vehicle 3 on the basis of peripheral information from the information detection device 4 described above, and determines the future travel trajectory of the host vehicle 3 on the basis of a result of the prediction of the action of the traffic participant, the position of the host vehicle 3, a traffic environment around the host vehicle 3, and the like.

Note that, in the present embodiment, the ECU 2 corresponds to the surrounding situation recognizer, a predicted trajectory generator, an interference degree parameter calculator, a correction amount determiner, and a calculation processing device.

Next, a functional configuration of the trajectory generation device 1 of the present embodiment will be described with reference to FIG. 2. The trajectory generation device 1 determines a travel trajectory of the host vehicle 3 by an algorithm described below to execute automatic driving control of the host vehicle 3.

In the following description, an object that interferes with traveling of the host vehicle 3 is referred to as an "interference object". In this case, as described later, a traffic participant other than the host vehicle 3, and a traffic environment (a road environment, a signal state, or the like) correspond to the interference object.

Figure 2:
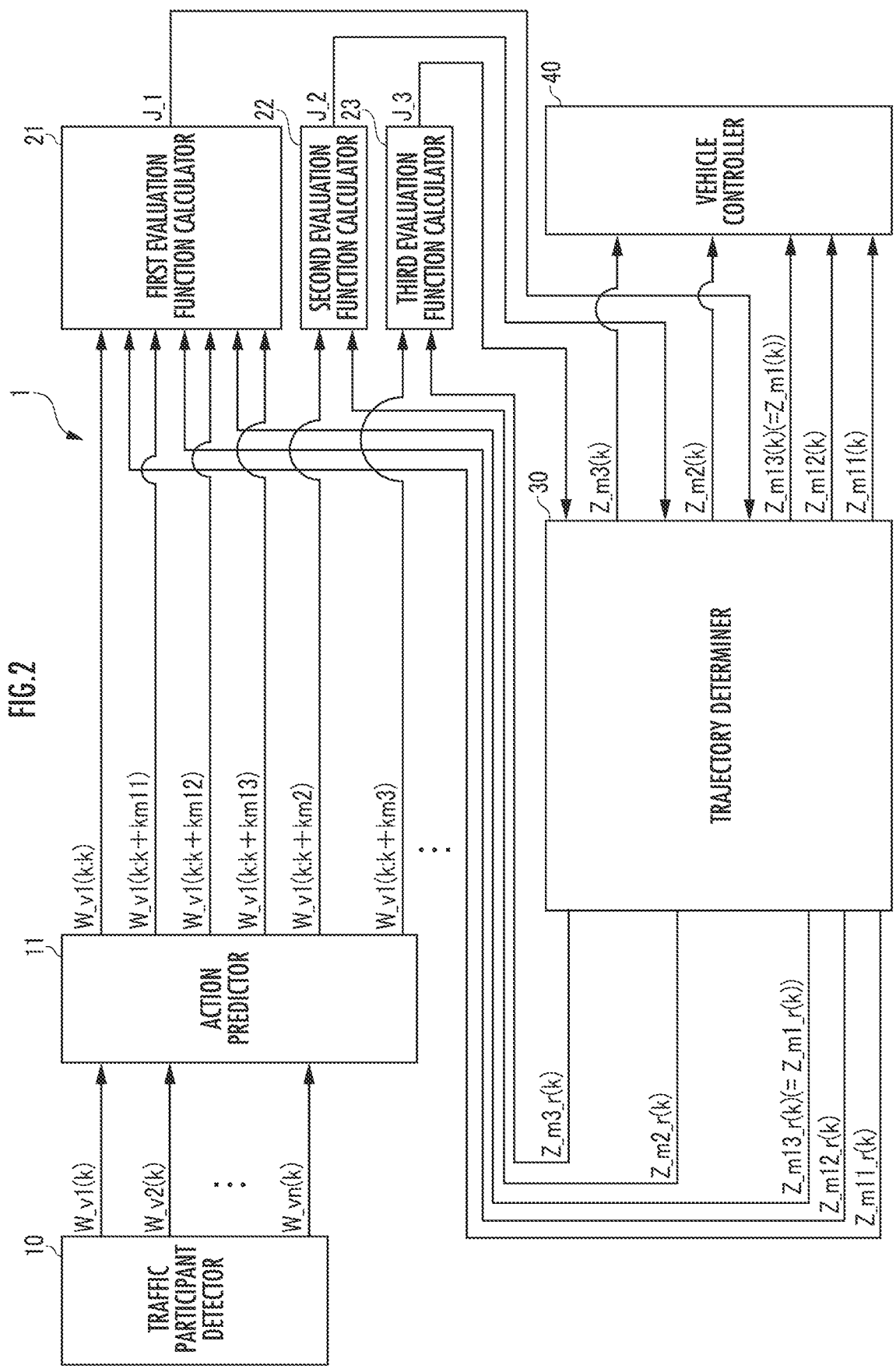
FIG. 2 is a block diagram illustrating a functional configuration of the trajectory generation device of the first embodiment.

As illustrated in FIG. 2, the trajectory generation device 1 includes a traffic participant detector 10, an action predictor 11, first to third evaluation function calculators 21 to 23, and a trajectory determiner 30. Specifically, these elements 10 to 11, 21 to 23, and 30 are configured by the ECU 2, and calculation processing in these elements 10 to 11, 21 to 23, and 30 is executed in a predetermined control period ΔT (for example, 5 msec).

Note that, in the present embodiment, the first to third evaluation function calculators 21 to 23 correspond to the interference degree parameter calculator, and the trajectory determiner 30 corresponds to the predicted trajectory generator and the correction amount determiner.

First, the traffic participant detector 10 detects/calculates a current detected position $W\_vj(k)$ of the traffic participant by using a predetermined machine learning algorithm (for example, an algorithm to which a neural network such as DNN or CNN is applied) on the basis of the peripheral information from the information detection device 4.

In this case, a symbol "(k)" in the current detected position $W\_vj(k)$ represents control time, and in the following description, the symbol "(k)" and the like are appropriately omitted. In addition, the subscript "j" in the current detected position $W\_vj(k)$ represents an existing traffic participant's number/the number of existing traffic participants. That is, in a case where there is one traffic participant, j=1, and in a case where there are n (n is plural) traffic participants, j=1 to n.

Figure 3:
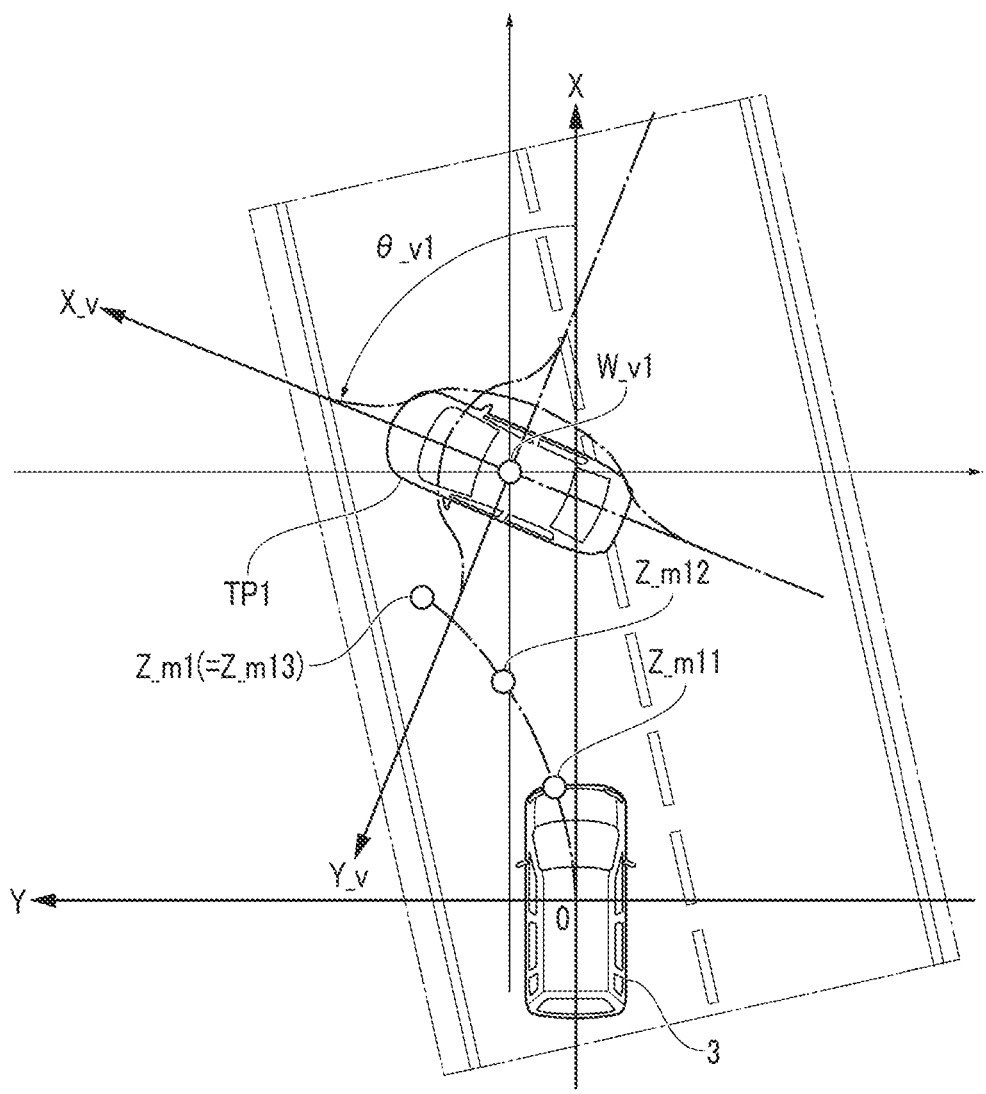
FIG. 3 is a diagram for explaining a coordinate system of a host vehicle and a coordinate system of a traffic participant.

Hereinafter, as illustrated in FIG. 3, a case where only the traffic participant TP1 that is another vehicle exists in front of the host vehicle 3 (that is, a case where j=1) will be described as an example. Here, as described later, a coordinate system of the host vehicle 3 is defined as an orthogonal two-dimensional coordinate system in which the center of a current position of the host vehicle 3 is the origin, and the traveling direction and the left direction of the host vehicle 3 are the X axis and the Y axis. In addition, $Z\_m11$, $Z\_m12$, and $Z\_m13$ in the figure are predicted positions described later of the host vehicle 3.

Meanwhile, a coordinate system of the traffic participant TP1 is defined as an orthogonal two-dimensional coordinate system in which the center of the traffic participant TP1 is the origin, the traveling direction and the lateral direction of the traffic participant TP1 are the X_v axis and the Y_v axis, and the inclination of the X_v axis with respect to the X axis is θ_v1.

In this orthogonal two-dimensional coordinate system, in a case where an X_v coordinate value of the traffic participant TP1 is x_v1 and a Y_v coordinate value is y_v1, a current detected position W_v1(k) of the traffic participant TP1 is calculated as a value having three values [x_v1(k), y_v1(k), θ_v1(k)] as elements (where x_v1(k)=y_v1(k)=0). In addition, a line indicated by a one-dot chain line around the traffic participant TP1 in FIG. 3 represents a risk potential described later.

The action predictor 11 calculates a current position W_v1(k:k) of the traffic participant TP1 and five predicted positions W_v1(k:k+km11), W_v1(k:k+km12), W_v1(k:k+km13), W_v1(k:k+km2), and W_v1(k:k+km3) by using a predetermined machine learning algorithm (for example, an algorithm to which a neural network such as DNN or CNN is applied) on the basis of a result of detection of the current detected position W_vj(k) by the traffic participant detector 10.

In this case, a value k on the left side of ":" in parentheses of the predicted position W_v1(k:k+km11) represents current control time, and a value k+km11 on the right side of ":" represents predicted time. In addition, an interval between the current control time k and predicted time k+km13, an interval between the predicted time k+km13 and predicted time k+km2, and an interval between the predicted time k+km2 and predicted time k+km3 are set to be the same as each other.

Further, an interval between the current control time k and predicted time k+km11, an interval between the predicted time k+km11 and predicted time k+km12, and an interval between the predicted time k+km12 and the predicted time k+km13 are set to be the same as each other. That is, the two predicted times k+km11 and k+km12 correspond to two times between the current control time k and the predicted time k+km13 when an interval between the current control time k and the predicted time k+km13 are divided into three equal parts. In addition, the current position W_v1(k:k) is set to the current detected position W_v1(k).

As described above, in the action predictor 11, in a case where there is one traffic participant, six positions (current position and five predicted positions) of the traffic participant are calculated, and in a case where there are n traffic participants, n×6 positions are calculated. The same applies to the calculation in each of the elements 11, 21 to 23, and 30 described above. Hereinafter, a case where there is one traffic participant will be described as an example.

Note that the action predictor 11 may calculate five predicted positions W_v1(k:k+km11), W_v1(k:k+km12), W_v1(k:k+km13), W_v1(k:k+km2), and W_v1(k:k+km3) by using a method of a second embodiment described later instead of the predetermined machine learning algorithm. In addition, the action predictor 11 may be configured to calculate four or less or six or more predicted positions.

Next, descriptions will be given of a definition of the future travel trajectory of the host vehicle 3 (hereinafter referred to as "host vehicle trajectory") in the trajectory generation device 1 of the present embodiment, and a determination principle thereof.

Figure 4:
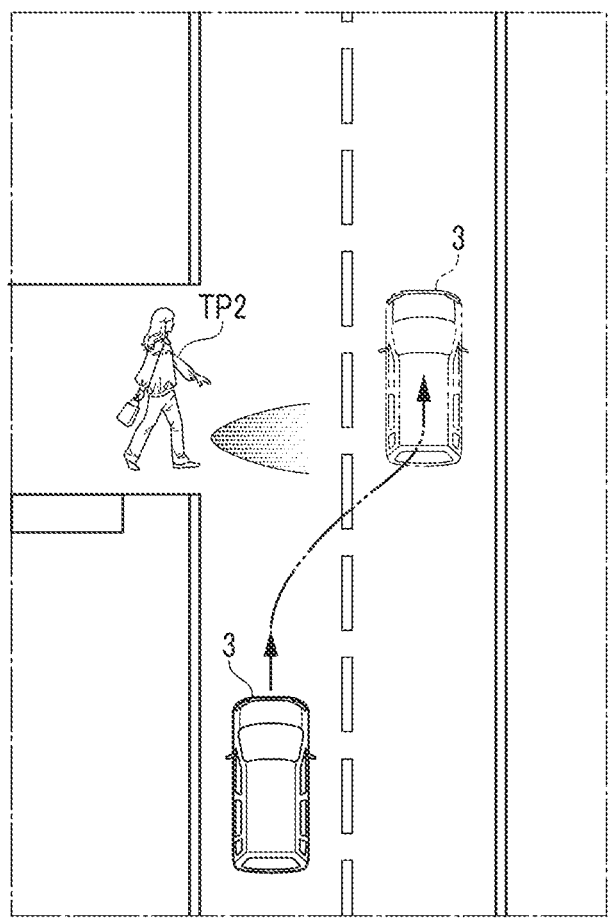
FIG. 4 is a diagram illustrating an example of a trajectory when the host vehicle avoids the traffic participant.

For example, as illustrated in FIG. 4, in a case where a traffic participant TP2 who is a pedestrian is present in the left front when the host vehicle 3 travels in the left lane, and the traffic participant TP2 walks toward the left lane side, it is necessary to determine the host vehicle trajectory so that the host vehicle 3 moves to the right lane to avoid interference with the traffic participant TP2. At the same time, it is necessary to determine the host vehicle trajectory so that the host vehicle 3 does not protrude from the right lane to the right outside.

Figure 5:
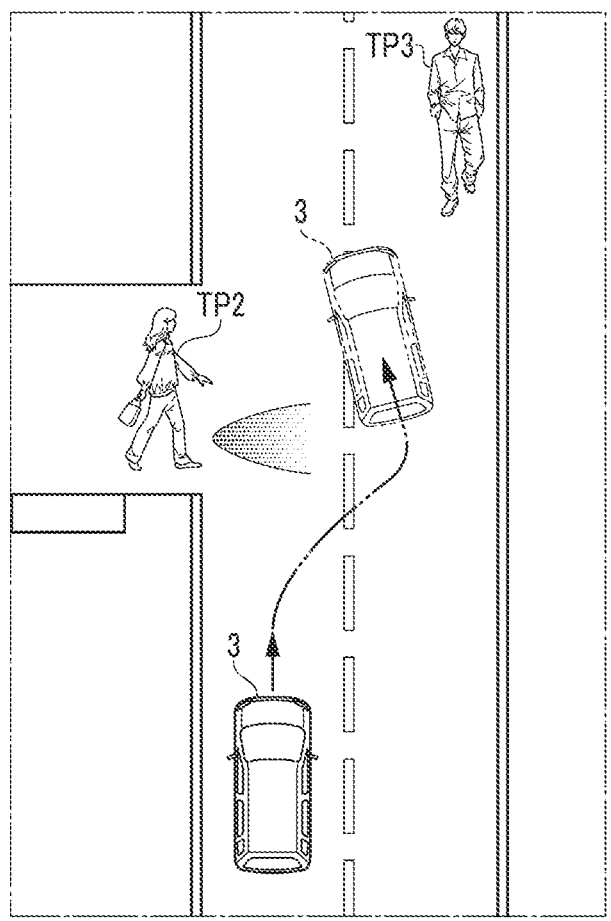
FIG. 5 is a diagram illustrating another example of the trajectory when the host vehicle avoids the traffic participant.

For example, as illustrated in FIG. 5, in a case where a traffic participant TP3 as a pedestrian is present in the right lane in addition to the traffic participant TP2 similar to FIG. 4 when the host vehicle 3 travels in the left lane, it is necessary to determine the host vehicle trajectory so that the host vehicle 3 moves to the right lane side to avoid interference with the traffic participant TP2, and then the host vehicle 3 moves to the left lane side to avoid interference with the traffic participant TP3.

Figure 6:
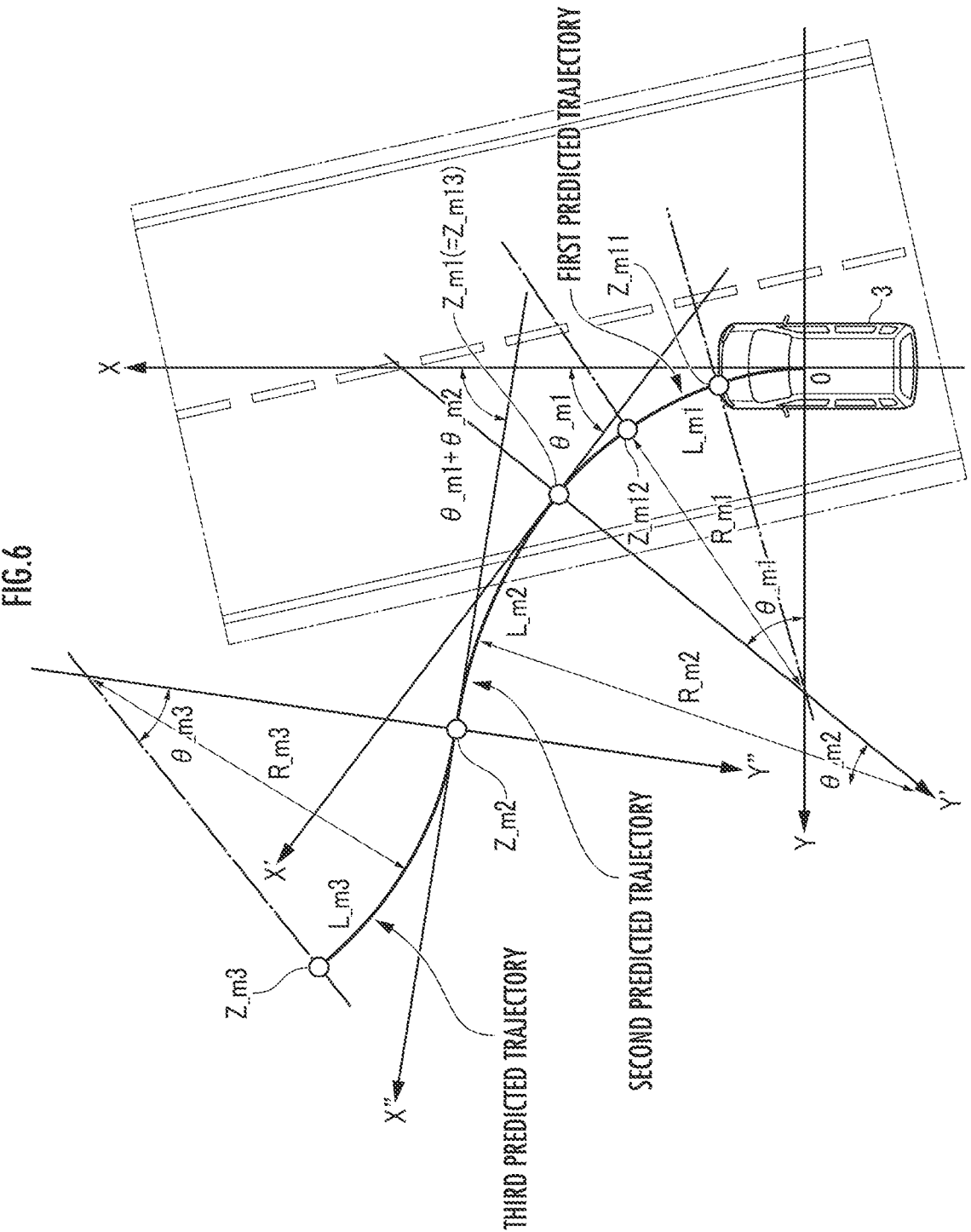
FIG. 6 is a diagram for explaining first to third predicted trajectories of the host vehicle.

To satisfy the above conditions, in the present embodiment, as illustrated in FIG. 6, the host vehicle trajectory is determined as a combination of three arc-shaped predicted trajectories, first to third predicted trajectories. First, the first predicted trajectory will be described. First, an X-Y coordinate system is defined in which the center of the current position of the host vehicle 3 is the origin, the front direction line of the host vehicle 3 is the X axis, and the left direction line of the host vehicle 3 is the Y axis.

A position after a first predicted time T_m1, from the origin in the X-Y coordinate system is defined as a first predicted position Z_m1, and the host vehicle trajectory from the origin to the first predicted position Z_m1 is defined as the first predicted trajectory of an arc shape. Here, in a case where a current velocity of the host vehicle 3 is V_ego, a distance L_m1 of the first predicted trajectory is defined as in the following formula (1).

[MATH. 1]

$$L\_m1(k)=V\_ego(k) \cdot T\_m1 \qquad (1)$$

Further, in a case where a curvature radius of the first predicted trajectory is R_m1, a rotation angle θ_m1 of the first predicted trajectory is defined as in the following formula (2). The rotation angle θ_m1 corresponds to an angle between the Y axis and the Y' axis described later.

[MATH. 2]

$$\theta\_m1(k)=L\_m1(k)/R\_m1(k) \qquad (2)$$

Predicted positions when the host vehicle trajectory from the origin to the first predicted position Z_m1 is divided into three equal parts are set as the three predicted positions Z_m11, Z_m12, and Z_m13 (=Z_m1) in order from the origin toward the first predicted position Z_m1. In this case, an X coordinate value x_m11 and a Y coordinate value y_m11 of the predicted position Z_m11 are defined as in the following formulas (3) and (4).

[MATH. 3]

$$x\_m11(k)=R\_m1(k) \cdot \sin(\theta\_m1(k)/3) \qquad (3)$$

[MATH. 4]

$$y\_m112(k)=r\_m1(k) \cdot (1-\cos(\theta\_m1(k)/3)) \qquad (4)$$

In addition, an X coordinate value x_m12 and a Y coordinate value y_m12 of the predicted position Z_m12 are defined as in the following formulas (5) and (6).

[MATH. 5]

$$x\_m11(k)=R\_m1(k) \cdot \sin(2\theta\_m1(k)/3) \qquad (5)$$

[MATH. 6]

$$y\_m12(k)=R\_m1(k) \cdot (1-\cos(2\theta\_m1(k)/3)) \qquad (6)$$

Further, an X coordinate value x_m13 and a Y coordinate value y_m13 of the predicted position Z_m13 are defined as in the following formulas (7) and (8).

[MATH. 7]

$$x\_m13(k) \cdot \sin(\theta\_m1(k)) \quad (7)$$

[MATH. 8]

$$y\_m13(k) = R\_m1(k) \cdot (1 - \cos(\theta\_m1(k))) \quad (8)$$

The above formulas (1) to (8) correspond to a model formula (model trajectory) of the first predicted trajectory.

Next, the second predicted trajectory will be described. First, an X'-Y' coordinate system is defined in which the first predicted position Z_m1 (=predicted position Z_m13) is the origin, a tangential line at the first predicted position Z_m1 of the first predicted trajectory is the X' axis, and a line orthogonal to the tangential line is the Y' axis.

Further, a position after a second predicted time T_m2, from the origin in the X'-Y' coordinate system, that is, from the first predicted position Z_m1 is defined as a second predicted position Z_m2, and the host vehicle trajectory from the first predicted position Z_m1 to the second predicted position Z_m2 is defined as the second predicted trajectory of an arc shape. In this case, a distance L_m2 of the second predicted trajectory is defined as in the following formula (9).

[MATH. 9]

$$L\_m2(k) = V\_ego(k) \cdot T\_m2 \quad (9)$$

Further, in a case where a curvature radius of the second predicted trajectory is R_m2, a rotation angle θ_m2 of the second predicted trajectory is defined as in the following formula (10). The rotation angle θ_m2 corresponds to an angle between the Y' axis and the Y" axis described later.

[MATH. 10]

$$\theta\_m2(k) = L\_m2(k) / R\_m2(k) \quad (10)$$

An X' coordinate value x'_m2 and a Y' coordinate value y'_m2 of the second predicted position Z_m2 are defined as in the following formulas (11) and (12).

[MATH. 11]

$$x'\_m2(k) = R\_m2(k) \cdot \sin(\theta\_m2(k)) \quad (11)$$

[MATH. 12]

$$y'\_m2(k) = R\_m2(k) \cdot (1 - \cos(\theta\_m2(k))) \quad (12)$$

Further, an X coordinate value x_m2 and a Y coordinate value y_m2 of the second predicted position Z_m2 are defined as in the following formulas (13) and (14).

[MATH. 13]

$$x\_m2(k) = x'\_m2(k) \cdot \cos(\theta\_m1(k)) - y'\_m2(k) \cdot \sin(\theta\_m1(k)) + x\_m13(k) \quad (13)$$

[MATH. 14]

$$x\_m2(k) = x'\_m2(k) \cdot \sin(\theta\_m1(k)) + y'\_m2(k) \cdot \cos(\theta\_m1(k)) + y\_m13(k) \quad (14)$$

The above formulas (9) to (14) correspond to a model formula (model trajectory) of the second predicted trajectory.

Next, the third predicted trajectory will be described. First, an X"-Y" coordinate system is defined in which the second predicted position Z_m2 is the origin, a tangential line at the second predicted position Z_m2 of the second predicted trajectory is the X" axis, and a line orthogonal to the tangential line is the Y" axis.

Further, a position after a third predicted time T_m3, from the origin (that is, the second predicted position Z_m2) in the X"-Y" coordinate system is defined as a third predicted position Z_m3, and the host vehicle trajectory from the second predicted position Z_m2 to the third predicted position Z_m3 is defined as the third predicted trajectory of an arc shape. In this case, a distance L_m3 of the third predicted trajectory is defined as in the following formula (15).

[MATH. 15]

$$L\_m3(k) = V\_ego(k) \cdot T\_m3 \quad (15)$$

Further, in a case where a curvature radius of the third predicted trajectory is R_m3, a rotation angle θ_m3 of the third predicted trajectory is defined as in the following formula (16).

[MATH. 16]

$$\theta\_m3(k) = L\_m3(k) / R\_m3(k) \quad (16)$$

An X" coordinate value x"_m3 and a Y" coordinate value y"_m3 of the third predicted position Z_m3 are defined as in the following formulas (17) and (18).

[MATH. 17]

$$x"\_m3(k) = R\_m3(k) \cdot \sin(\theta\_m3(k)) \quad (17)$$

[MATH. 18]

$$y"\_m3(k) = R\_m3(k) \cdot (1 - \cos(\theta\_m3(k))) \quad (18)$$

Further, an X coordinate value x_m3 and a Y coordinate value y_m3 of the third predicted position Z_m3 are defined as in the following formulas (19) and (20).

[MATH. 19]

$$x\_m3(k) = x"\_m3(k) \cdot \cos(\theta\_m1(k) + \theta\_m2(k)) - y"\_m2(k) \cdot \sin(\theta\_m1(k) + \theta\_m2(k)) + x\_m2(k) \quad (19)$$

[MATH. 20]

$$y\_m3(k) = x"\_m3(k) \cdot \sin(\theta\_m1(k) + \theta\_m2(k)) + y"\_m3(k) \cdot \cos(\theta\_m1(k) + \theta\_m2(k)) + y\_m2(k) \quad (20)$$

The above formulas (15) to (20) correspond to a model formula (model trajectory) of the third predicted trajectory.

As described above, the first predicted trajectory is determined as a combination of three predicted trajectories shorter than the second predicted trajectory and the third predicted trajectory. Specifically, the first predicted trajectory is determined as a combination of a trajectory from the current position to the predicted position Z_m11, a trajectory from the predicted position Z_m11 to the predicted position Z_m12, and a trajectory from the predicted position Z_m12 to the predicted position Z_m13.

This is because, in the first predicted trajectory, it is necessary to generate a predicted trajectory so that interference with an interference object can be more reliably avoided due to a shorter distance to the host vehicle 3 as compared with the second predicted trajectory and the third predicted trajectory. Note that the first predicted trajectory may be determined as a combination of two or four or more predicted trajectories.

Next, the first to third evaluation function calculators 21 to 23 mentioned above will be described. In these first to third evaluation function calculators 21 to 23, each of a first evaluation function J_1, a second evaluation function J_2, and a third evaluation function J_3 is calculated as a representation of a degree of interference between the host vehicle 3 and the interference object by using the five predicted positions Z_m11, Z_m12, Z_m13, Z_m2, and Z_m3 determined as described above.

Here, since the first evaluation function J_1, the second evaluation function J_2, and the third evaluation function J_3 are used for calculation of the five predicted positions Z_m11, Z_m12, Z_m13, Z_m2, and Z_m3 as described later, current values of the first evaluation function J_1, the second evaluation function J_2, and the third evaluation function J_3 are calculated on the basis of previous values of the five predicted positions Z_m11, Z_m12, Z_m13, Z_m2, and Z_m3.

Note that, in the following description, the five predicted positions Z_m11, Z_m12, Z_m13, Z_m2, and Z_m3 are collectively referred to as a "predicted position Z_mi". That is, the subscript i of the "predicted position Z_mi" represents i=11 to 13, 2, and 3.

Hereinafter, descriptions will be given of a method used for calculation of the first to third evaluation functions J_1 to J_3 in the first to third evaluation function calculators 21 to 23, and a principle thereof.

First, a method of calculating a risk potential R_p_mi_vj_v will be described. The risk potential R_p_mi_vj_v represents the degree of interference between the host vehicle 3 and the interference object in a case where it is assumed that the host vehicle 3 is at the predicted position Z_mi and the interference object such as the traffic participant is at the predicted position W_vj.

First, an x coordinate deviation dx_mi_vj and a y coordinate deviation dy_mi_vj are calculated by the following formulas (21) and (22).

[MATH. 21]

$$dx\_mi\_vj(k) = x\_mi(k) - x\_vj(k) \qquad (21)$$

[MATH. 22]

$$dy\_mi\_vj(k) = y\_mi(k) - y\_vj(k) \qquad (22)$$

These deviations dx_mi_vj and dy_mi_vj represent deviations between the predicted position Z_mi of the host vehicle 3 and the predicted position W_vj of the interference object. In this case, for example, in the case of the predicted position Z_mi=Z_m11 of the host vehicle 3, a deviation between this and a predicted position W_vj(k:k+km11) of the interference object is calculated.

Next, a transformed x coordinate deviation dx_mi_vj_v and a transformed y coordinate deviation dy_mi_vj_v are calculated by the following formulas (23) and (24). These deviations dx_mi_vj_v and dy_mi_vj_v are obtained by transforming the two deviations dx_mi_vj and dy_mi_vj into a coordinate system of the interference object.

[MATH. 23]

$$dx\_mi\_vj\_v(k) = dx\_mi\_vj(k) \cdot \cos(\theta\_vj(k)) + dy\_mi\_vj(k) \cdot \sin(\theta\_vj(k)) \qquad (23)$$

[MATH. 24]

$$dx\_mi\_vj\_v(k) = dx\_mi\_v(k) \cdot \cos(\theta\_vj(k)) + dy\_mi\_vj(k) \cdot \sin(\theta\_vj(k)) \qquad (24)$$

Figure 7:
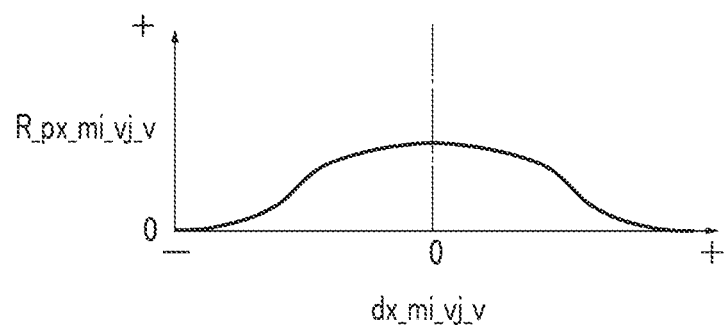
FIG. 7 is a diagram illustrating an example of a map used for calculation of an x-direction risk potential.

Next, an x-direction risk potential R_px_mi_vj_v is calculated by searching a map illustrated in FIG. 7 depending on the transformed x coordinate deviation dx_mi_vj_v. A width, a shape, and the like of a map value of the x-direction risk potential R_px_mi_vj_v are set depending on a type (for example, a pedestrian, a bicycle, a four-wheeled vehicle, a motorcycle, or the like) of the interference object.

Figure 8:
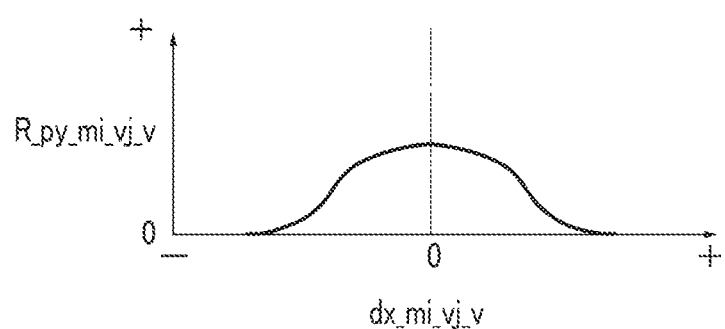
FIG. 8 is a diagram illustrating an example of a map used for calculation of a y-direction risk potential.

Further, a y-direction risk potential R_py_mi_vj_v is calculated by searching a map illustrated in FIG. 8 depending on the transformed y coordinate deviation dy_mi_vj_v. A width, a shape, and the like of a map value of the y-direction risk potential R_py_mi_vj_v are also set depending on the type (for example, a pedestrian, a bicycle, a four-wheeled vehicle, a motorcycle, or the like) of the interference object, similarly to the map value of the x-direction risk potential R_px_mi_vj_v.

Then, as shown in the following formula (25), the risk potential R_p_mi_vj_v is calculated as a product of the x-direction risk potential R_px_mi_vj_v and the y-direction risk potential R_py_mi_vj_v.

[MATH. 25]

$$R\_p\_mi\_vj\_v(k) = R\_px\_mi\_vj\_v(k) \cdot R\_py\_mi\_vj\_v(k) \qquad (25)$$

By the above method, the risk potential R_p_mi_vj_v is calculated to have a larger value as the degree of interference between the host vehicle 3 and the interference object increases.

Next, a description will be given of a method of calculating a right side track boundary risk potential R_p_rbr_mi and a left side track boundary risk potential R_p_rbl_mi. These two risk potentials R_p_rbr_mi and R_p_rbl_mi are values representing a possibility that the host vehicle 3 causes deviation from the track in a case where the host vehicle 3 is assumed to be at the predicted position Z_mi.

Figure 9:
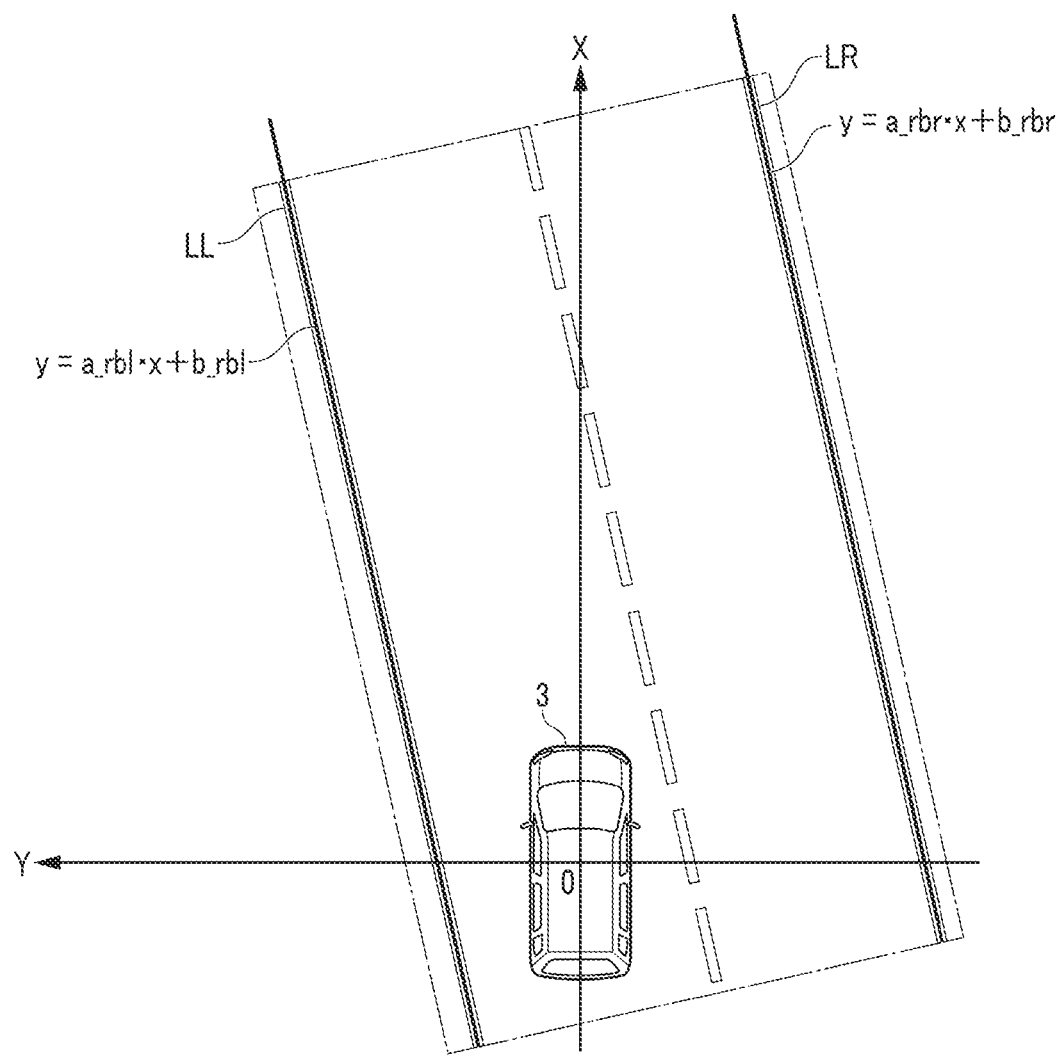
FIG. 9 is a diagram for explaining a function defining a right side boundary line and a left side boundary line of a track of the host vehicle.

First, in a case where a right side boundary line LR and a left side boundary line LL of the track of the host vehicle 3 are as illustrated in FIG. 9, for example, these boundary lines LR and LL can be defined as two linear functions shown in the following formulas (26) and (27).

[MATH. 26]

$$y(k) = a\_rbr(k) \cdot x(k) + b\_rbr(k) \qquad (26)$$

[MATH. 27]

$$y(k) = a\_rbl(k) \cdot x(k) + b\_rbl(k) \qquad (27)$$

In the above formula (26), a_rbr and b_rbr are parameters that define the right side boundary line LR, and in the above formula (27), a_rbl and b_rbl are parameters that define the left side boundary line LL. These four parameters a_rbr, b_rbr, a_rbl, and b_rbl are calculated in real time on the basis of a detection result of the information detection device 4 described above.

Next, a right side track boundary function σ_r and a left side track boundary function σ_l are defined as shown in the following formulas (28) and (29).

[MATH. 28]

$$\sigma\_r(k) = y(k) - a\_rbr(k) \cdot x(k) - b\_rbr(k) \qquad (28)$$

[MATH. 29]

$$\sigma\_l(k) = y(k) - a\_rbl(k) \cdot x(k) - b\_rbl(k) \qquad (29)$$

These formulas (28) and (29) correspond to ones obtained by transposing the left side of the above formulas (26) and (27) to the right side. Thus, in a case where the right side track boundary function σ_r has a positive value, the center of the host vehicle 3 exists in a region inside the track on the left side of the right side boundary line LR, and in a case where the right side track boundary function σ_r has a negative value, the center of the host vehicle 3 exists in a region outside the track on the right side of the right side boundary line LR.

Similarly, in a case where the left side track boundary function σ_l has a positive value, the center of the host vehicle 3 exists in a region outside the track on the left side of the left side boundary line LL, and in a case where the left track boundary function σ_l has a negative value, the center of the host vehicle 3 exists in a region inside the track on the right side of the left side boundary line LL.

On the basis of the above principle, the right side track boundary risk potential R_p_rbr is calculated by the following formulas (30) and (31), and the left side track boundary risk potential R_p_rbl is calculated by the following formulas (32) and (33).

[MATH. 30]

When $\sigma\_r(k) \leq \sigma\_mrg$ $$R\_p\_rbr(k) = |\sigma\_r(k) - \sigma\_mrg| \tag{30}$$

[MATH. 31]

When $\sigma\_mrg < \sigma\_r(k)$ $$R\_p\_rbr(k) = 0 \tag{31}$$

[MATH. 32]

When $-\sigma\_mrg \leq \sigma\_l(k)$ $$R\_p\_rbl(k) = |\sigma\_l(k) + \sigma\_o\_mrg| \tag{32}$$

[MATH. 33]

When $\sigma\_l(k) < -\sigma\_mrg$ $$R\_p\_rbl(k) = 0 \tag{33}$$

Figure 10:
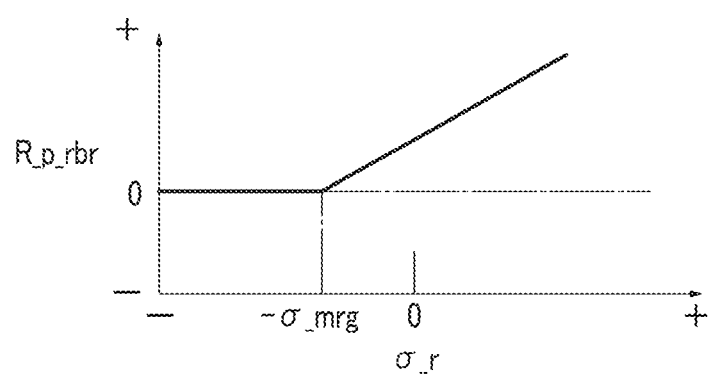
FIG. 10 is a diagram illustrating a relationship between a right side track boundary risk potential and a right side track boundary function.
Figure 11:
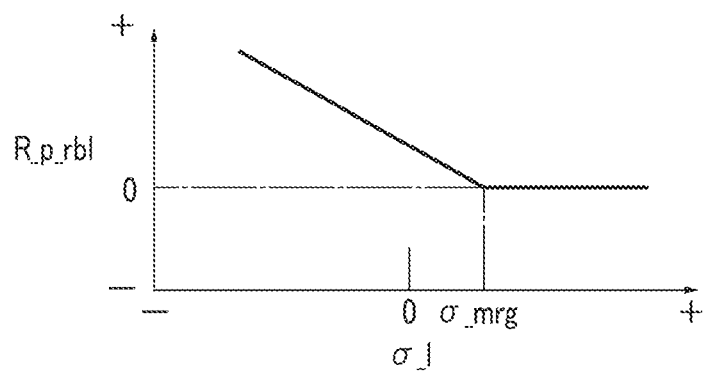
FIG. 11 is a diagram illustrating a relationship between a left side track boundary risk potential and a left side track boundary function.

In the above formulas (30) to (33), σ_mrg is a margin (positive predetermined value) for enabling the host vehicle 3 to reliably avoid the deviation from the track. Here, in the case of schematizing a relationship between the right side track boundary risk potential R_p_rbr and the right side track boundary function σ_r, and a relationship between the left side track boundary risk potential R_p_rbl and the left side track boundary function σ_l, the relationships are illustrated in FIGS. 10 and 11.

Next, according to the same principle as described above, a right side track boundary function σ_r_mi and a left side track boundary function σ_l_mi at the predicted position Z_mi of the host vehicle 3 are defined as shown in the following formulas (34) and (35).

[MATH. 34]

$$\sigma\_r\_mi(k) = y\_mi(k) - a\_rbr(k) \cdot x\_mi(k) - b\_rbr(k) \tag{34}$$

[MATH. 35]

$$\sigma\_l\_mi(k) = y\_mi(k) - a\_rbl(k) \cdot x\_mi(k) - b\_rbl(k) \tag{35}$$

Further, according to the principle described above, the right side track boundary risk potential R_p_rbr_mi at the predicted position Z_mi of the host vehicle 3 is calculated by the following formulas (36) and (37), and the left side track boundary risk potential R_p_rbl_mi at the predicted position Z_mi of the host vehicle 3 is calculated by the following formulas (38) and (39).

[MATH. 36]

When $\sigma\_r\_mi(k) \leq \sigma\_mrg(k)$ $$R\_p\_rbr\_mi(k) = |\sigma\_r\_mi(k) - \sigma\_mrg| \tag{36}$$

[MATH. 37]

When $\sigma\_mrg < \sigma\_r\_mi(k)$ $$R\_p\_rbr\_mi(k) = 0 \tag{37}$$

[MATH. 38]

When $-\sigma\_mrg \leq \sigma\_l\_mi(k)$ $$R\_p\_rbl\_mi(k) = |\sigma\_l\_mi(k) + \sigma\_mrg| \tag{38}$$

[MATH. 39]

When $\sigma\_l\_mi(k) < -\sigma\_mrg$ $$R\_p\_rbl\_mi(k) = 0 \tag{39}$$

Note that, in a case where the host vehicle 3 travels on a road where a median strip or a center line is present, a track boundary risk potential with respect to the median strip or the center line can be calculated by the same method as described above.

Next, a description will be given of a method of calculating the first evaluation function J_1 in the first evaluation function calculator 21 described above. The subscript "i" of various parameters used for calculation by the first evaluation function calculator 21 represents i=11 to 13.

The first evaluation function calculator 21 calculates the first evaluation function J_1 by using three application predicted positions Z_mi_r from the trajectory determiner 30 as described below, on the basis of the method and principle of calculating the risk potential R_p_mi_vj_v, the right side track boundary risk potential R_p_rbr_mi, and the left side track boundary risk potential R_p_rbl_mi described above. These application predicted positions Z_mi_r are obtained by applying a reference input r described later to the above-described three predicted positions Z_mi, as described later.

Since the application predicted position Z_mi_r obtained by applying the reference input r to the predicted position Z_mi is used in the first evaluation function calculator 21, in the following description, similarly to the application predicted position Z_mi_r, the various parameters described above to which "_r" is added to the end thereof are used. The same applies to the second evaluation function calculator 22 and the third evaluation function calculator 23.

The first evaluation function calculator 21 first calculates an x coordinate deviation dx_mi_vj_r(k:k) and a y coordinate deviation dy_mi_vj_r(k:k) at the current control time by the following formulas (40) and (41).

[MATH. 40]

$$dx\_mi\_vj\_r(k:k) = x\_mi\_r(k) - x\_vj(k:k) \tag{40}$$

[MATH. 41]

$$dy\_mi\_vj\_r(k:k) = y\_mi\_r(k) - y\_vj(k:k) \tag{41}$$

In the above formula (40), x_mi_r is an X coordinate value of the application predicted position Z_mi_r, and x_vj(k:k) is an X coordinate value of the current position W_vj(k:k) of the interference object such as the traffic participant. In addition, y_mi_r in the above formula (41) is a Y coordinate value of the application predicted position Z_mi_r, and y_vj(k:k) is a Y coordinate value of the current position W_vj(k:k) of the interference object.

Next, an x coordinate deviation dx_mi_vj_r(k:k+kmi) and a y coordinate deviation dy_mi_vj_r(k:k+kmi) at predicted time k+kmi are calculated by the following formulas (42) and (43).

[MATH. 42]

$$dx\_mi\_vj\_r(k:k+kmi)=x\_mi\_r(k)-x\_vj(k:k+kmi) \quad (42)$$

[MATH. 43]

$$dy\_mi\_vj\_r(k:k+kmi)=y\_mi\_r(k)-y\_vj(k:k+kmi) \quad (43)$$

In the above formula (42), x_vj(k:k+kmi) is an X coordinate value of a predicted position W_vj(k:k+kmi) of the interference object, and in the above formula (43), y_vj(k:k+kmi) is a Y coordinate value of the predicted position W_vj(k:k+kmi) of the interference object.

Further, a transformed x coordinate deviation dx_mi_vj_v_r(k:k) and a transformed y coordinate deviation dy_mi_vj_v_r(k:k) at the current control time are calculated by the following formulas (44) and (45).

[MATH. 44]

$$dx\_mi\_vj\_v\_r(k:k)=dx\_mi\_vj\_r(k:k)\cdot\cos(\theta\_vj(k:k))+ dy\_mi\_vj\_r(k:k)\cdot\sin(\theta\_vj(k:k)) \quad (44)$$

[MATH. 45]

$$dy\_mi\_vj\_v\_r(k:k)=dy\_mi\_vj\_r(k:k)\cdot\cos(\theta\_vj(k:k))- dx\_mi\_vj\_r(k:k)\cdot\sin(\theta\_vj(k:k)) \quad (45)$$

These deviations dx_mi_vj_v_r and dy_mi_vj_v_r correspond to values obtained by transforming the deviations dx_mi_vj_r and dy_mi_vj_r in the coordinate system of the host vehicle 3 described above into the coordinate system of the interference object.

Next, a transformed x coordinate deviation dx_mi_vj_v_r(k:k+kmi) and a transformed y coordinate deviation dy_mi_vj_v_r(k:k+kmi) at the predicted time k+kmi are calculated by the following formulas (46) and (47).

[MATH. 46]

$$dx\_mi\_vj\_v\_r(k:k+kmi)=dx\_mi\_vj\_r(k:k+kmi)\cdot\cos (\theta\_vj(k:k+kmi))+dy\_mi\_vj\_r(k:k+kmi)\cdot\sin(\theta\_vj (k:k+kmi)) \quad (46)$$

[MATH. 47]

$$dy\_mi\_vj\_v\_r(k:k+kmi)=dy\_mi\_vj\_r(k:k+kmi)\cdot\cos (\theta\_vj(k:k+kmi))+dy\_mi\_vj\_r(k:k+kmi)\cdot\sin(\theta\_vj (k:k+kmi)) \quad (47)$$

These deviations dx_mi_vj_v_r(k:k+kmi) and dy_mi_vj_v_r(k:k+kmi) correspond to values obtained by transforming the deviations dx_mi_vj_r(k:k+kmi) and dy_mi_vj_r(k:k+kmi) in the coordinate system of the host vehicle 3 described above into the coordinate system of the interference object.

Further, an x-direction risk potential R_px_mi_vj_v_r(k:k) is calculated by searching a map (not illustrated) depending on the transformed x coordinate deviation dx_mi_vj_v_r(k:k) described above. In this case, a map similar to that in FIG. 7 described above is used.

In addition, a y-direction risk potential R_py_mi_vj_v_r(k:k) is calculated by searching a map (not illustrated) depending on the transformed y coordinate deviation dy_mi_vj_v_r(k:k). In this case, a map similar to that in FIG. 8 described above is used.

Next, a risk potential R_p_mi_vj_v_r(k:k) at the current control time k is calculated by the following formula (48).

[MATH. 48]

$$R\_p\_mi\_vj\_v\_r(k:k)=R\_px\_mi\_vj\_v\_r(k:k)\cdot R\_py\_mi\_vj\_v\_r(k:k) \quad (48)$$

Further, an x-direction risk potential R_px_mi_vj_v_r(k:k+kmi) is calculated by searching the map used for calculation of the x-direction risk potential R_px_mi_vj_v_r(k:k) depending on the transformed x coordinate deviation dx_mi_vj_v_r(k:k+kmi) described above.

In addition, a y-direction risk potential R_py_mi_vj_v_r(k:k+kmi) is calculated by searching the map used for calculation of the y-direction risk potential R_py_mi_vj_v_r(k:k) depending on the transformed y coordinate deviation dy_mi_vj_v_r(k:k+kmi) described above.

Next, a risk potential R_p_mi_vj_v_r(k:k+kmi) at the predicted time k+kmi is calculated by the following formula (49). Note that, in the present embodiment, the risk potentials R_p_mi_vj_v_r(k:k) and R_p_mi_vj_v_r(k:k+kmi) correspond to interference degree parameters.

[MATH. 49]

$$R\_p\_mi\_vj\_v\_r(k:k+kmi)=R\_px\_mi\_vj\_v\_r(k:k+kmi)\cdot R\_py\_mi\_vj\_v\_r(k:k+kmi) \quad (49)$$

A right side track boundary function σ_r_mi_r and a left side track boundary function σ_l_mi_r at the predicted position Z_mi of the host vehicle 3 are defined as shown in the following formulas (50) and (51).

[MATH. 50]

$$\sigma\_r\_mi\_r(k)=y\_mi\_r(k)-a\_rbr(k)\cdot x\_mi\_r(k)-b\_rbr(k) \quad (50)$$

[MATH. 51]

$$\sigma\_l\_mi\_r(k)=y\_mi\_r(k)-a\_rbl(k)\cdot x\_mi\_r(k)-b\_rbl(k) \quad (51)$$

Further, a right side track boundary risk potential R_p_rbr_mi_r is calculated by the following formulas (52) and (53), and a left side track boundary risk potential R_p_rbl_mi_r is calculated by the following formulas (54) and (55). Note that, in the present embodiment, the right side and left side track boundary risk potentials R_p_rbr_mi_r and R_p_rbl_mi_r correspond to the interference degree parameters.

[MATH. 52]

When σ_r_mi_r(k)≤σ_mrg $$R\_p\_rbr\_mi\_r(k)=|\sigma\_r\_mi\_r(k)-\sigma\_mrg| \quad (52)$$

[MATH. 53]

When σ_mrg<σ_r_mi_r(k)

$$R\_p\_rbr\_mi\_r(k)=0 \quad (53)$$

[MATH. 54]

When −σ_mrg≤σ_l_mi_r(k)

$$R\_p\_rbl\_mi\_r(k)=|\sigma\_l\_mi\_r(k)+\sigma\_mrg| \quad (54)$$

[MATH. 55]

When σ_l_mi_r(k)<−σ_mrg(k)

$$R\_p\_rbl\_mi\_r(k)=0 \quad (55)$$

Finally, the first evaluation function J_1 is calculated by the following formula (56).

[MATH. 56]

$$J\_1(k) = \sum_{j=1}^{n}(R\_p\_m11\_vj\_v\_r(k{:}k) + R\_p\_m12\_vj\_v\_r(k{:}k) + \\ R\_p\_m13\_vj\_v\_r(k{:}k) + R\_p\_m11\_vj\_v\_r(k{:}k + km11) + \\ R\_p\_m12\_vj\_v\_r(k{:}k + km12) + R\_p\_m13\_vj\_v\_r(k{:}k + km13)) + \\ R\_p\_rbr\_m11\_r(k) + R - p\_rbl\_m11\_r(k) + \\ R\_p\_rbr\_m12\_r(k) + R\_p\_rbl\_m12\_r(k) + \\ R\_p\_rbr\_m13\_r(k) + R\_p\_rbl\_m13\_r(k) \qquad (56)$$

In the above formula (56), n represents the number of the interference objects such as the traffic participants located in front of the host vehicle 3. As shown in the formula (56), the first evaluation function J_1 is calculated as a sum of a sum total of the risk potentials R_p_mi_vj_v_r of three predicted positions Z_mi (i=11 to 13) at the current control time k and the predicted time k+kmi (i=11 to 13), and the right side and left side track boundary risk potentials R_p_rbr_mi_r and R_p_rbl_mi_r.

Next, a description will be given of a method of calculating the second evaluation function J_2 in the second evaluation function calculator 22 described above. As described below, the second evaluation function calculator 22 calculates the second evaluation function J_2 by a method similar to that of the first evaluation function calculator 21 by using an application second predicted position Z_m2_r from the trajectory determiner 30. The application predicted position Z_m2_r is obtained by applying the reference input r to the second predicted position Z_m2.

The second evaluation function calculator 22 first calculates an x coordinate deviation dx_m2_vj_r(k:k+km2) and a y coordinate deviation dy_m2_vj_r(k:k+km2) at the predicted time k+km2 by the following formulas (57) and (58).

[MATH. 57]

$$dx\_m2\_vj\_r(k{:}k+km2)=x\_m2\_r(k)-x\_vj(k{:}k+km2) \qquad (57)$$

[MATH. 58]

$$dy\_m2\_vj\_r(k{:}k+km2)=y\_m2\_r(k)-y\_vj(k{:}k+km2) \qquad (58)$$

In the above formula (57), x_vj(k:k+km2) is an X coordinate value of a predicted position W_vj(k:k+km2) of the interference object, and in the above formula (58), y_vj(k:k+km2) is a Y coordinate value of the predicted position W_vj(k:k+km2) of the interference object.

Further, a transformed x coordinate deviation dx_m2_vj_v_r(k:k+km2) and a transformed y coordinate deviation dy_m2_vj_v_r(k:k+km2) at the predicted time k+km2 are calculated by the following formulas (59) and (60).

[MATH. 59]

$$dx\_m2\_vj\_v\_r(k{:}k+km2)=dx\_m2\_vj\_r(k{:}k+km2){\cdot}\cos(\theta\_vj(k{:}k+km2))+dy\_m2\_vj\_r(k{:}k+km2){\cdot}\sin(\theta\_vj(k{:}k+km2)) \qquad (59)$$

[MATH. 60]

$$dy\_m2\_vj\_v\_r(k{:}k+km2)=dy\_m2\_vj\_r(k{:}k+km2){\cdot}\cos(\theta\_vj(k{:}k+km2))-dx\_m2\_vj\_r(k{:}k+km2){\cdot}\sin(\theta\_vj(k{:}k+km2)) \qquad (60)$$

Next, an x-direction risk potential R_px_m2_vj_v_r(k:k+km2) is calculated by searching a map (not illustrated) depending on the transformed x coordinate deviation dx_m2_vj_v_r(k:k+km2) described above. In this case, a map similar to that in FIG. 7 described above is used.

In addition, a y-direction risk potential R_py_m2_vj_v_r(k:k+km2) is calculated by searching a map (not illustrated) depending on the transformed y coordinate deviation dy_m2_vj_v_r(k:k+km2) described above. In this case, a map similar to that in FIG. 8 described above is used.

Next, a risk potential R_p_m2_vj_v_r(k:k+km2) at the predicted time k+km2 is calculated by the following formula (61).

[MATH. 61]

$$R\_p\_m2\_vj\_v\_r(k{:}k+km2)=R\_px\_m2\_vj\_v\_r(k{:}k+km2){\cdot}R\_py\_m2\_vj\_v\_r(k{:}k+km2) \qquad (61)$$

In addition, a right side track boundary function σ_r_m2_r and a left side track boundary function σ_l_m2_r at the second predicted position Z_m2 of the host vehicle 3 are defined as shown in the following formulas (62) and (63).

[MATH. 62]

$$\sigma\_r\_m2\_r(k)=y\_m2\_r(k)-a\_rbr(k){\cdot}x\_m2\_r(k)-b\_rbr(k) \qquad (62)$$

[MATH. 63]

$$\sigma\_l\_m2\_r(k)=y\_m2\_r(k)-a\_rbl(k){\cdot}x\_m2\_r(k)-b\_rbl(k) \qquad (63)$$

Further, a right side track boundary risk potential R_p_rbr_m2_r is calculated by the following formulas (64) and (65), and a left side track boundary risk potential R_p_rbl_m2_r is calculated by the following formulas (66) and (67).

[MATH. 64]

When $\sigma\_r\_m2\_r(k){\leq}\sigma\_mrg$ $$R\_p\_rbr\_m2\_r(k)=|\sigma\_r\_m2\_r(k)-\sigma\_mrg| \qquad (64)$$

[MATH. 65]

When $\sigma\_mrg<\sigma\_r\_m2\_r(k)$ $$R\_p\_rbr\_m2\_r(k)=0 \qquad (65)$$

[MATH. 66]

When $-\sigma\_mrg{\leq}\sigma\_l\_m2\_r(k)$ $$R\_p\_rbl\_m2\_r(k)=|\sigma\_l\_m2\_r(k)+\sigma\_mrg| \qquad (66)$$

[MATH. 67]

When $\sigma\_l\_m2\_r(k)<-\sigma\_mrg$ $$R\_p\_rbl\_m2\_r(k)=0 \qquad (67)$$

Finally, the second evaluation function J_2 is calculated by the following formula (68).

[MATH. 68]

$$J\_2(k) = \sum_{j=1}^{n} R\_p\_m2\_vj\_v\_r(k{:}k+km2) + R\_p\_rbr\_m2\_r(k) + R\_p\_rbl\_m2\_r(k) \qquad (68)$$

As shown in the formula (68), the second evaluation function J_2 is calculated as a sum of a sum total of the risk potentials R_p_m2_vj_v_r at the second predicted position Z_m2, and the right side and left side track boundary risk potentials R_p_rbr_m2_r and R_p_rbl_m2_r.

Next, a description will be given of a method of calculating the third evaluation function J_3 in the third evaluation function calculator 23 described above. As described below, the third evaluation function calculator 23 calculates the third evaluation function J_3 by a method similar to those of the first and second evaluation function calculators 21 and 22 by using an application third predicted position Z_m3_r from the trajectory determiner 30. The application predicted position Z_m3_r is obtained by applying the reference input r to the third predicted position Z_m3.

The third evaluation function calculator 23 first calculates an x coordinate deviation dx_m3_vj_r(k:k+km3) and a y coordinate deviation dy_m3_vj_r(k:k+km3) at the predicted time k+km3 by the following formulas (69) and (70).

[MATH. 69]

$$dx\_m3\_vj\_r(k{:}k+km3)=x\_m3\_r(k)-x\_vj(k{:}k+km3) \qquad (69)$$

[MATH. 70]

$$dy\_m3\_vj\_r(k{:}k+km3)=y\_m3\_r(k)-y\_vj(k{:}k+km3) \qquad (70)$$

In the above formula (69), x_vj(k:k+km3) is an X coordinate value of a predicted position W_vj(k:k+km3) of the interference object, and in the above formula (70), y_vj(k:k+km3) is a Y coordinate value of the predicted position W_vj(k:k+km3) of the interference object.

Further, a transformed x coordinate deviation dx_m3_vj_v_r(k:k+km3) and a transformed y coordinate deviation dy_m3_vj_v_r(k:k+km3) at the predicted time k+km3 are calculated by the following formulas (71) and (72).

[MATH. 71]

$$dx\_m3\_vj\_v\_r(k{:}k+km3)=dx\_m3\_vj\_r(k{:}k+km3)\cdot\cos(\theta\_vj(k{:}k+km3))+dy\_m3\_vj\_r(k{:}k+km3)\cdot\sin(\theta\_vj(k{:}k+km3)) \qquad (71)$$

[MATH. 72]

$$dy\_m3\_vj\_v\_r(k{:}k+km3)=dy\_m3\_vj\_r(k{:}k+km3)\cdot\cos(\theta\_vj(k{:}k+km3))-dx\_m3\_vj\_r(k{:}k+km3)\cdot\sin(\theta\_vj(k{:}k+km3)) \qquad (72)$$

Next, an x-direction risk potential R_px_m3_vj_v_r(k:k+km3) is calculated by searching a map (not illustrated) depending on the transformed x coordinate deviation dx_m3_vj_v_r(k:k+km3) described above. In this case, a map similar to that in FIG. 7 described above is used.

In addition, a y-direction risk potential R_py_m3_vj_v_r(k:k+km3) is calculated by searching a map (not illustrated) depending on the transformed y coordinate deviation dy_m3_vj_v_r(k:k+km3) described above. In this case, a map similar to that in FIG. 8 described above is used.

Next, a risk potential R_ρ_m3_vj_v_r(k:k+km3) at the predicted time k+km3 is calculated by the following formula (73).

[MATH. 73]

$$R\_p\_m3\_vj\_v\_r(k{:}k+km3)=R\_px\_m3\_vj\_v\_r(k{:}k+km3)\cdot R\_py\_m3\_vj\_v\_r(k{:}k+km3) \qquad (73)$$

In addition, a right side track boundary function σ_r_m3_r and a left side track boundary function σ_l_m3_r at the third predicted position Z_m3 of the host vehicle 3 are defined as shown in the following formulas (74) and (75).

[MATH. 74]

$$\sigma\_r\_m3\_r(k)=y\_m3\_r(k)-a\_rbr(k)\cdot x\_m3\_r(k)-b\_rbr(k) \qquad (74)$$

[MATH. 75]

$$\sigma\_l\_m3\_r(k)=y\_m3\_r(k)-a\_rbl(k)\cdot x\_m3\_r(k)-b\_rbl(k) \qquad (75)$$

Further, a right side track boundary risk potential R_p_rbr_m3_r is calculated by the following formulas (76) and (77), and a left side track boundary risk potential R_p_rbl_m3_r is calculated by the following formulas (78) and (79).

[MATH. 76]

When $\sigma\_r\_m3\_r(k) \leq \sigma\_mrg$ $$R\_p\_rbr\_m3\_r(k)=|\sigma\_r\_m3\_r(k)-\sigma\_mrg| \qquad (76)$$

[MATH. 77]

When $\sigma\_mrg < \sigma\_r\_m3\_r(k)$ $$R\_p\_rbl\_m3\_r(k)=|l\_m3\_r(k)+\sigma\_mrg| \qquad (77)$$

[MATH. 78]

When $-\sigma\_l\_mrg \leq \sigma\_l\_m3\_r(k)$ $$R\_p\_rbl\_m3\_r(k)=|\sigma\_l\_m3\_r(k)+\sigma\_mrg| \qquad (78)$$

[MATH. 79]

When $\sigma\_l\_m3\_r(k) < -\sigma\_mrg$ $$R\_p\_rbl\_m3\_r(k)=0 \qquad (79)$$

Finally, the third evaluation function J_3 is calculated by the following formula (80).

[MATH. 80]

$$J\_3(k) = \sum_{j=1}^{n} R\_p\_m3\_vj\_v\_r(k{:}k+km3) + R\_p\_rbr\_m3\_r(k) + R\_p\_rbl\_m3\_r(k) \qquad (80)$$

As shown in the formula (80), the third evaluation function J_3 is calculated as a sum of a sum total of the risk potentials R_ρ_m3_vj_v_r at the third predicted position Z_m3, and the right side and left side track boundary risk potentials R_p_rbr_m3_r and R_p_rbl_m3_r.

Figure 12:
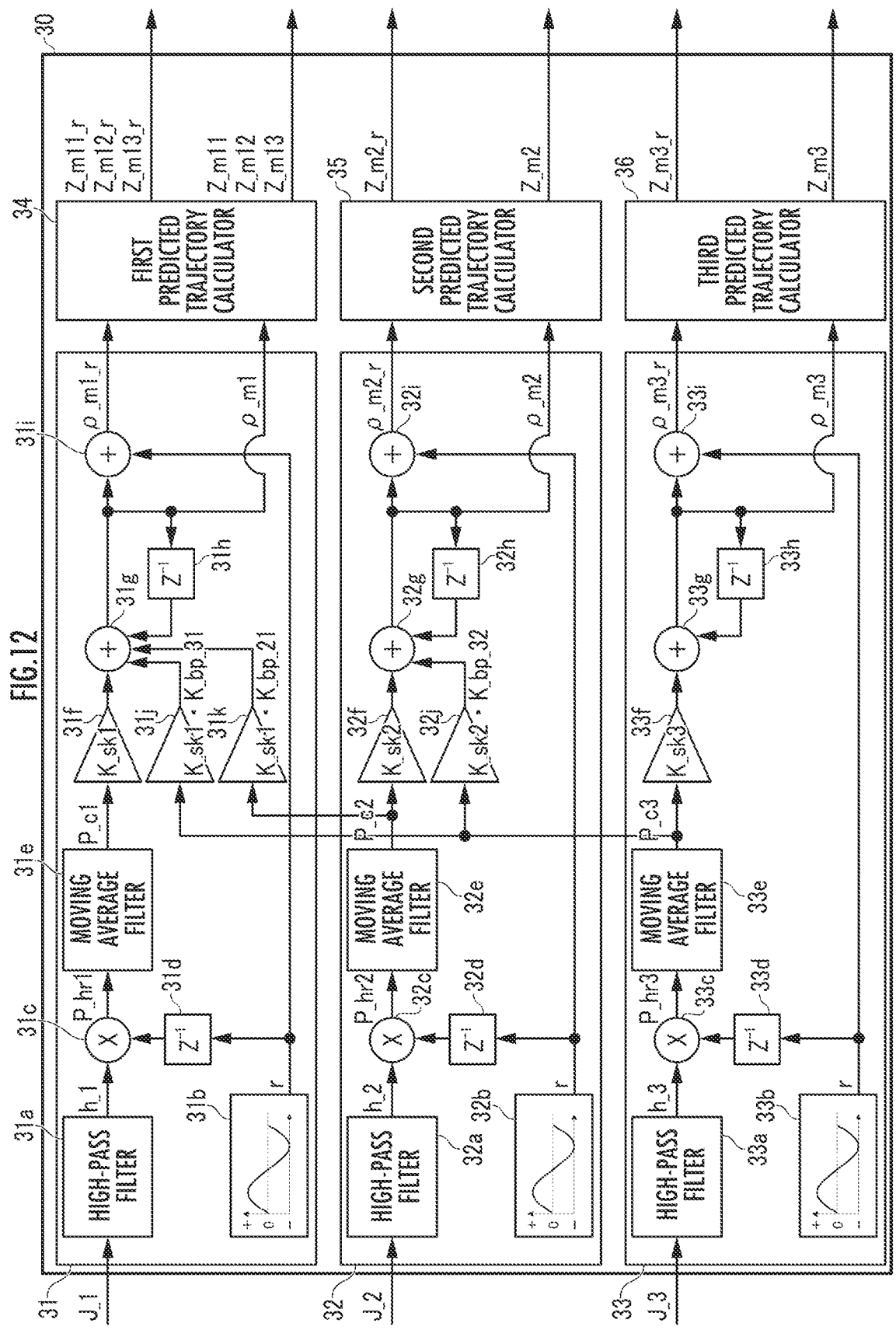
FIG. 12 is a block diagram illustrating a configuration of a trajectory determiner.

Next, the trajectory determiner 30 mentioned above will be described. As illustrated in FIG. 12, the trajectory determiner 30 includes first to third extreme value search controllers 31 to 33 and first to third predicted trajectory calculators 34 to 36. In these first to third extreme value search controllers 31 to 33, predicted curvatures ρ_m1 to ρ_m3 that are curvatures of the first to third predicted trajectories are calculated by a method described later. The predicted curvatures ρ_m1 to ρ_m3 correspond to the reciprocals of the curvature radii R_m1 to R_m3 in FIG. 6 described above.

Figure 13:
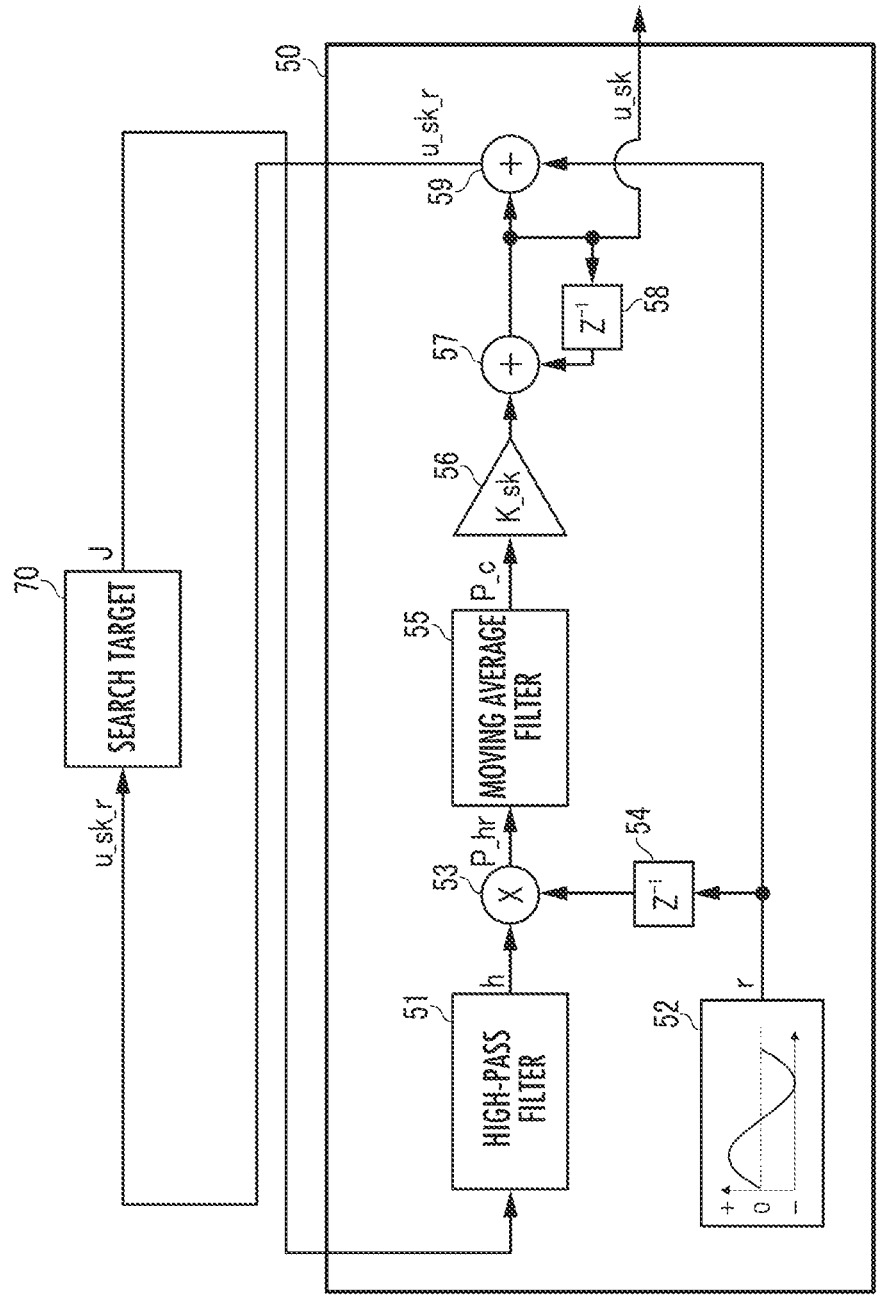
FIG. 13 is a block diagram illustrating a configuration of an extreme value search controller.

Hereinafter, descriptions will be given of a method of calculating the first to third extreme value search controllers 31 to 33, and a principle thereof, by using an extreme value search controller 50 illustrated in FIG. 13 as an example. As illustrated in the figure, in a case where a system that outputs an evaluation function J when an application search input u_sk_r is input is a search target 70, the extreme value search controller 50 calculates a search input u_sk and the application search input u_sk_r by using the evaluation function J.

The extreme value search controller 50 includes a high-pass filter 51, a reference input generator 52, two delay elements 54 and 58, a multiplier 53, a moving average filter 55, an amplification element 56, and two addition elements 57 and 59.

In the high-pass filter 51, a filter value h is calculated by the following formula (81).

[MATH. 81]

$$h(k)=J(k)-J(k-1) \tag{81}$$

As shown in the above formula (81), the filter value h is calculated as a difference between a current value J(k) and a previous value J(k−1) of the evaluation function J. In addition, the high-pass filter 51 is for causing a frequency component to pass, the frequency component being caused by the reference input r described later and included in the evaluation function value J. In this case, the filter value h may be calculated by using a filter algorithm (Butterworth high-pass filter algorithm or bandpass filter algorithm) that causes a frequency component of the reference input r described later to pass, instead of the above formula (81).

The reference input generator 52 generates the reference input r. Note that, as a waveform of the reference input r, for example, a sine wave, a cosine wave, a triangular wave, a trapezoidal wave, a rectangular wave, or the like is used.

Further, the reference input r is input to the multiplier 53 via the delay element 54, and the multiplier 53 calculates an intermediate value P_hr by the following formula (82).

[MATH. 82]

$$P\_hr(k)=h(k) \cdot r(k-1) \tag{82}$$

In the moving average filter 55, a moving average value P_c is calculated by the following formula (83).

[MATH. 83]

$$P\_c(k) = \frac{1}{n\_r+1} \sum_{i=0}^{n\_r} P\_hr(k-i) \tag{83}$$

In the formula (83), the number of taps n_r+1 of the moving average value P_c is set so that a product ΔT·(n_r+1) of the number of taps n_r+1 and the control period ΔT is equal to a period Tr of the reference input r or is an integral multiple of the period Tr, to remove the frequency component of the reference input r from the moving average value P_c.

Next, to the addition element 57, the moving average value P_c is input in a state of being amplified by a predetermined gain K_sk by the amplification element 56, and the search input u_sk is input via the delay element 58.

Then, in the addition element 57, the search input u_sk is calculated by an integral control algorithm shown in the following formula (84).

[MATH. 84]

$$u\_sk(k)=u\_sk(k-1)+K\_sk \cdot P\_c(k) \tag{84}$$

Further, in the addition element 59, an application search input u_sk_r is calculated by the following formula (85).

[MATH. 85]

$$u\_sk\_r(k)=u\_sk(k)+r(k) \tag{84}$$

Next, descriptions will be given of a reason why the search input u_sk and the application search input u_sk_r are calculated by using the above calculation algorithm, and a principle thereof. In the case of the present embodiment, as described above, since the evaluation function J is calculated to include the sum total of various risk potentials, the sum total of the risk potentials can be reduced by performing calculation so that the evaluation function J has the minimum value.

For this reason, in the present embodiment, the following principle is used to calculate the search input u_sk so that the evaluation function J has the minimum value. First, since the evaluation function J is calculated by using the application search input u_sk_r, an oscillatory behavior with a predetermined amplitude is exhibited due to a characteristic (periodic function) of the reference input r included in the application search input u_sk_r.

Figure 14:
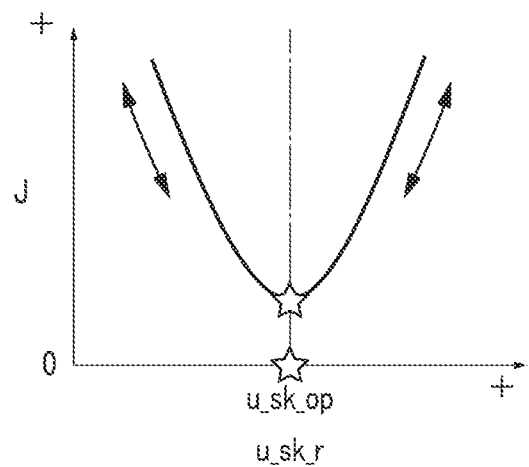
FIG. 14 is a diagram illustrating a relationship between an application search input and an evaluation function.

Here, in a case where it is assumed that a relationship between the application search input u_sk_r and the evaluation function J is represented as, for example, a curve illustrated in FIG. 14, the oscillatory behavior of the evaluation function J due to the reference input r has a certain inclination as indicated by an arrow in the figure. Note that u_sk_op in FIG. 14 is a predetermined value of the application search input u_sk_r.

Meanwhile, since the moving average value P_c described above is a moving average value of a multiplied value of the filter value h of the evaluation function J and the reference input r, it can be regarded as a pseudo correlation function corresponding to a correlation function of the evaluation function J and the reference input r.

Figure 15:
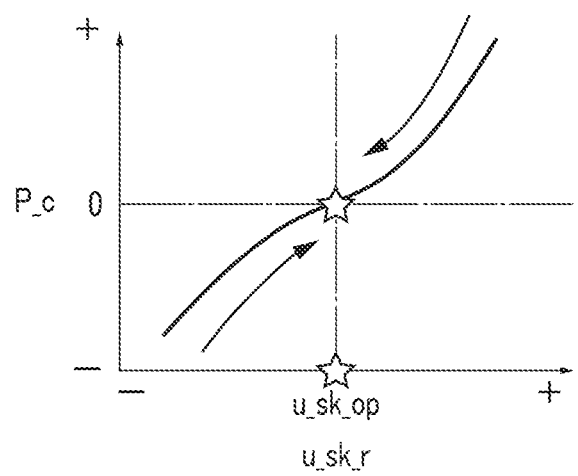
FIG. 15 is a diagram illustrating a relationship between a moving average value and the application search input.

For that reason, when the moving average value P_c that can be regarded as the pseudo correlation function is a positive value, the inclination of the evaluation function J indicates a positive value, and when the moving average value P_c is a negative value, the inclination of the evaluation function J indicates a negative value. In addition, the moving average value P_c is calculated by the formula (83) described above, thereby being calculated in a state where the frequency component of the reference input r is removed. For the above reason, a relationship between the moving average value P_c and the application search input u_sk_r can be expressed as, for example, a monotone increasing function as illustrated in FIG. 15. That is, the moving average value P_c represents a direction in which the evaluation function J changes when the application search input u_sk_r is changed.

Thus, to calculate the application search input u_sk_r so that the evaluation function J has the minimum value, it is sufficient to calculate the moving average value P_c so that the inclination of the function illustrated in FIG. 15 has a value 0. That is, it is sufficient to calculate the application search input u_sk_r, in other words, the search input u_sk by using a feedback control algorithm so that the moving average value P_c converges to the value 0.

According to the above principle, the extreme value search controller 50 calculates the search input u_sk as a solution in which the evaluation function J has the minimum value by using the integral control algorithm of the formula (84).

In the cases of the first to third extreme value search controllers 31 to 33 of the present embodiment, the predicted curvatures ρ_m1 to ρ_m3 as the search input u_sk are calculated on the basis of a principle similar to that of the extreme value search controller 50 described above.

First, the first extreme value search controller 31 will be described. The first extreme value search controller 31 calculates the predicted curvature ρ_m1 by a method described below, and the predicted curvature ρ_m1 corresponds to the reciprocal of the curvature radius R_m1 of the first predicted trajectory described above.

As illustrated in FIG. 12, the first extreme value search controller 31 includes a high-pass filter 31a, a reference input generator 31b, two delay elements 31d and 31h, a multiplier 31c, a moving average filter 31e, three amplification elements 31f, 31j, and 31k, and two addition elements 31g and 31i.

In the high-pass filter 31a, a filter value h_1 is calculated by the following formula (86).

[MATH. 86]

$$h\_1(k)=J\_1(k-1) \tag{86}$$

The reference input generator 31b generates the reference input r described above. The reference input r is input to the multiplier 31c via the delay element 31d, and the multiplier 31c calculates an intermediate value P_hr1 by the following formula (87).

[MATH. 87]

$$P\_hr1(k)=h\_1(k)\cdot r(k-1) \tag{87}$$

In the moving average filter 31e, a moving average value P_c1 is calculated by the following formula (88). Note that, in the present embodiment, the moving average value P_c1 corresponds to an amount of correction.

[MATH. 88]

$$P\_c1(k) = \frac{1}{n\_r+1}\sum_{i=0}^{n\_r}P\_hr1(k-i) \tag{88}$$

Next, to the addition element 31g, the moving average value P_c1 is input in a state of being amplified by a predetermined gain K_sk1 by the amplification element 31f, a moving average value P_c2 described later is input in a state of being amplified by a gain K_sk1·K_bp_21 by the amplification element 31k, and a moving average value P_c3 described later is input in a state of being amplified by a gain K_sk1·K_bp_32 by the amplification element 31j.

Figure 16:
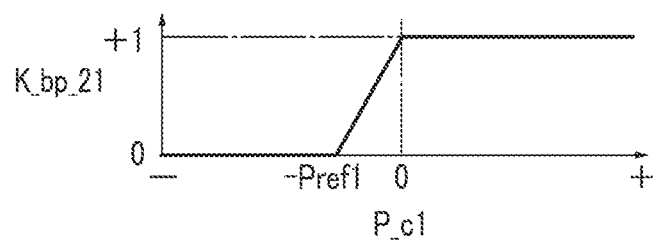
FIG. 16 is a diagram illustrating a map used for calculation of a gain.

Here, when P_c2≥0, a gain K_bp_21 is calculated by searching a map illustrated in FIG. 16 depending on the moving average value P_c1. Pref1 in FIG. 16 is a positive predetermined value. In the map, the gain K_bp_21 is set to a value 1 in a range of 0<P_c1, is set to a value 0 in a range of P_c1<−Pref1, and is set to be closer to the value 1 as the moving average value P_c1 is larger in a range of −Pref1<P_c1<0.

Figure 17:
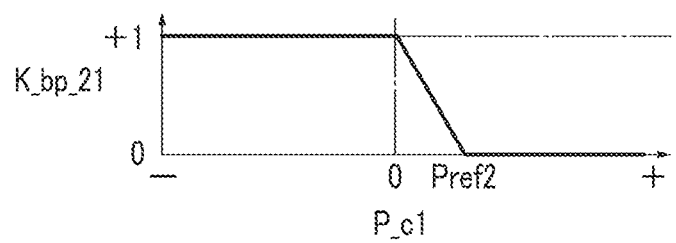
FIG. 17 is a diagram illustrating a map used for calculation of the gain.

Furthermore, when P_c2<0, the gain K_bp_21 is calculated by searching a map illustrated in FIG. 17 depending on the moving average value P_c1. Pref2 in FIG. 17 is a positive predetermined value, and Pref1 and Pref2 may be the same value, or may be different values from each other. In the map, the gain K_bp_21 is set to a value 1 in a range of P_c1<0, is set to a value 0 in a range of Pref2<P_c1 and is set to be closer to the value 0 as the moving average value P_c1 is larger in a range of 0≤P_c1≤Pref2.

Figure 18:
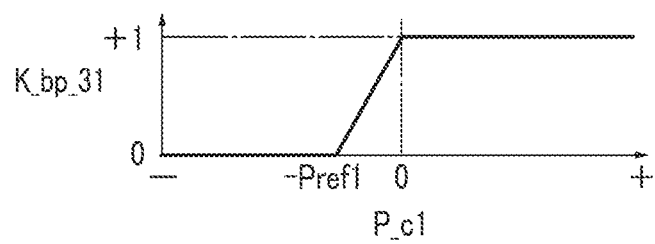
FIG. 18 is a diagram illustrating a map used for calculation of a gain.

Further, when P_c2≥0 & P_c3≥0, a gain K_bp_31 is calculated by searching a map illustrated in FIG. 18 depending on the moving average value P_c1. In the map, the gain K_bp_31 is set to a value 1 in the range of 0<P_c1, is set to a value 0 in the range of P_c1<−Pref1, and is set to be closer to the value 1 as the moving average value P_c1 is larger in the range of −Pref1≤P_c1≤0.

Figure 19:
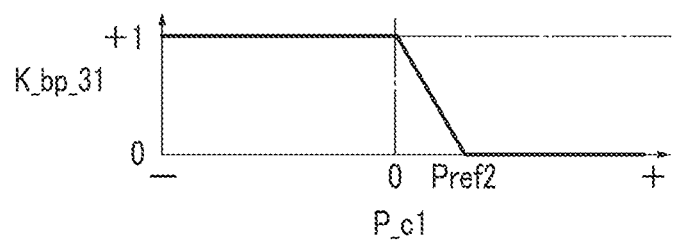
FIG. 19 is a diagram illustrating a map used for calculation of the gain.

Furthermore, when P_c2<0 & P_c3<0, the gain K_bp_31 is calculated by searching a map illustrated in FIG. 19 depending on the moving average value P_c1. In the map, the gain K_bp_31 is set to a value 1 in the range of P_c1<0, is set to a value 0 in the range of Pref2<P_c1, and is set to be closer to the value 0 as the moving average value P_c1 is larger in the range of 0<P_c1<Pref2.

Further, the gain K_bp_31 is calculated as a value 0 when signs of the two moving average values P_c2 and P_c3 are different from each other.

Descriptions will be given later of a reason why the two gains K_bp_21 and K_bp_31 are calculated as described above, a reason why a value P_c2·K_sk1·K_bp_21 is input from the second extreme value search controller 32 to the first extreme value search controller 31, and a reason why a value P_c3·K_sk1·K_bp_31 is input from the third extreme value search controller 33 to the first extreme value search controller 31.

Further, the predicted curvature ρ_m1 is input to the addition element 31g via the delay element 31h. Then, in the addition element 31g, the predicted curvature ρ_m1 is calculated by the following formula (89).

[MATH. 89]

$$\rho\_m1(k)=\rho\_m1(k-1)+k\_sk1\cdot(P\_c1(k)+K\_bp\_21(k)\cdot P\_c2(k)+K\_bp\_31(k)\cdot P\_c3(k)) \tag{89}$$

As shown in the above formula (89), the predicted curvature ρ_m1 is calculated by adding a value P_c1·K_sk1, the value P_c2·K_sk1·K_bp_21, and the value P_c3·K_sk1·K_bp_31 to its previous value ρ_m1(k−1), and thus is corrected (updated) by these moving average values P_c1 to P_c3. That is, the three moving average values P_c1 to P_c3 function as amounts of correction for correcting the predicted curvature ρ_m1.

Further, in the addition element 31i, an application predicted curvature ρ_m1_r is calculated by the following formula (90).

[MATH. 90]

$$\rho\_m1\_r(k)=\rho\_m1(k)+r(k) \tag{90}$$

Then, the predicted curvature ρ_m1 and the application predicted curvature ρ_m1_r calculated as described above are input from the first extreme value search controller 31 to the first predicted trajectory calculator 34.

Next, the second extreme value search controller 32 will be described. The second extreme value search controller 32 calculates the predicted curvature ρ2_m2 and an application predicted curvature ρ2_m2_r by a method described below, and the predicted curvature ρ2_m2 corresponds to the reciprocal of the curvature radius R_m2 of the second predicted trajectory described above.

As illustrated in FIG. 12, the second extreme value search controller 32 includes a high-pass filter 32a, a reference input generator 32b, two delay elements 32d and 32h, a multiplier 32c, a moving average filter 32e, two amplification elements 32f and 32j, and two addition elements 32g and 32i.

In the high-pass filter 32a, a filter value h_2 is calculated by the following formula (91).

[MATH. 91]

$$h\_2(k) = J\_2(k) - J\_2(k-1) \tag{91}$$

The reference input generator 32b generates the reference input r described above. The reference input r is input to the multiplier 32c via the delay element 32d, and the multiplier 32c calculates an intermediate value P_hr2 by the following formula (92).

[MATH. 92]

$$P\_hr2(k) = h\_2(k) \cdot r(k-1) \tag{92}$$

In the moving average filter 32e, the moving average value P_c2 is calculated by the following formula (93). Note that, in the present embodiment, the moving average value P_c2 corresponds to the amount of correction.

[MATH. 93]

$$P\_c2(k) = \frac{1}{n\_r + 1} \sum_{i=0}^{n\_r} P\_hr2(k-i) \tag{93}$$

Next, to the addition element 32g, the moving average value P_c2 is input in a state of being amplified by a predetermined gain K_sk2 by the amplification element 32f, and the moving average value P_c3 described later is input in a state of being amplified by a gain K_sk2·K_bp_32 by the amplification element 32j.

Figure 20:
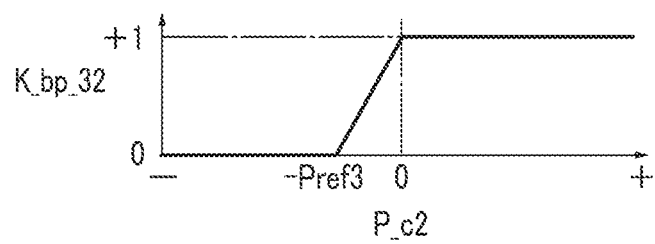
FIG. 20 is a diagram illustrating a map used for calculation of a gain.

Here, when P_c3≥0, a gain K_bp_32 is calculated by searching a map illustrated in FIG. 20 depending on the moving average value P_c2. Pref3 in FIG. 20 is a positive predetermined value. In the map, the gain K_bp_32 is set to a value 1 in a range of 0<P_c2, is set to a value 0 in a range of P_c2<−Pref3, and is set to be closer to the value 1 as the moving average value P_c2 is larger in a range of −Pref3≤P_c2≤0.

Figure 21:
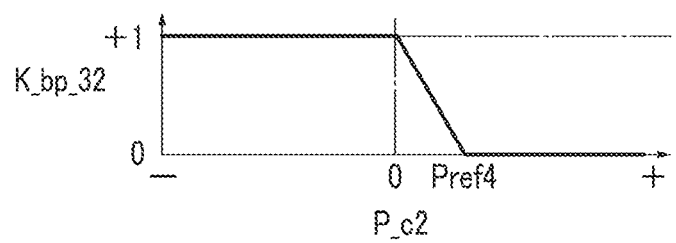
FIG. 21 is a diagram illustrating a map used for calculation of the gain.

Furthermore, when P_c3<0, the gain K_bp_32 is calculated by searching a map illustrated in FIG. 21 depending on the moving average value P_c2. Pref4 in FIG. 21 is a positive predetermined value. Here, Pref3 and Pref4 may be the same value, or may be different values from each other.

In the map, the gain K_bp_32 is set to a value 1 in a range of P_c2<0, is set to a value 0 in a range of Pref4<P_c2, and is set to be closer to the value 0 as the moving average value P_c2 is larger in a range of 0≤P_c2≤Pref4.

Descriptions will be given later of a reason why the gain K_bp_32 is calculated as described above and a reason why a value P_c3·K_sk2·K_bp_32 is input from the third extreme value search controller 33 to the second extreme value search controller 32.

Further, the predicted curvature ρ_m2 is input to the addition element 32g via the delay element 32h. Then, in the addition element 32g, the predicted curvature ρ_m2 is calculated by the following formula (94).

[MATH. 94]

$$\rho\_m2(k) = \rho\_m2(k-1) + K\_sk2 \cdot (P\_c2(k) + K\_bp\_32(k) \cdot P\_c3(k)) \tag{94}$$

As shown in the above formula (94), the predicted curvature ρ_m2 is calculated by adding a value P_c2·K_sk2 and the value P_c3·K_sk2·K_bp_32 to its previous value p_m2 (k−1), and thus is corrected (updated) by these moving average values P_c2 and P_c3. That is, the two moving average values P_c2 and P_c3 function as amounts of correction for correcting the predicted curvature p_m2.

Further, in the addition element 32i, the application predicted curvature p_m2_r is calculated by the following formula (95).

[MATH. 95]

$$\rho\_m2\_r(k) = \rho\_m2(k) + r(k) \tag{95}$$

Then, the predicted curvature p_m2 and the application predicted curvature ρ_m2_r calculated as described above are input from the second extreme value search controller 32 to the second predicted trajectory calculator 35.

Next, the third extreme value search controller 33 will be described. The third extreme value search controller 33 calculates the predicted curvature ρ_m3 and an application predicted curvature ρ_m3_r by a method described below, and the predicted curvature ρ_m3 corresponds to the reciprocal of the curvature radius R_m3 of the third predicted trajectory described above.

As illustrated in FIG. 12, the third extreme value search controller 33 includes a high-pass filter 33a, a reference input generator 33b, two delay elements 33d and 33h, a multiplier 33c, a moving average filter 33e, an amplification element 33f, and two addition elements 33g and 33i.

In the high-pass filter 33a, a filter value h_3 is calculated by the following formula (96).

[MATH. 96]

$$h\_3(k) = J\_3(k) - J\_3(k-1) \tag{96}$$

The reference input generator 33b generates the reference input r described above. The reference input r is input to the multiplier 33c via the delay element 33d, and the multiplier 33c calculates an intermediate value P_hr3 by the following formula (97).

[MATH. 97]

$$P\_hr3(k) = h\_3(k) \cdot r(k-1) \tag{97}$$

In the moving average filter 33e, the moving average value P_c3 is calculated by the following formula (98). Note that, in the present embodiment, the moving average value P_c3 corresponds to the amount of correction.

[MATH. 98]

$$P\_c3(k) = \frac{1}{n\_r + 1} \sum_{i=0}^{n\_r} P\_hr3(k-i) \tag{98}$$

Next, to the addition element 33g, the moving average value P_c3 is input in a state of being amplified by a predetermined gain K_sk3 by the amplification element 33f, and the predicted curvature ρ_m3 is input via the delay element 33h.

Then, in the addition element 33g, the predicted curvature $\rho\_m3$ is calculated by the following formula (99).

[MATH. 99]

$$\rho\_m3(k) = \rho\_m3(k-1) + k\_sk3 \cdot P\_c3(k) \tag{99}$$

Further, in the addition element 33i, the application predicted curvature $\rho\_m3\_r$ is calculated by the following formula (100).

[MATH. 100]

$$\rho\_m3\_r(k) = \rho\_m3(k) + r(k) \tag{100}$$

Then, the predicted curvature $\rho\_m3$ and the application predicted curvature $\rho\_m3\_r$ calculated as described above are input from the third extreme value search controller 33 to the third predicted trajectory calculator 36.

Next, the first predicted trajectory calculator 34 mentioned above will be described. The first predicted trajectory calculator 34 calculates the three predicted positions Z_m11 to Z_m13 and three application predicted positions Z_m11_r to Z_m13_r on the basis of the principle described above by using the predicted curvature $\rho\_m1$ and the application predicted curvature $\rho\_m1\_r$ from the first extreme value search controller 31.

First, the X coordinate value x_m11 and the Y coordinate value y_m11 of the predicted position Z_m11, the X coordinate value x_m12 and the Y coordinate value y_m12 of the predicted position Z_m12, and the X coordinate value x_m13 and the Y coordinate value y_m13 of the predicted position Z_m13 are calculated by the formulas (1) to (8) described above.

Next, a curvature radius R_m1_r of the first predicted trajectory is calculated by the following formulas (101) and (102).

[MATH. 101]

When $|\rho\_m1| > \rho\_min$ $$R\_m1\_r(k) = 1/\rho\_m1\_r(k) \tag{101}$$

[MATH. 102]

When $|\rho\_m1| \leq \rho\_min$ $$R\_m1\_r(k) = \mathrm{Sign}(\rho\_m1\_r(k))/\rho\_min \tag{102}$$

In the above formulas (101) and (102), p_min is a predetermined minimum curvature (positive value). In addition, Sign in the formula (102) is a sign function that makes Sign (G)=1 in the case of G≥0 and Sign (G)=−1 in the case of G<0. The same applies to the sign functions Sign of other formulas.

Next, a rotation angle $\theta\_m1\_r$ of the first predicted trajectory is calculated by the following formula (103).

[MATH. 103]

$$\theta\_m1\_r(k) = L\_m1(k)/R\_m1\_r(k) \tag{103}$$

Further, an X coordinate value x_m11_r and a Y coordinate value y_m11_r of the application predicted position Z_m11_r are calculated by the following formulas (104) and (105).

[MATH. 104]

$$x\_m11\_r(k) = R\_m1\_r(k) \cdot \sin(\theta\_m1\_r(k)/3 \tag{104}$$

[MATH. 105]

$$y\_m11\_r(k) = R\_m1\_r(k) \cdot (1 - \cos(\theta\_m1\_r(k)/3) \tag{105}$$

Next, an X coordinate value x_m12_r and a Y coordinate value y_m12_r of the application predicted position Z_m12_r are calculated by the following formulas (106) and (107).

[MATH. 106]

$$x\_m12\_r(k) = R\_m1\_r(k) \cdot \sin(2\theta\_m1\_r(k)/3) \tag{106}$$

[MATH. 107]

$$y\_m12\_r(k) = R\_m1\_r(k) \cdot (1 - \cos(2\theta\_m1\_r(k)/3) \tag{107}$$

Next, an X coordinate value x_m13_r and a Y coordinate value y_m13_r of the application predicted position Z_m13_r are calculated by the following formulas (108) and (109).

[MATH. 108]

$$x\_m13\_r(k) = R\_m1\_r(k) \cdot \sin(\theta\_m1\_r(k)) \tag{108}$$

[MATH. 109]

$$y\_m13\_r(k) = R\_m1\_r(k) \cdot (1 - \cos(\theta\_m1\_r(k))) \tag{108}$$

Next, the second predicted trajectory calculator 35 mentioned above will be described. The second predicted trajectory calculator 35 calculates the second predicted position Z_m2 and the application second predicted position Z_m2_r on the basis of the principle described above by using the predicted curvature $\rho\_m2$ and the application predicted curvature $\rho\_m2\_r$ from the second extreme value search controller 32.

First, the X coordinate value x_m2 and the Y coordinate value y_m2 of the second predicted position Z_m2 are calculated by the formulas (9) to (14) described above.

Next, the curvature radius R_m2_r of the second predicted trajectory is calculated by the following formulas (110) and (111).

[MATH. 110]

When $|\rho\_m2| \leq \rho\_min$ $$R\_m2\_r(k) = 1/\rho\_m2\_r(k) \tag{110}$$

[MATH. 111]

When $|\rho m2| > \rho\_min$ $$R\_m2\_r(k) = \mathrm{Sign}(\rho\_m2\_r(k))/\rho\_min \tag{111}$$

Next, a rotation angle $\theta\_m2\_r$ of the second predicted trajectory is calculated by the following formula (112).

[MATH. 112]

$$\theta\_m2\_r(k) = L\_m2(k)/R\_m2\_r(k) \tag{112}$$

Further, an X' coordinate value x'_m2_r and a Y' coordinate value y'_m2_r of the application second predicted position Z_m2_r in the X'-Y' coordinate system (see FIG. 6) are calculated by the following formulas (113) and (114).

[MATH. 113]

$$x'\_m2\_r(k) = R\_m2\_r(k) \cdot \sin(\theta\_m2\_r(k)) \tag{113}$$

[MATH. 114]

$$y'\_m2\_r(k) = R\_m2\_r(k) \cdot (1 - \cos(\theta\_m2\_r(k))) \tag{114}$$

Next, an X coordinate value x_m2_r and a Y coordinate value y_m2_r of the application second predicted position Z_m2_r in the X-Y coordinate system (see FIG. 6) are calculated by the following formulas (115) and (116).

[MATH. 115]

$$x\_m2\_r(k)=x'\_m2\_r(k)\cdot\cos(\theta\_m1(k))-y'\_m2\_r(k)\cdot\sin(\theta\_m1(k))+x\_m13(k) \quad (115)$$

[MATH. 116]

$$y\_m2\_r(k)=x'\_m2\_r(k)\cdot\sin(\theta\_m1(k))+y'\_m2\_r(k)\cdot\cos(\theta\_m1(k))+y\_m13(k) \quad (116)$$

Next, the third predicted trajectory calculator 36 mentioned above will be described. The third predicted trajectory calculator 36 calculates the third predicted position Z_m3 and the application third predicted position Z_m3_r on the basis of the principle described above by using the predicted curvature ρ_m3 and the application predicted curvature ρ_m3_r from the third extreme value search controller 33.

First, the X coordinate value x_m3 and the Y coordinate value y_m3 of the third predicted position Z_m3 are calculated by the formulas (15) to (20) described above. Next, the curvature radius R_m3_r of the third predicted trajectory is calculated by the following formulas (117) and (118).

[MATH. 117]

When |ρ_m3|>ρ_min $$R\_m3\_r(k)=\text{Sign}(\rho\_m3\_r(k)) \quad (117)$$

[MATH. 118]

When |ρ_m3|≤ρ_min $$R\_m3\_r(k)=\text{Sign}(\rho\_m3\_r(k))/\rho\_min \quad (118)$$

Next, a rotation angle θ_m3_r of the third predicted trajectory is calculated by the following formula (119).

[MATH. 119]

$$\theta\_m3\_r(k)=L\_m3(k)/R\_m3\_r(k) \quad (119)$$

Further, an x" coordinate value x"_m3_r and a Y" coordinate value y"_m3_r of the application third predicted position Z_m3_r in the X"-Y" coordinate system (see FIG. 6) are calculated by the following formulas (120) and (121).

[MATH. 120]

$$x'\_m3\_r(k)=R\_m3\_r(k)/\cdot\sin(\theta\_m3l\_r(k)) \quad (120)$$

[MATH. 121]

$$y'\_m3\_r(k)=R\_m3\_r(k)\cdot(1-\cos(\theta\_m3\_r(k))) \quad (121)$$

Next, an X coordinate value x_m3_r and a Y coordinate value y_m3_r of the application third predicted position Z_m3_r in the X-Y coordinate system (see FIG. 6) are calculated by the following formulas (122) and (123).

[MATH. 122]

$$x\_m3\_r(k) = x'\_m3\_r(k)\cdot\cos(\theta\_m1(k)+\theta\_m2(k)) - \\ y'\_m3\_r(k)\cdot\sin(\theta\_m1(k)+\theta\_m2(k)) + x\_m2(k) \quad (122)$$

[MATH. 123]

$$y\_m3\_r(k) = x'\_m2\_r(k)\cdot\cos(\theta\_m1(k)+\theta\_m2(k)) + \\ y'\_m2\_r(k)\cdot\cos(\theta\_m1(k)+\theta\_m2(k)) + y\_m2(k) \quad (123)$$

As described above, in the trajectory determiner 30, the first to third extreme value search controllers 31 to 33 calculate the predicted curvatures ρ_m1 to ρ_m3 of the first to third predicted trajectories, and on the basis of these predicted curvatures ρ_m1 to ρ_m3, calculate the five predicted positions Z_mi (i=11 to 13, 2, and 3) and the five application predicted positions Z_mi_r described above.

Next, a description will be given of a reason why the value P_c2·K_sk1·K_bp_21 and the value P_c3·K_sk1·K_bp_31 described above are input to the first extreme value search controller 31, a reason why the value P_c3·K_sk2·K_bp_32 is input to the second extreme value search controller 32, and a reason why the three gains K_bp_21, K_bp_31, and K_bp_32 are set as described above.

For example, in a case where the first to third extreme value search controllers 31 to 33 calculate the predicted curvatures ρ_m1 to ρ_m3 independently of each other, a state as described below may occur.

Figure 22:
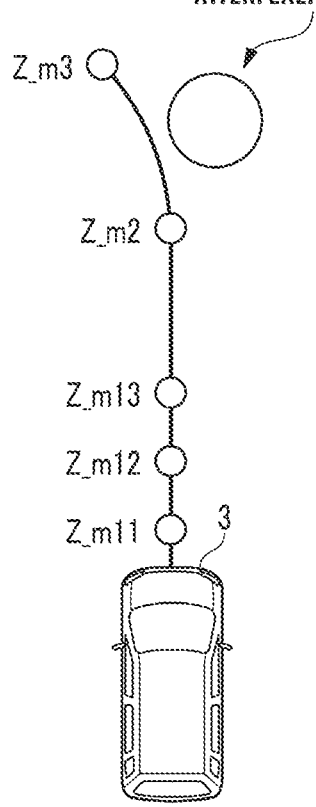
FIG. 22 is a diagram illustrating an example of a result of determination of first to third predicted trajectories in a case where an interference object exists in the right front of the host vehicle.

That is, as illustrated in FIG. 22, in a case where the interference object exists in the right front of the host vehicle 3, the first predicted trajectory (the current position to the predicted position Z_m13) and the second predicted trajectory (the predicted position Z_m13 to the second predicted position Z_m2) may be determined linearly, while the third predicted trajectory from the second predicted position Z_m2 to the third predicted position Z_m3 may be determined in an arc shape.

In a case where the predicted trajectory is determined as described above, the host vehicle 3 rapidly turns to the left when reaching the second predicted position Z_m2, so that the lateral acceleration rapidly increases to cause an unstable traveling state. In addition, depending on the motion performance of the host vehicle 3, the host vehicle 3 cannot turn along the third predicted trajectory, and there is a possibility that a margin for avoiding interference with the interference object decreases.

Figure 23:
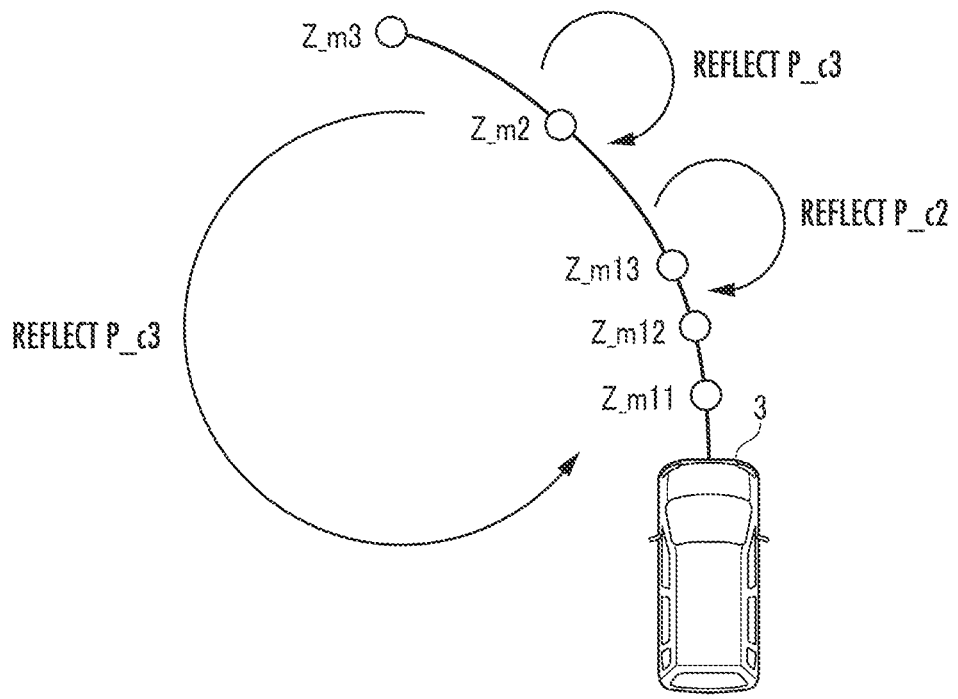
FIG. 23 is a diagram illustrating an example of the result of determination of the first to third predicted trajectories of the host vehicle.

To solve the above problem, for example, as illustrated in FIG. 23, in a case where the first predicted trajectory, the second predicted trajectory, and the third predicted trajectory are determined to be the same turning direction, that is, in a case where signs of the three moving average values P_c1 to P_c3 are the same as each other, it is necessary for the trajectory determiner 30 to calculate the predicted curvature ρ_m1 while reflecting the two moving average values P_c2 and P_c3 and to calculate the predicted curvature ρ_m2 while reflecting the moving average value P_c3.

Figure 24:
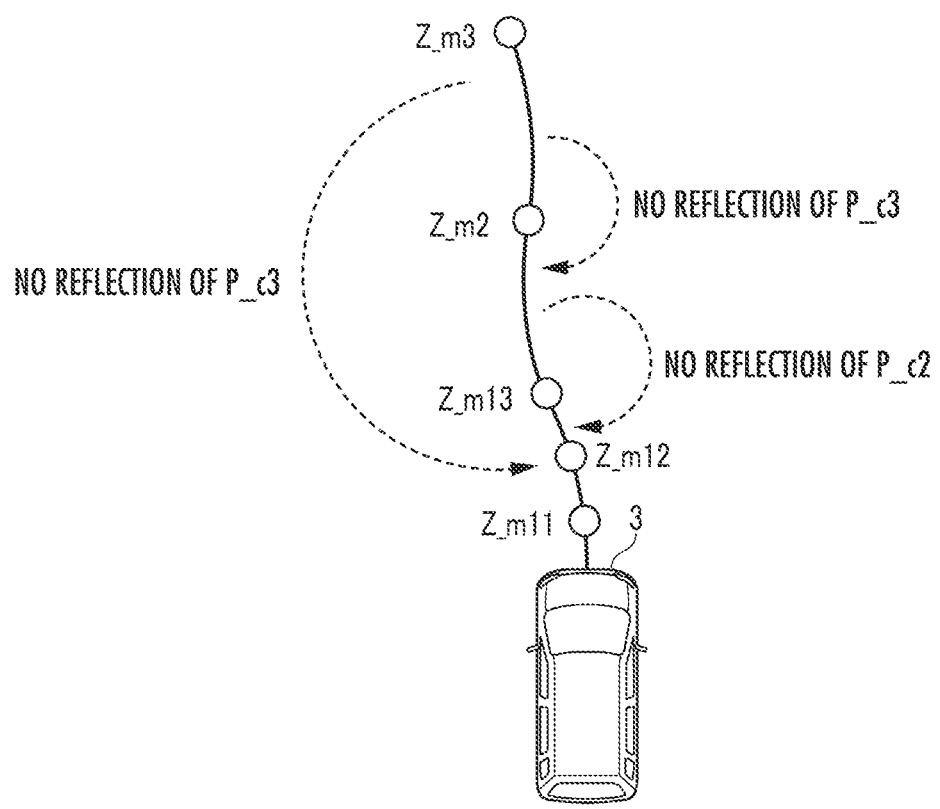
FIG. 24 is a diagram illustrating another example of the result of determination of the first to third predicted trajectories of the host vehicle.

On the other hand, for example, as illustrated in FIG. 24, in a case where the first predicted trajectory and the second predicted trajectory are determined to be opposite turning directions and the second predicted trajectory and the third predicted trajectory are determined to be opposite turning directions, that is, in a case where the signs of the moving average values P_c1 and P_c2 are different from each other and signs of the moving average values P_c2 and P_c3 are different from each other, when the predicted curvature ρ_m1 is calculated while reflecting the two moving average values P_c2 and P_c3, the avoidance margin for the interference object is reduced. Further, the same problem also occurs in a case where the predicted curvature ρ_m2 is calculated while reflecting the moving average value P_c3. Thus, it is necessary to calculate the predicted curvature ρ_m1 not to reflect the two moving average values P_c2 and P_c3 and to calculate the predicted curvature $\rho\_m2$ not to reflect the moving average value P_c3.

For the above reason, the two gains K_bp_21 and K_bp_31 are set as described above, and the values P_c2·K_sk1·K_bp_21 and P_c3·K_sk1·K_bp_31 described above are input to the first extreme value search controller 31.

For the same reason, the gain K_bp_32 is set as described above, and the value P_c3·K_sk2·K_bp_32 is input to the second extreme value search controller 32.

With the above configuration, a relationship among the signs of the three moving average values P_c1 to P_c3, the two values P_c2·K_bp_21 and P_c3·K_bp_31, and reflection states of the moving average values P_c2 and P_c3 with respect to the predicted curvature $\rho\_m1$ includes 12 patterns A1 to A12 shown in FIG. 25. In this case, the relationship is as the pattern A1 (or A2), in a state of FIG. 23 described above, and is as any one of the patterns A9 to A12, in a state of FIG. 24 described above.

In addition, a relationship among the signs of the two moving average values P_c2 and P_c3, a value P_c3·K_bp_32, and a reflection state of the moving average value P_c3 with respect to the predicted curvature $\rho\_m2$ includes six patterns B1 to B6 shown in FIG. 26.

As described above, the trajectory determiner 30 of the present embodiment calculates the five predicted positions Z_m11 to Z_m13, Z_m2, and Z_m3, and then inputs these values to a vehicle controller 40.

The vehicle controller 40 controls the motor 5 and the actuator 6 depending on the five predicted positions Z_m11 to Z_m13, Z_m2, and Z_m3, and the current velocity V_ego. As a result, the host vehicle 3 travels along the first to third predicted trajectories determined by the five predicted positions Z_m11 to Z_m13, Z_m2, and Z_m3.

As described above, according to the trajectory generation device 1 of the first embodiment, in each of the first to third predicted trajectories, various risk potentials R_p_mi_vj_v_r, R_p_rbr_mi_r, and R_p_rbl_mi_r representing the degree of interference with the interference object such as the traffic participant are calculated, and the first to third evaluation functions J_1 to J_3 are calculated to include the sum total of these risk potentials R_p_mi_vj_v_r, R_p_rbr_mi_r, and R_p_rbl_mi_r.

Then, the predicted curvatures $\rho\_m1$ to $\rho\_m3$ are calculated so that these first to third evaluation functions J_1 to J_3 have the minimum values, and on the basis of these predicted curvatures $\rho\_m1$ to $\rho\_m3$, the first to third predicted trajectories are determined. That is, the five predicted positions Z_mi (i=11 to 13, 2, and 3) are determined so that the first to third evaluation functions J_1 to J_3 have the minimum values.

In this case, as described above, since the first to third evaluation functions J_1 to J_3 are calculated to include the sum total of the risk potentials R_p_mi_vj_v_r representing the degree of interference with the interference object, the first to third predicted trajectories can be determined so that the degree of interference with the interference object decreases by determining such first to third evaluation functions J_1 to J_3 to have the minimum values.

Further, in a case where the moving average value P_c1 in the first extreme value search controller 31 and the moving average value P_c2 in the second extreme value search controller 32 have the same sign, the predicted curvature $\rho\_m1$ is determined while reflecting the moving average value P_c2 (see FIGS. 23 and 25).

In a case where the moving average value P_c2 in the second extreme value search controller 32 and the moving average value P_c3 in the third extreme value search controller 33 have the same sign, the predicted curvature $\rho\_m2$ is determined while reflecting the moving average value P_c3 (see FIGS. 23 and 26).

In this case, the three moving average values P_c1 to P_c3 are calculated as amounts of correction for respectively correcting the three predicted curvatures $\rho\_m1$ to $\rho\_m3$, that is, amounts of correction for correcting the first to third predicted trajectories. Thus, in a case where signs of the amounts of correction for the first predicted trajectory and the second predicted trajectory are the same, the first predicted trajectory is further corrected in the same direction as a correction direction for the second predicted trajectory farther from the current position of the host vehicle 3.

Similarly, in a case where signs of the amounts of correction for the second predicted trajectory and the third predicted trajectory are the same, the second predicted trajectory is further corrected in the same direction as a correction direction for the third predicted trajectory farther from the current position of the host vehicle 3.

Here, in a case where the interference object exists in the traveling direction of the host vehicle 3, the predicted trajectory farther from the current position is a trajectory closer to the interference object than the predicted trajectory closer to the current position of the host vehicle 3. Thus, by generating the predicted trajectory farther from the interference object (that is, closer to the host vehicle 3) while reflecting the amount of correction for correcting the predicted trajectory closer to the interference object, it is possible to further increase an avoidance margin for avoiding interference with the interference object in the predicted trajectory closer to the host vehicle 3. As a result, also in the host vehicle 3 in which the feasible trajectory is limited, the future trajectory of the host vehicle 3 can be appropriately generated so that the margin for avoiding the interference with the interference object is sufficiently secured.

On the other hand, in a case where the amounts of correction for the two adjacent predicted trajectories have different signs, the two predicted trajectories are corrected in directions different from each other to avoid the interference object. Thus, under such a condition, when the amount of correction for correcting the predicted trajectory farther from the current position of the host vehicle 3 is reflected in the predicted trajectory closer to the current position, the avoidance margin for the interference object is reduced in the predicted trajectory closer to the current position.

On the other hand, in the case of the present embodiment, in a case where the moving average value P_c1 and the moving average value P_c2 have different signs, the predicted curvature $\rho\_m1$ is determined without reflecting the moving average value P_c2 (see FIGS. 24 and 25). Similarly, in a case where the moving average value P_c2 and the moving average value P_c3 have different signs, the predicted curvature $\rho\_m2$ is determined without reflecting the moving average value P_c3 (see FIGS. 24 and 26). As a result, it is possible to sufficiently secure the margin for avoiding the interference with the interference object also in the predicted trajectory closer to the current position.

In addition, the first predicted trajectory is determined as a combination of three predicted trajectories shorter than the second predicted trajectory and the third predicted trajectory. As a result, the first predicted trajectory can be generated so that the interference with the interference object can be more reliably avoided also in the first predicted trajectory having a shorter distance to the host vehicle 3 as compared with the second predicted trajectory and the third predicted trajectory.

Note that the first embodiment is an example in which the host vehicle 3 is a mobile body, but instead of this, a two-wheeled vehicle, a robot, an aircraft, a ship, or the like may be a mobile body.

Further, the first embodiment is an example in which the trajectory generation device 1 of the present invention is mounted on the four-wheeled vehicle 3 capable of automatic driving, but instead of this, the trajectory generation device may be mounted on a mobile body (for example, a two-wheeled vehicle, a robot, an aircraft, a ship, or the like) other than the four-wheeled vehicle, or the trajectory generation device may be used alone.

In addition, the first embodiment is an example in which the current detected position W_vj(k) of the traffic participant is calculated by using a predetermined machine learning algorithm (for example, an algorithm using a neural network such as DNN or CNN) in the traffic participant detector 10, but instead of this, the current detected position W_vj(k) of the traffic participant may be calculated by using an image recognition algorithm or the like.

Further, the first embodiment is an example in which the five predicted positions W_v1($k$:k+km11), W_v1($k$:k+km12), W_v1($k$:k+km13), W_v1($k$:k+km2), and W_v1($k$:k+km3) are calculated by using a predetermined machine learning algorithm (for example, an algorithm using a neural network such as DNN or CNN) in the action predictor 11, but instead of this, the five predicted positions W_v1($k$:k+km11), W_v1($k$:k+km12), W_v1($k$:k+km13), W_v1($k$:k+km2), and W_v1($k$:k+km3) may be calculated by using a machine learning algorithm other than the neural network.

Further, the first embodiment is an example in which various risk potentials are used as the interference degree parameters, but the interference degree parameters of the present invention are not limited thereto, and may be any parameters as long as the interference degree parameters represent the degree of interference of an interference object around the host vehicle 3 with the host vehicle 3.

The first embodiment is an example in which the trajectory determiner 30 calculates the predicted curvature ρ_mi and calculates the predicted position Z_mi on the basis of the curvature ρ_mi, but instead of the predicted curvature ρ_mi, a predicted value of a combination of a line segment and an angle as described in FIG. 18 of JP 6580087 B2 may be calculated, and the predicted position Z_mi may be calculated on the basis of the predicted value.

Next, a trajectory generation device 100 (see FIG. 27) according to a second embodiment will be described. The trajectory generation device 100 of the present embodiment determines a predicted trajectory of a traffic participant present in front of the host vehicle 3 by an algorithm described below to execute automatic driving control of the host vehicle 3. Note that, in the present embodiment, the host vehicle 3 corresponds to a first mobile body, and the traffic participant corresponds to a second mobile body.

Here, a movable object such as a pedestrian, a bicycle, a four-wheeled vehicle, and a two-wheeled motorcycle corresponds to the traffic participant, and hereinafter, a case where the traffic participant is a pedestrian M1 (see FIG. 29) will be described as an example, and an object that interferes with movement of the pedestrian M1 is referred to as an "interference object". In this case, a traffic participant other than the pedestrian M1 and a traffic environment (a road environment, a signal state, or the like) correspond to the interference object.

Figure 27:
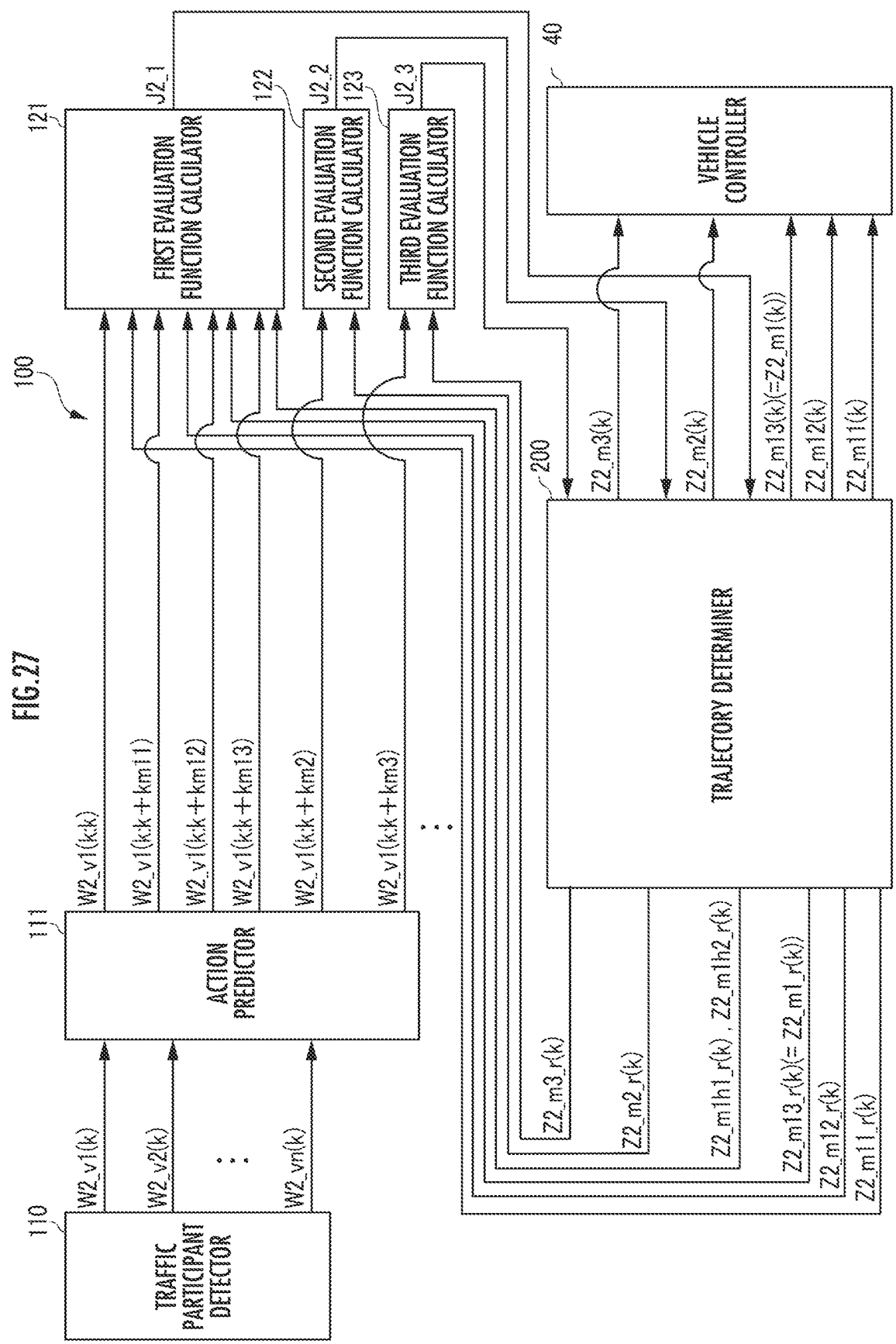
FIG. 27 is a block diagram illustrating a functional configuration of a trajectory generation device of a second embodiment.

As illustrated in FIG. 27, the trajectory generation device 100 includes a traffic participant detector 110, an action predictor 111, first to third evaluation function calculators 121 to 123, and a trajectory determiner 200. Specifically, these elements 100 to 111, 121 to 123, and 200 are configured by the ECU 2, and calculation processing in these elements 100 to 111, 121 to 123, and 200 is executed in the predetermined control period ΔT described above.

Note that, in the present embodiment, the first to third evaluation function calculators 121 to 123 correspond to the interference degree parameter calculator, and the trajectory determiner 200 corresponds to the predicted trajectory generator and the correction amount determiner.

First, the traffic participant detector 110 detects/calculates a current detected position of the pedestrian M1 and the current detected position W_vj(k) of the traffic participant other than the pedestrian M1 by a method similar to that of the traffic participant detector 10 of the first embodiment described above. First, as an example, a description will be given of a case where only a traffic participant TP4 that is one pedestrian exists in front of the pedestrian M1 (that is, a case where j=1).

Figure 28:
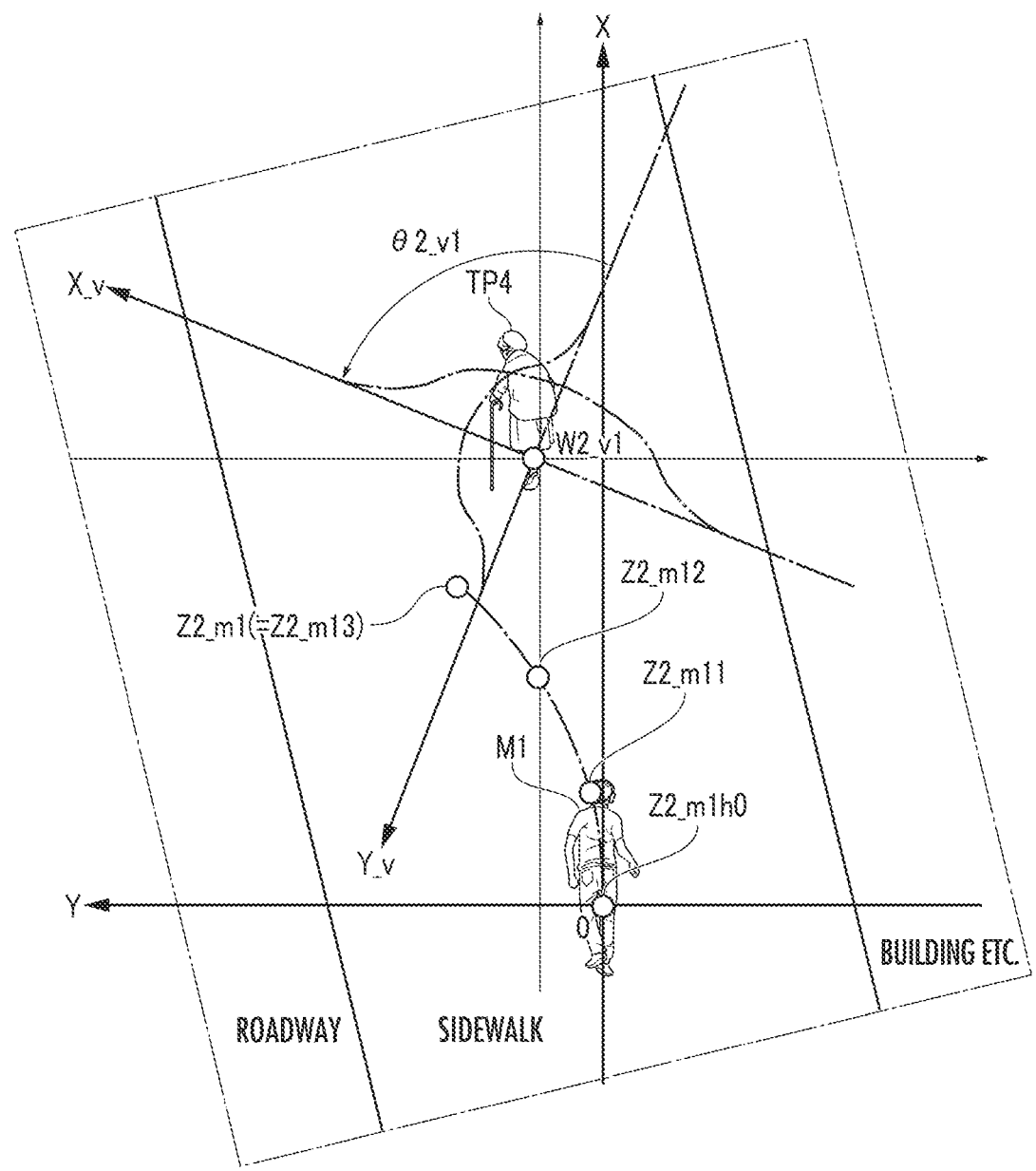
FIG. 28 is a diagram for explaining a coordinate system of a pedestrian and a coordinate system of another traffic participant.

In the case of the present embodiment, as illustrated in FIG. 28, a coordinate system of the pedestrian M1 is defined with the center of the pedestrian M1 as the origin and the traveling direction and the lateral direction of the pedestrian M1 as the X axis and the Y axis. Note that Z2_$m$1$h$0 in the figure is the current position of the pedestrian M1, and Z2_$m$11, Z2_$m$12, and Z2_$m$13 are predicted positions described later of the pedestrian M1.

In addition, a coordinate system of the traffic participant TP4 is defined as an orthogonal two-dimensional coordinate system in which the traveling direction and the lateral direction of the traffic participant TP4 are the X_v axis and the Y_v axis, and the inclination of the X_v axis with respect to the X axis is θ2_$v$1.

In this orthogonal two-dimensional coordinate system, in a case where an X_v coordinate value is x2_$v$1 and a Y_v coordinate value is y2_$v$1, a current detected position W2_$v$1($k$) of the traffic participant TP4 is calculated as a value having three values [x2_$v$1($k$), y2_$v$1($k$), θ2_$v$1($k$)] as elements. In addition, a line indicated by a one-dot chain line around the traffic participant TP4 in FIG. 28 simulatively represents a risk potential described later.

The traffic participant detector 111 calculates the current position W2_$v$1($k$:k) of the traffic participant TP4 and five predicted positions W2_$v$1($k$:k+km11), W2_$v$1($k$:k+km12), W2_$v$1($k$:k+km13), W2_$v$1($k$:k+km2), and W2_$v$1($k$:k+km3) by a method similar to that of the traffic participant detector 10 of the first embodiment described above.

As described above, in the traffic participant detector 111, in a case where there is one traffic participant, six positions (current position and five predicted positions) of the traffic participant are calculated, and in a case where there are n traffic participants, n×6 positions are calculated. The same applies to the calculation in each of the elements 121 to 123, and 200 described above. Hereinafter, a case where there is one traffic participant will be described as an example.

Figure 29:
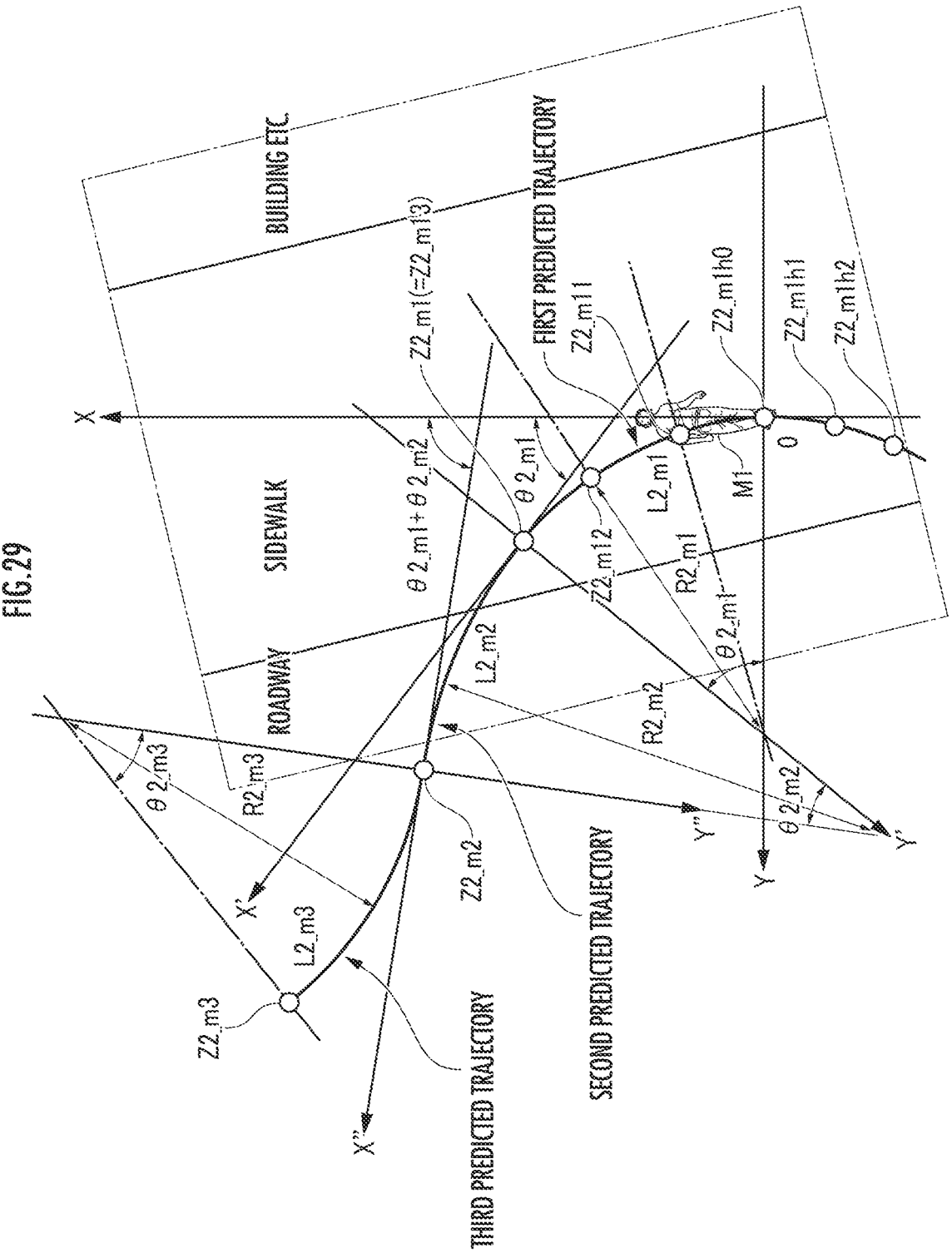
FIG. 29 is a diagram for explaining first to third predicted trajectories of the pedestrian.

Next, descriptions will be given of a definition of the future predicted trajectory of the pedestrian M1 in the trajectory generation device 100 of the present embodiment, and a determination principle thereof. As illustrated in FIG. 29, in the trajectory generation device 100 of the present embodiment, similarly to the trajectory generation device 1 of the first embodiment, the future predicted trajectory of the pedestrian M1 is determined as a combination of three arc-shaped predicted trajectories, first to third predicted trajectories.

First, the first predicted trajectory will be described. First, as described above, an X-Y coordinate system is defined in which the center of the current position of the pedestrian M1 is the origin, the traveling direction of the pedestrian M1 is the X axis, and the lateral direction of the pedestrian M1 is the Y axis.

A position after a first predicted time $T2\_m1$, from the origin in the X-Y coordinate system is defined as a first predicted position $Z2\_m1$, and the predicted trajectory from the origin to the first predicted position $Z2\_m1$ is defined as the first predicted trajectory of an arc shape. Here, in a case where a current velocity of the pedestrian M1 is V_trgt, a distance $L2\_m1$ of the first predicted trajectory is defined as in the following formula (124).

[MATH. 124]

$$L2\_m1(k)=V\_trgt(k)\cdot T2\_m1 \qquad (124)$$

Further, in a case where a curvature radius of the first predicted trajectory is $R2\_m1$, a rotation angle $\theta 2\_m1$ of the first predicted trajectory is defined as in the following formula (125). The rotation angle $\theta 2\_m1$ corresponds to an angle between the Y axis and the Y' axis described later.

[MATH. 125]

$$\theta 2\_m1(k)=L2\_m1(k)/R2\_m1(k) \qquad (125)$$

An estimated moving distance $L2\_mh1$ of the pedestrian M1 before predetermined time Th1 (for example, one control period before) is defined as in the following formula (126). The estimated moving distance $L2\_mh1$ is a moving distance when it is estimated that the pedestrian M1 moves along an arc trajectory obtained by extending the first predicted trajectory from control time before the predetermined time Th1 to the current control time.

[MATH. 126]

$$L2\_m1h1(k)=V\_trgt(k)\cdot \Delta T \qquad (126)$$

Further, a rotation angle $\theta 2\_mh1$ of the pedestrian M1 at an estimated position $Z2\_m1h1$ before the predetermined time Th1 is defined as in the following formula (127). The estimated position $Z2\_m1h1$ before the predetermined time Th1 is a position at the control time before the predetermined time Th1 when it is estimated that the pedestrian M1 moves along the arc trajectory obtained by extending the first predicted trajectory from the control time before the predetermined time Th1 to the current control time.

[MATH. 127]

$$\theta 2\_m1h1(k)=-L2\_m1h1(k)/R2\_m1(k) \qquad (127)$$

Further, an estimated moving distance $L2\_mh2$ of the pedestrian M1 before predetermined time Th2 (for example, two control periods before) is defined as in the following formula (128). The estimated moving distance $L2\_mh2$ is a moving distance when it is estimated that the pedestrian M1 moves along the arc trajectory obtained by extending the first predicted trajectory from control time before the predetermined time Th2 to the current control time.

[MATH. 128]

$$L2\_m1h2(k)=V\_trgt(k)\cdot 2\Delta T \qquad (128)$$

Further, a rotation angle $\theta 2\_mh2$ of the pedestrian M1 at an estimated position $Z2\_m1h2$ before the predetermined time Th2 is defined as in the following formula (129). The estimated position $Z2\_m1h2$ before the predetermined time Th2 is a position at the control time before the predetermined time Th2 when it is estimated that the pedestrian M1 moves along the arc trajectory obtained by extending the first predicted trajectory from the control time before the predetermined time Th2 to the current control time.

[MATH. 129]

$$\theta 2\_mh2(k)=-L2\_m1h2(k)/R2\_m1(k) \qquad (129)$$

Meanwhile, predicted positions when the predicted trajectory from the origin to the first predicted position $Z2\_m1$ is divided into three equal parts are set as the three predicted positions $Z2\_m11$, $Z2\_m12$, and $Z2\_m13$ ($=Z2\_m1$) in order from the origin toward the first predicted position $Z2\_m1$. In this case, an X coordinate value $x2\_m11$ and a Y coordinate value $y2\_m11$ of the predicted position $Z2\_m11$ are defined as in the following formulas (130) and (131).

[MATH. 130]

$$x2\_m11(k)=R2\_m1(k)\cdot \sin(\theta 2\_m1(k)/3) \qquad (130)$$

[MATH. 131]

$$y2\_m11(k)=R2\_m1(k)\cdot (1-\cos(\theta 2\_m1(k)/3) \qquad (131)$$

In addition, an X coordinate value $x2\_m12$ and a Y coordinate value $y2\_m12$ of the predicted position $Z2\_m12$ are defined as in the following formulas (132) and (133).

[MATH. 132]

$$x2\_m12(k)=R2\_m1(k)\cdot \sin(2\theta 2\_m1(k)/3) \qquad (132)$$

[MATH. 133]

$$y2\_m12(k)=R2\_m1(k)\cdot (1-\cos(2\theta 2\_m1(k)/3) \qquad (133)$$

Further, an X coordinate value $x2\_m13$ and a Y coordinate value $y2\_m13$ of the predicted position $Z2\_m13$ are defined as in the following formulas (134) and (135).

[MATH. 134]

$$x2\_m13(k)=R2\_m1(k)\cdot \sin(\theta 2\_m1(k)) \qquad (134)$$

[MATH. 135]

$$y2\_m13(k)=R2\_m1(k)\cdot (1-\cos(\theta 2\_m1(k))) \qquad (135)$$

Meanwhile, an X coordinate value $x2\_m1h0$ and a Y coordinate value $y2\_m1h0$ of the current position $Z2\_m1h0$ are defined as in the following formulas (136) and (137).

[MATH. 136]

$$x2\_m1h0(k)=0 \qquad (136)$$

[MATH. 137]

$$y2\_m1h0(k)=0 \qquad (137)$$

In addition, an X coordinate value $x2\_m1h1$ and a Y coordinate value $y2\_m1h1$ of the estimated position $Z2\_m1h1$ before the predetermined time Th1 of the pedestrian M1 are defined as in the following formulas (138) and (139).

[MATH. 138]

$$x2\_m1h1(k)=R2\_m1(k)\cdot \sin(\theta 2\_mh1(k)) \qquad (138)$$

[MATH. 139]

$$y2\_m1h1(k)=R2\_m1(k)\cdot \sin(\theta 2\_mh1(k)) \qquad (139)$$

Further, an X coordinate value $x2\_m1h2$ and a Y coordinate value $y2\_m1h2$ of the estimated position $Z2\_m1h2$ of the pedestrian M1 before the predetermined time Th2 are defined as in the following formulas (140) and (141).

[MATH. 140]

$$x2\_m1h2(k)=R2\_m1(k)\cdot\sin(\theta2\_mh2(k)) \quad (140)$$

[MATH. 141]

$$y2\_m1h2(k)=R2\_m1(k)\cdot(1-\cos(\theta2\_mh2(k))) \quad (141)$$

The above formulas (124) to (125) and (130) to (135) correspond to the model formula (model trajectory) of the first predicted trajectory.

Next, the second predicted trajectory will be described. First, an X'-Y' coordinate system is defined in which the first predicted position Z2_m1 (=predicted position Z2_m13) is the origin, a tangential line at the first predicted position Z2_m1 of the first predicted trajectory is the X' axis, and a line orthogonal to the tangential line is the Y' axis.

Further, a position after a second predicted time T2_m2, from the origin in the X'-Y' coordinate system, that is, from the first predicted position Z2_m1 is defined as a second predicted position Z2_m2, and the predicted trajectory from the first predicted position Z2_m1 to the second predicted position Z2_m2 is defined as the second predicted trajectory of an arc shape. In this case, a distance L2_m2 of the second predicted trajectory is defined as in the following formula (142).

[MATH. 142]

$$L2\_m2(k)=V\_\text{trgt}(k)\cdot T2\_m2 \quad (142)$$

Further, in a case where a curvature radius of the second predicted trajectory is R2_m2, a rotation angle θ2_m2 of the second predicted trajectory is defined as in the following formula (143). The rotation angle θ2_m2 corresponds to an angle between the Y' axis and the Y" axis described later.

[MATH. 143]

$$\theta2\_m2(k)=L2\_m2(k)/R2\_m2(k) \quad (143)$$

An X' coordinate value x2'_m2 and a Y' coordinate value y2'_m2 of the second predicted position Z2_m2 are defined as in the following formulas (144) and (145).

[MATH. 144]

$$x2'\_m2(k)=R2\_m2(k)\cdot\sin(\theta2\_m2(k)) \quad (144)$$

[MATH. 145]

$$y2'\_m2(k)=R2\_m2(k)\cdot(1-\cos(\theta2\_m2(k))) \quad (145)$$

Further, an X coordinate value x2_m2 and a Y coordinate value y2_m2 of the second predicted position Z2_m2 are defined as in the following formulas (146) and (147).

[MATH. 146]

$$x2\_m2(k)=x2'\_m2(k)\cdot\cos(\theta2\_m1(k))-y2'\_m2(k)\cdot\sin(\theta2\_m1(k))+x2\_m13(k) \quad (146)$$

[MATH. 147]

$$y2\_m2(k)=x2'\_m2(k)\cdot\sin(\theta2\_m1(k))+y2'\_m2(k)\cdot\cos(\theta2\_m1(k))+y2\_m13(k) \quad (147)$$

The above formulas (142) to (147) correspond to the model formula (model trajectory) of the second predicted trajectory.

Next, the third predicted trajectory will be described. First, an X"-Y" coordinate system is defined in which the second predicted position Z2_m2 is the origin, a tangential line at the second predicted position Z2_m2 of the second predicted trajectory is the X" axis, and a line orthogonal to the tangential line is the Y" axis.

Further, a position after a third predicted time T2_m3, from the origin in the X"-Y" coordinate system, that is, from the second predicted position Z2_m2 is defined as a third predicted position Z2_m3, and the predicted trajectory from the second predicted position Z2_m2 to the third predicted position Z2_m3 is defined as the third predicted trajectory of an arc shape. In this case, a distance L2_m3 of the third predicted trajectory is defined as in the following formula (148).

[MATH. 148]

$$L2\_m3(k)=V\_\text{trgt}(k)\cdot T2\_m3 \quad (148)$$

Further, in a case where a curvature radius of the third predicted trajectory is R2_m3, a rotation angle θ2_m3 of the third predicted trajectory is defined as in the following formula (149).

[MATH. 149]

$$\theta2\_m3(k)=L2\_m3(k)/R2\_m3(k) \quad (149)$$

An X" coordinate value x2"_m3 and a Y" coordinate value y2"_m3 of the third predicted position Z2_m3 are defined as in the following formulas (150) and (151).

[MATH. 150]

$$x2"\_m3(k)=R2\_m3(k)\cdot\sin(\theta2\_m3(k)) \quad (150)$$

[MATH. 151]

$$y2"\_m3(k)=R2\_m3(k)\cdot(1-\cos(\theta2\_m3(k))) \quad (151)$$

Further, an X coordinate value x2_m3 and a Y coordinate value y2_m3 of the third predicted position Z2_m3 are defined as in the following formulas (152) and (153).

[MATH. 152]

$$x2\_m3(k)=x2"\_m3(k)\cdot\cos(\theta2\_m1(k)+\theta2\_m2(k))-y2"\_m2(k)\cdot\sin(\theta2\_m1(k)+\theta2\_m2(k))+x2\_m2(k) \quad (152)$$

[MATH. 153]

$$y2\_m3(k)=x2"\_m3(k)\cdot\sin(\theta2\_m1(k)+\theta2\_m2(k))+y2"\_m3(k)\cdot\cos(\theta2\_m1(k)+\theta2\_m2(k))+y2\_m2(k) \quad (153)$$

The above formulas (148) to (153) correspond to the model formula (model trajectory) of the third predicted trajectory.

Next, the first to third evaluation function calculators 121 to 123 mentioned above will be described. In these first to third evaluation function calculators 121 to 123, each of a first evaluation function J2_1, a second evaluation function J2_2, and a third evaluation function J2_3 is calculated as a representation of a degree of interference between the pedestrian M1 and the interference object by using the above five predicted positions Z2_m11, Z2_m12, Z2_m13, Z2_m2, and Z2_m3, the current position Z2_m1h0, and the two estimated positions Z2_m1h1 and Z2_m1h2.

Here, since the first evaluation function J2_1, the second evaluation function J2_2, and the third evaluation function J2_3 are used for calculation of the five predicted positions Z2_m11, Z2_m12, Z2_m13, Z2_m2, and Z2_m3 as described later, current values of the first evaluation function J2_1, the second evaluation function J2_2, and the third evaluation function J2_3 are calculated on the basis of previous values of the five predicted positions Z2_m11, Z2_m12, Z2_m13, Z2_m2, and Z2_m3.

Note that, in the following description, the five predicted positions Z2_m11, Z2_m12, Z2_m13, Z2_m2, and Z2_m3 are collectively referred to as a "predicted position Z2_mi". That is, the subscript i of the "predicted position Z2_mi" represents i=11 to 13, 2, and 3.

Hereinafter, descriptions will be given of a method used for calculation of the first to third evaluation functions J2_1 to J2_3 in the first to third evaluation function calculators 121 to 123, and a principle thereof.

First, a method of calculating a risk potential R2_p_mi_vj_v will be described. The risk potential R2_p_mi_vj_v represents the degree of interference between the pedestrian M1 and the traffic participant in a case where it is assumed that the pedestrian M1 is at the predicted position Z2_mi and the traffic participant is at the predicted position W2_vj.

First, an x coordinate deviation dx2_mi_vj and a y coordinate deviation dy2_mi_vj are calculated by the following formulas (154) and (155).

[MATH. 154]

$$dx2\_mi\_vj(k) = x2\_mi(k) - x2\_vj(k) \quad (154)$$

[MATH. 155]

$$dy2\_mi\_vj(k) = y2\_mi(k) - y2\_vj(k) \quad (155)$$

These deviations dx2_mi_vj and dy2_mi_vj represent deviations between the predicted position Z2_mi of the pedestrian M1 and the predicted position W2_vj of the traffic participant.

Next, a transformed x coordinate deviation dx2_mi_vj_v and a transformed y coordinate deviation dy2_mi_vj_v are calculated by the following formulas (156) and (157). These deviations dx2_mi_vj_v and dy2_mi_vj_v are obtained by transforming the two deviations dx2_mi_vj and dy2_mi_vj into a coordinate system of the traffic participant.

[MATH. 156]

$$dx2\_mi\_vj\_v(k) = dx2\_mi\_vj(k)\cdot\cos(\theta2\_vj(k)) + dy2\_mi\_vj(k)\cdot\sin(\theta2\_vj(k)) \quad (156)$$

[MATH. 157]

$$dy2\_mi\_vj\_v(k) = dy2\_mi\_vj(k)\cdot\cos(\theta2\_vj(k)) - dx2\_mi\_vj(k)\cdot\sin(\theta2\_vj(k)) \quad (157)$$

Figure 30:
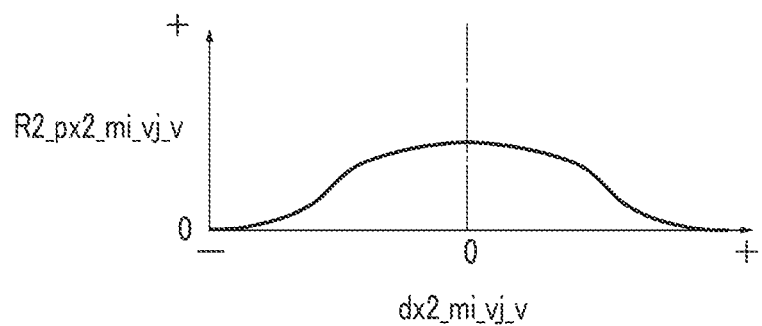
FIG. 30 is a diagram illustrating an example of a map used for calculation of an x-direction risk potential.

Next, an x-direction risk potential R2_px2_mi_vj_v is calculated by searching a map illustrated in FIG. 30 depending on the transformed x coordinate deviation dx2_mi_vj_v. A width, a shape, and the like of a map value of the x-direction risk potential R2_px2_mi_vj_v are set depending on a type (for example, a pedestrian, a bicycle, a four-wheeled vehicle, a motorcycle, or the like) of the interference object.

Figure 31:
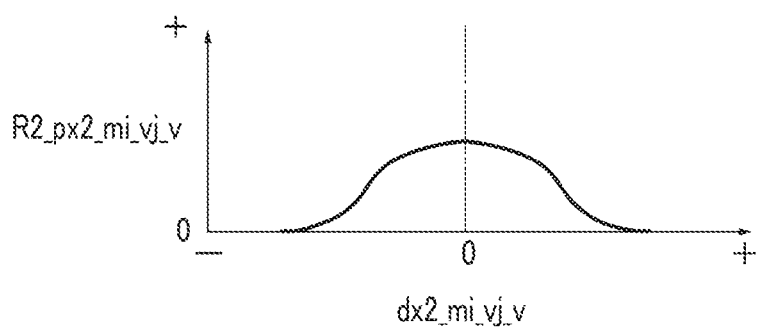
FIG. 31 is a diagram illustrating an example of a map used for calculation of a y-direction risk potential.

Further, a y-direction risk potential R2_py2_mi_vj_v is calculated by searching a map illustrated in FIG. 31 depending on the transformed y coordinate deviation dy2_mi_vj_v. A width, a shape, and the like of a map value of the y-direction risk potential R2_py2_mi_vj_v are also set depending on the type (for example, a pedestrian, a bicycle, a four-wheeled vehicle, a motorcycle, or the like) of the interference object, similarly to the map value of the x-direction risk potential R2_px2_mi_vj_v.

Then, as shown in the following formula (158), the risk potential R2_p_mi_vj_v is calculated as a product of the x-direction risk potential R2_px2_mi_vj_v and the y-direction risk potential R2_py2_mi_vj_v.

[MATH. 158]

$$R2\_p\_mi\_vj\_v(k) = R2\_px\_mi\_vj\_v(k)\cdot R2\_py\_mi\_vj\_v(k) \quad (158)$$

By the above method, the risk potential R2_p_mi_vj_v is calculated to have a larger value as the degree of interference between the pedestrian M1 and the traffic participant increases.

Next, a description will be given of a method of calculating a right side track boundary risk potential R_p_rbr_mi and a left side track boundary risk potential R_p_rbl_mi. Note that, in the description of the present embodiment, a route such as a sidewalk on which the pedestrian M1 moves is referred to as a "track". These two risk potentials R2_p_rbr_mi and R2_p_rbl_mi are values representing a possibility that the pedestrian M1 causes deviation from the track in a case where the pedestrian M1 is assumed to be at the predicted position Z2_mi.

Figure 32:
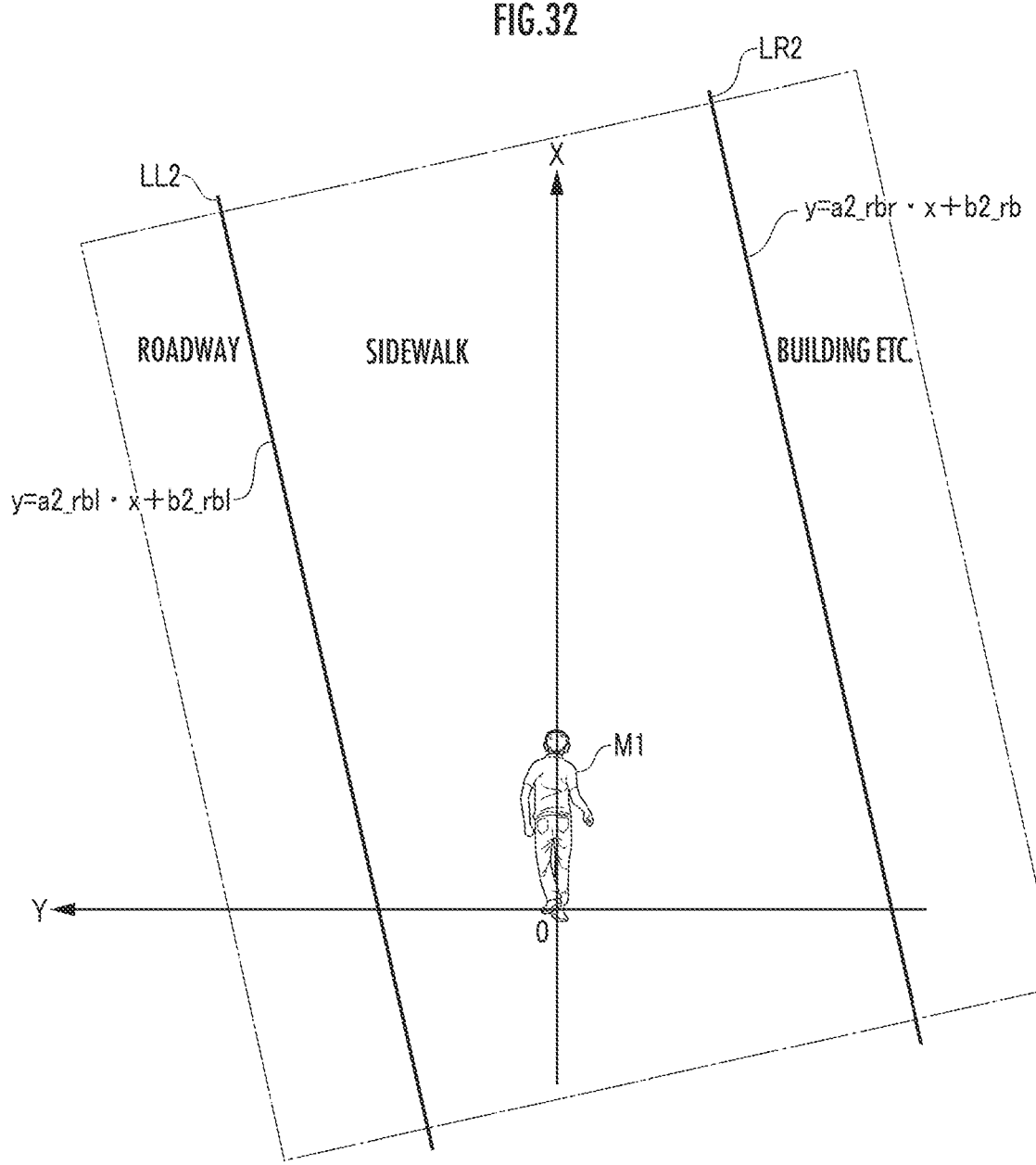
FIG. 32 is a diagram for explaining a function defining a right side boundary line and a left side boundary line of a sidewalk on which the pedestrian moves.

First, in a case where a right side boundary line LR2 and a left side boundary line LL2 of the track of the pedestrian M1 are as illustrated in FIG. 32, for example, these boundary lines LR2 and LL2 can be defined as two linear functions shown in the following formulas (159) and (160).

[MATH. 159]

$$y(k) = a2\_rbr(k)\cdot x(k) + b2\_rbr(k) \quad (159)$$

[MATH. 160]

$$y(k) = a2\_rbl(k)\cdot x(k) + b2\_rbl(k) \quad (160)$$

In the above formula (159), a2_rbr and b2_rbr are parameters that define the right side boundary line LR2, and in the above formula (160), a2_rbl and b2_rbl are parameters that define the left side boundary line LL2. These four parameters a2_rbr, b2_rbr, a2_rbl, and b2_rbl are calculated in real time on the basis of a detection result of the information detection device 4 described above.

Next, a right side track boundary function σ2_r and a left side track boundary function σ2_l are defined as shown in the following formulas (161) and (162).

[MATH. 161]

$$\sigma2\_r(k) = y(k) - a2\_rbr(k)\cdot x(k) - b2\_rbr(k) \quad (161)$$

[MATH. 162]

$$\sigma2\_l(k) = y(k) - a2\_rbl(k)\cdot x(k) - b2\_rbl(k) \quad (162)$$

These formulas (161) and (162) correspond to ones obtained by transposing the left side of the above formulas (159) and (160) to the right side. Thus, in a case where the right side track boundary function σ2_r has a positive value, the center of the pedestrian M1 exists in a region inside the track on the left side of the right side boundary line LR, and in a case where the right side track boundary function σ2_r has a negative value, the center of the pedestrian M1 exists in a region outside the track on the right side of the right side boundary line LR.

Similarly, in a case where the left side track boundary function σ2_l has a positive value, the center of the pedestrian M1 exists in a region outside the track on the left side of the left side boundary line LL, and in a case where the left track boundary function σ2_l has a negative value, the center of the pedestrian M1 exists in a region inside the track on the right side of the left side boundary line LL.

On the basis of the above principle, the right side track boundary risk potential $R2\_p\_rbr$ is calculated by the following formulas (163) and (164), and the left side track boundary risk potential $R2\_p\_rbl$ is calculated by the following formulas (165) and (166).

[MATH. 163]

When $\sigma2\_r(k) \leq \sigma2\_mrg$ $$R2\_p\_rbr(k)=\Omega\_cross(a\_rbr(k))\cdot|\sigma2\_r(k)-\sigma2\_mrg| \quad (163)$$

[MATH. 164]

When $\sigma2\_mrg < \sigma2\_r(k)$ $$R2\_p\_rbr(k)=0 \quad (164)$$

[MATH. 165]

When $-\sigma2\_mrg \leq \sigma2\_l(k)$ $$R2\_p\_rbl(k)=\Omega\_cross(a2\_rbl(k))\cdot|\sigma2\_l(k)+\sigma2\_mrg| \quad (165)$$

[MATH. 166]

When $\sigma2\_l(k) < -\sigma2\_mrg$ $$R2\_p\_rbl(k)=0 \quad (166)$$

Figure 33:
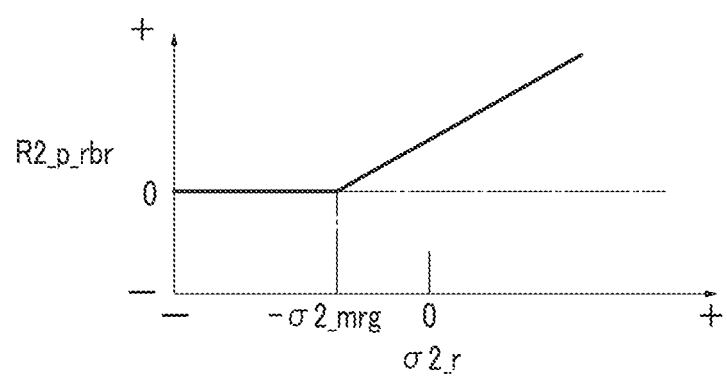
FIG. 33 is a diagram illustrating a relationship between a right side track boundary risk potential and a right side track boundary function.
Figure 34:
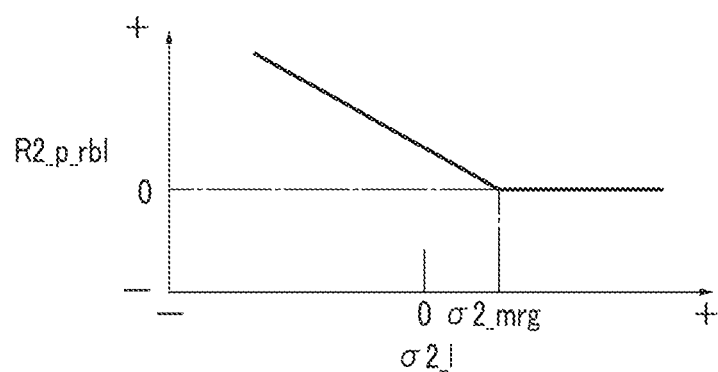
FIG. 34 is a diagram illustrating a relationship between a left side track boundary risk potential and a left side track boundary function.

In the above formulas (163) to (166), $\sigma2\_mrg$ is a margin (positive predetermined value) for enabling the pedestrian M1 to reliably avoid the deviation from the track. Here, in the case of schematizing a relationship between the right side track boundary risk potential $R2\_p\_rbr$ and the right side track boundary function $\sigma2\_r$, and a relationship between the left side track boundary risk potential $R2\_p\_rbl$ and the left side track boundary function $\sigma2\_l$, the relationships are illustrated in FIGS. 33 and 34.

Figure 35:
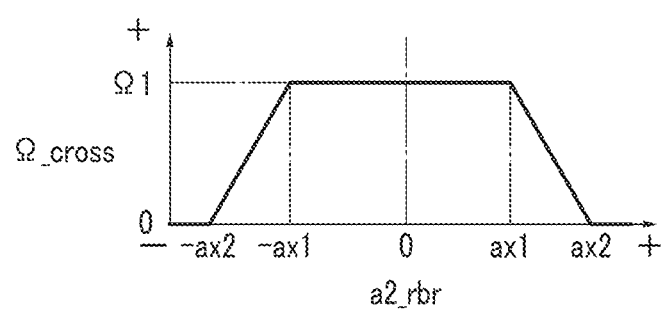
FIG. 35 is a diagram illustrating a map used for calculation of a crossing intention parameter.

In addition, $\Omega\_cross(a2\_rbr(k))$ in the above formula (163) is a crossing intention parameter, and is calculated by searching a map illustrated in FIG. 35 depending on the parameter $a2\_rbr$ that defines the right side boundary line LR2 described above. In the figure, ax1 and ax2 are predetermined values of the parameter $a2\_rbr$, satisfying $0 < ax1 < ax2$, and $\Omega\_1$ is a positive predetermined value of the crossing intention parameter $\Omega\_cross$.

As illustrated in FIG. 35, in the map, the crossing intention parameter $\Omega\_cross$ is set to the predetermined value $\Omega\_1$ in a case where the parameter $a2\_rbr$ falls within a range of $-ax1 < a2\_rbr < ax1$, and is set to a value 0 in a case where the parameter $a2\_rbr$ falls within a range of $a2\_rbr < -ax2$, $ax2 < a2\_rbr$. Further, the crossing intention parameter $\Omega\_cross$ is set so that, in a case where the parameter $a2\_rbr$ falls within a range of $-ax2 < a2\_rbr < -ax1$, the parameter $a2\_rbr$ increases toward the predetermined value $\Omega\_1$, and in a case where the parameter $a2\_rbr$ falls within a range of $ax1 < a2\_rbr < ax2$, the parameter $a2\_rbr$ decreases toward 0.

Figure 36:
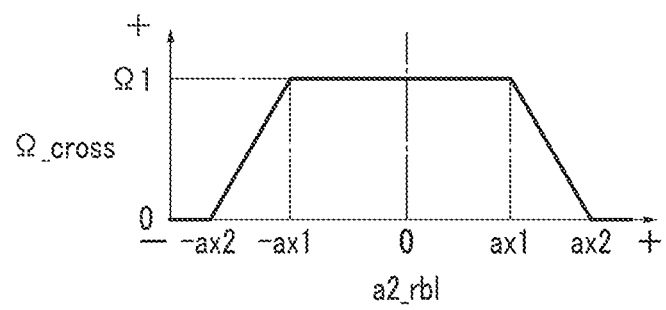
FIG. 36 is a diagram illustrating a map used for calculation of a crossing intention parameter.

Further, $\Omega\_cross(a2\_rbl(k))$ in the above formula (165) is also a crossing intention parameter, and is calculated by searching a map illustrated in FIG. 36 depending on the parameter $a2\_rbl$ that defines the left side boundary line LL2 described above. In the map, the crossing intention parameter $\Omega\_cross$ is set similarly to FIG. 35 with respect to the value of the parameter $a2\_rbl$.

Figure 37:
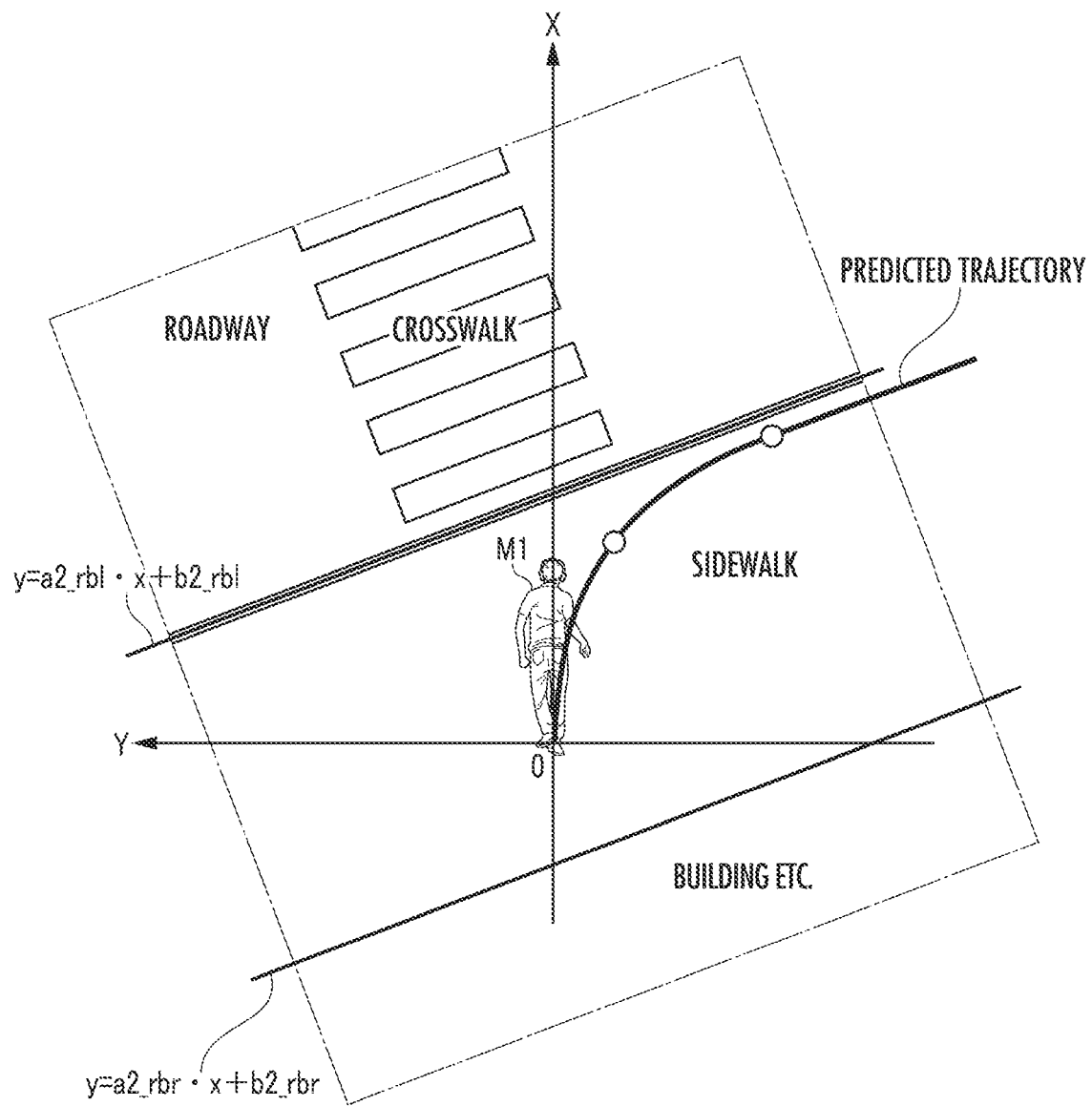
FIG. 37 is a diagram illustrating a predicted trajectory of the pedestrian in a case where the crossing intention parameter is not used.
Figure 38:
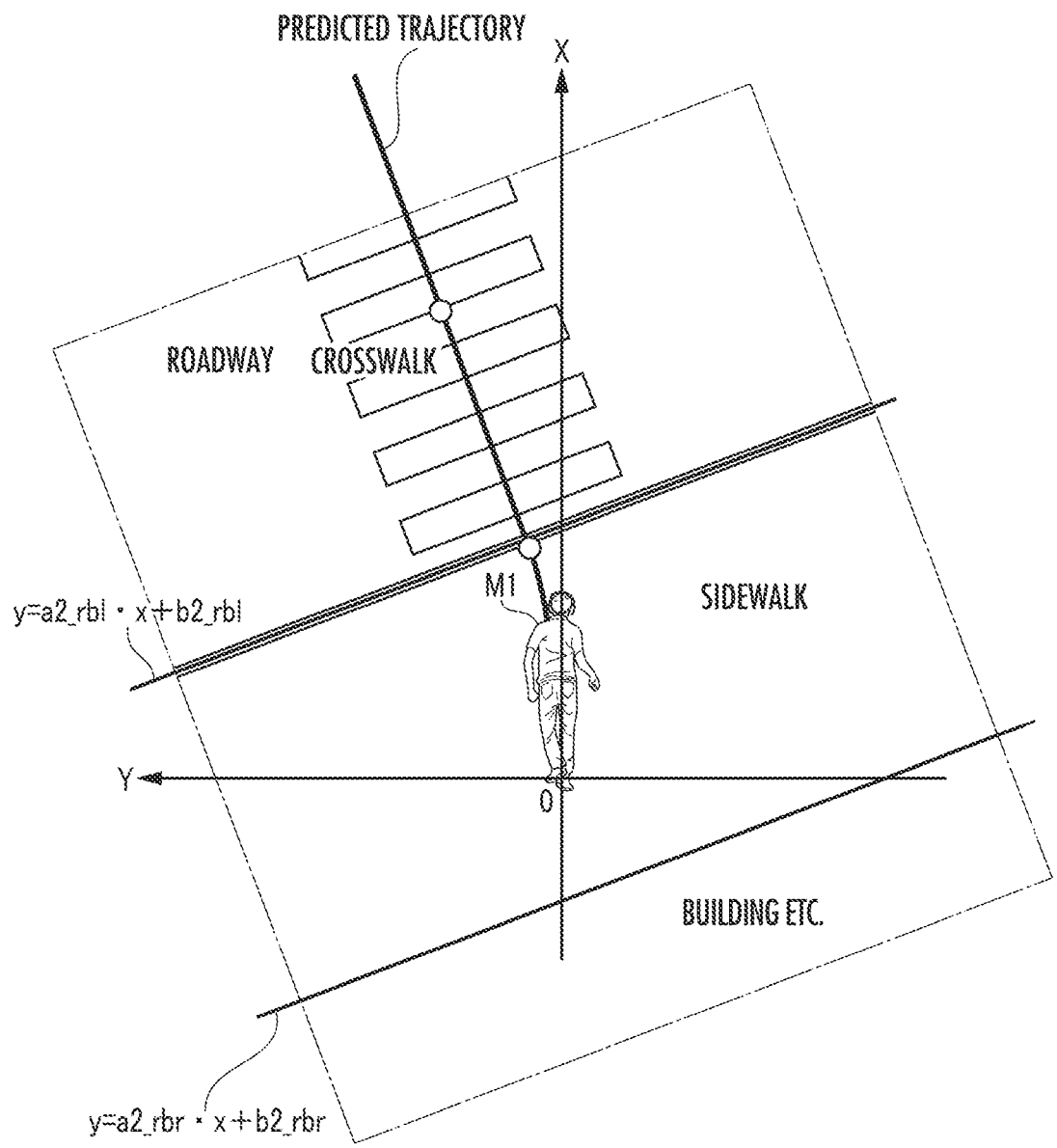
FIG. 38 is a diagram illustrating a predicted trajectory of the pedestrian in a case where the crossing intention parameter is used.

These two values $\Omega\_cross(rbr(k))$ and $\Omega\_cross(rbl(k))$ are used in the above formulas (163) and (165) for the following reason. For example, as illustrated in FIG. 37, in a case where a formula in which the values $\Omega\_cross(rbr(k))$ and $\Omega\_cross(rbl(k))$ of the above formulas (163) and (165) are omitted is used when the pedestrian M1 heads from the sidewalk to the crosswalk, the predicted trajectory is determined so as to remain in the sidewalk due to effects of the two track boundary functions $\sigma2\_r$ and $\sigma2\_l$. Thus, in the case of the present embodiment, the two values $\Omega\_cross(rbr(k))$ and $\Omega\_cross(rbl(k))$ are used so that an event as illustrated in FIG. 37 is avoided and the predicted trajectory is determined so as to head toward the crosswalk side when the pedestrian M1 heads from the sidewalk to the crosswalk as illustrated in FIG. 38.

Next, according to the same principle as described above, a right side track boundary function $\sigma2\_r\_mi$ and a left side track boundary function $\sigma2\_l\_mi$ at the predicted position $Z2\_mi$ of the pedestrian M1 are defined as shown in the following formulas (167) and (168).

[MATH. 167]

$$\sigma2\_r\_mi(k)=y2\_mi(k)-a2\_rbr(k)\cdot x2\_mi(k)-b2\_rbr(k) \quad (167)$$

[MATH. 168]

$$\sigma2\_l\_mi(k)=y2\_mi(k)-a2\_rbl(k)\cdot x2\_mi(k)-b2\_rbl(k) \quad (168)$$

Further, according to the principle described above, the right side track boundary risk potential $R2\_p\_rbr\_mi$ at the predicted position $Z2\_mi$ of the pedestrian M1 is calculated by the following formulas (169) and (170), and the left side track boundary risk potential $R2\_p\_rbl\_mi$ at the predicted position $Z2\_mi$ of the pedestrian M1 is calculated by the following formulas (171) and (172).

[MATH. 169]

When $\sigma2\_r\_mi(k) \leq \sigma2\_mrg$ $$R2\_p\_rbr\_mi(k)=\Omega\_cross(a2\_rbr(k))\cdot|\sigma2\_r\_mi(k)-\sigma2\_mrg| \quad (169)$$

[MATH. 170]

When $\sigma2\_mrg < \sigma2\_r\_mi(k)$ $$R2\_p\_rbr\_mi(k)=0 \quad (170)$$

[MATH. 171]

When $-\sigma2\_mrg < \sigma2\_l\_mi(k)$ $$R2\_p\_rbl\_mi(k)=\Omega\_cross(a2\_rbl(k))\cdot|\sigma2\_l\_mi(k)+\sigma2\_mrg| \quad (171)$$

[MATH. 172]

When $\sigma2\_l\_mi(k) < -\sigma2\_mrg$ $$R2\_p\_rbl\_mi(k)=0 \quad (172)$$

Figure 39:
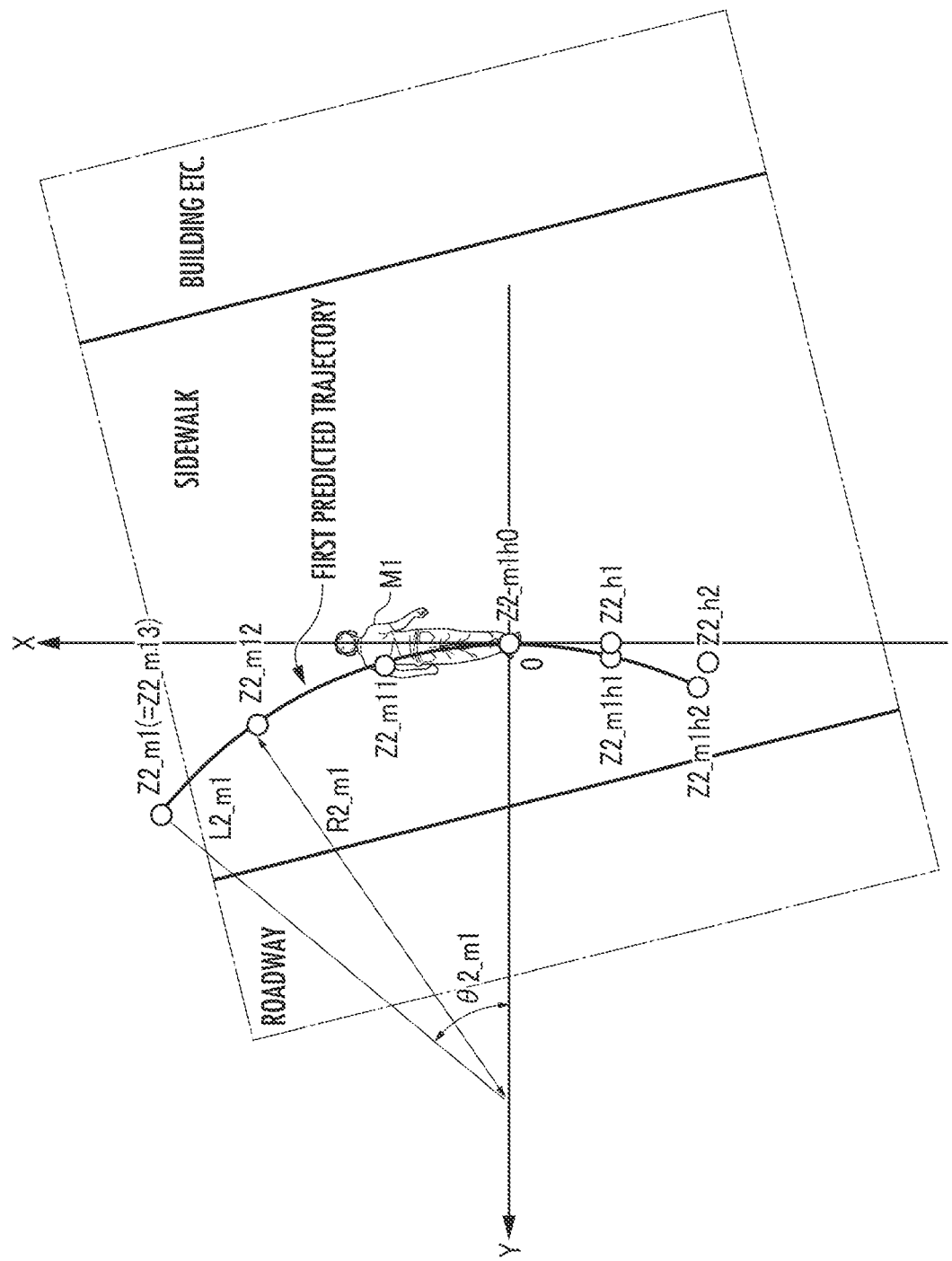
FIG. 39 is a diagram for explaining a method of calculating a trace potential.

Next, a method of calculating a trace potential Tr will be described with reference to FIG. 39. In the figure, $Z2\_h1$ is an actual measurement position of the pedestrian M1 at the control time before the predetermined time Th1, and $Z2\_h2$ is an actual measurement position of the pedestrian M1 at the control time before the predetermined time Th2.

In addition, as described above, the estimated position $Z2\_m1h1$ before the predetermined time Th1 in the figure is a position at the control time before the predetermined time Th1 when it is estimated that the pedestrian M1 moves along the arc trajectory obtained by extending the first predicted trajectory from the control time before the predetermined time Th1 to the current control time, and the estimated position $Z2\_m1h2$ before the predetermined time Th2 is a position at the control time before the predetermined time Th2 when it is estimated that the pedestrian M1 moves along the arc trajectory obtained by extending the first predicted trajectory from the control time before the predetermined time Th2 to the current control time.

In the present embodiment, in the calculation of the first predicted trajectory, the trace potential Tr is calculated by a method described below to ensure followability of the first predicted trajectory with respect to the two actual measurement positions Z2_h1 and Z2_h2 of the pedestrian M1.

First, an x coordinate deviation δxh1 before the predetermined time Th1 and a y coordinate deviation δyh1 before the predetermined time Th1 are calculated by the following formulas (173) and (174).

[MATH. 173]

$$\delta xh1(k)=x2\_m1h1(k)-x2\_h1(k) \quad (173)$$

[MATH. 174]

$$\delta yh1(k)=y2\_m1h1(k)-y2\_h1(k) \quad (174)$$

Next, an x coordinate deviation δxh2 before the predetermined time Th2 and a y coordinate deviation δyh2 before the predetermined time Th2 are calculated by the following formulas (175) and (176).

[MATH. 175]

$$\delta xh2(k)=x2\_m1h2(k)-x2\_h2(k) \quad (175)$$

[MATH. 176]

$$\delta yh2(k)=y2\_m1h2(k)-y2\_h2(k) \quad (176)$$

Then, the trace potential Tr is calculated by the following formula (177).

[MATH. 177]

$$Tr(k) = \sum_{N=1}^{2} \left(\delta xhN(k)^2 + \delta yhN(k)^2\right) \quad (177)$$

As shown in the above formula (177), the trace potential Tr is calculated as a value corresponding to a sum of squares error between the two estimated positions Z2_m1h1 and Z2_m1h2 and the two actual measurement positions Z2_h1 and Z2_h2. Thus, the smaller the trace potential Tr, the smaller differences between the two estimated positions Z2_m1h1 and Z2_m1h2 and the two actual measurement positions Z2_h1 and Z2_h2.

Note that the trace potential Tr may be calculated as described below. For example, an estimated value before predetermined time Th3 that is time before the predetermined time Th2 may be calculated in addition to the estimated positions Z2_m1h1 and Z2_m1h2 before the predetermined time Th1 and before the predetermined time Th2, an actual measurement position of the pedestrian M1 before the predetermined time Th3 may be acquired in addition to the actual measurement positions Z2_h1 and Z2_h2 of the pedestrian M1 before the predetermined time Th1 and before the predetermined time Th2, and a sum of squares of a deviation between three or more estimated values and respective three or more actual measurement positions may be used as the trace potential Tr.

Next, a description will be given of a method of calculating the first evaluation function J2_1 in the first evaluation function calculator 121 described above. The subscript "i" of various parameters used for calculation by the first evaluation function calculator 121 represents i=11 to 13.

The first evaluation function calculator 121 calculates the first evaluation function J2_1 by using three application predicted positions Z2_mi_r from the trajectory determiner 200 as described below, on the basis of the method and principle of calculating the risk potential R2_p_mi_vj_v, the right side track boundary risk potential R2_p_rbr_mi, and the left side track boundary risk potential R2_p_rbl_mi described above. These application predicted positions Z2_mi_r are obtained by applying the reference input r to the above-described three predicted positions Z2_mi, as described later.

Since the application predicted position Z2_mi_r obtained by applying the reference input r to the predicted position Z2_mi is used in the first evaluation function calculator 121, in the following description, similarly to the application predicted position Z2_mi_r, the various parameters described above to which "r" is added to the end thereof are used. The same applies to the second evaluation function calculator 122 and the third evaluation function calculator 123.

The first evaluation function calculator 121 first calculates an x coordinate deviation dx2_mi_vj_r(k:k) and a y coordinate deviation dy2_mi_vj_r(k:k) at the current control time by the following formulas (178) and (179).

[MATH. 178]

$$dx2\_mi\_vj\_r(k:k)=x2\_mi\_r(k)-x2\_vj(k:k) \quad (178)$$

[MATH. 179]

$$dy2\_mi\_vj\_r(k:k)=y2\_mi\_r(k)-y2\_vj(k:k) \quad (179)$$

In the above formula (178), x2_mi_r is an X coordinate value of the application predicted position Z2_mi_r, and x2_vj(k:k) is an X coordinate value of the current position W2_vj(k:k) of the traffic participant. In addition, y2_mi_r in the above formula (179) is a Y coordinate value of the application predicted position Z2_mi_r, and y2_vj(k:k) is a Y coordinate value of the current position W2_vj(k:k) of the traffic participant.

Next, an x coordinate deviation dx2_mi_vj_r(k:k+kmi) and a y coordinate deviation dy2_mi_vj_r(k:k+kmi) at predicted time k+kmi are calculated by the following formulas (180) and (181).

[MATH. 180]

$$dx2\_mi\_vj\_r(k:k+kmi)=x2\_mi\_r(k)-x2\_vj(k:k+kmi) \quad (180)$$

[MATH. 181]

$$dy2\_mi\_vj\_r(k:k+kmi)=y2\_mi\_r(k)-y2\_vj(k:k+kmi) \quad (181)$$

In the above formula (180), x2_vj(k:k+kmi) is an X coordinate value of a predicted position W2_vj(k:k+kmi) of the traffic participant, and in the above formula (181), y2_vj(k:k+kmi) is a Y coordinate value of the predicted position W2_vj(k:k+kmi) of the traffic participant.

Further, a transformed x coordinate deviation dx2_mi_vj_v_r(k:k) and a transformed y coordinate deviation dy2_mi_vj_v_r(k:k) at the current control time are calculated by the following formulas (182) and (183).

[MATH. 182]

$$dx2\_mi\_vj\_v\_r(k:k)=dx2\_mi\_vj\_r(k:k)\cdot\cos(\theta 2\_vj(k:k))+dy2\_mi\_vj\_r(k:k)\cdot\sin(\theta 2\_vj(k:k)) \quad (182)$$

[MATH. 183]

$$dy2\_mi\_vj\_v\_r(k{:}k) = dy2\_mi\_vj\_r(k{:}k) \cdot \cos(\theta 2\_vj(k{:}k)) - dx2\_mi\_vj\_r(k{:}k) \cdot \sin(\theta 2\_vj(k{:}k)) \quad (183)$$

These deviations dx2_*mi*_vj_v_r and dy2_*mi*_vj_v_r correspond to values obtained by transforming the deviations dx2_*mi*_vj_r and dy2_*mi*_vj_r in the coordinate system of the pedestrian M1 described above into the coordinate system of the traffic participant.

Next, a transformed x coordinate deviation dx2_*mi*_vj_v_r(k:k+kmi) and a transformed y coordinate deviation dy2_*mi*_vj_v_r(k:k+kmi) at the predicted time k+kmi are calculated by the following formulas (184) and (185).

[MATH. 184]

$$dx2\_mi\_vj\_v\_r(k{:}k{+}kmi) = dx2\_mi\_vj\_r(k{:}k{+}kmi) \cdot \cos(\theta 2\_vj(k{:}k{+}kmi)) + dy2\_mi\_vj\_r(k{:}k{+}kmi) \cdot \sin(\theta 2\_vj(k{:}k{+}kmi)) \quad (184)$$

[MATH. 185]

$$dy2\_mi\_vj\_v\_r(k{:}k{+}kmi) = dy2\_mi\_vj\_r(k{:}k{+}kmi) \cdot \cos(\theta 2\_vj(k{:}k{+}kmi)) - dx2\_mi\_vj\_r(k{:}k{+}kmi) \cdot \sin(\theta 2\_vj(k{:}k{+}kmi)) \quad (185)$$

These deviations dx2_*mi*_vj_v_r(k:k+kmi) and dy2_*mi*_vj_v_r(k:k+kmi) correspond to values obtained by transforming the deviations dx2_*mi*_vj_r(k:k+kmi) and dy2_*mi*_vj_r(k:k+kmi) in the coordinate system of the pedestrian M1 described above into the coordinate system of the traffic participant.

Further, an x-direction risk potential R2_px2_*mi*_vj_v_r (k:k) is calculated by searching a map (not illustrated) depending on the transformed x coordinate deviation dx2_*mi*_vj_v_r(k:k) described above. In this case, a map similar to that in FIG. 30 described above is used.

In addition, a y-direction risk potential R2_py2_*mi*_vj_v_r(k:k) is calculated by searching a map (not illustrated) depending on the transformed y coordinate deviation dy2_*mi*_vj_v_r(k:k). In this case, a map similar to that in FIG. 31 described above is used.

Next, a risk potential R2_*p*_mi_vj_v_r(k:k) at the current control time k is calculated by the following formula (186).

[MATH. 186]

$$R2\_p\_mi\_vj\_v\_r(k{:}k) = R2\_px\_mi\_vj\_v\_r(k{:}k) \cdot R2\_py\_mi\_vj\_v\_r(k{:}k) \quad (186)$$

Further, an x-direction risk potential R2_px2_*mi*_vj_v_r (k:k+kmi) is calculated by searching the map used for calculation of the x-direction risk potential R2_px2_*mi*_vj_v_r(k:k) depending on the transformed x coordinate deviation dx2_*mi*_vj_v_r(k:k+kmi) described above.

In addition, a y-direction risk potential R2_py2_*mi*_vj_v_r(k:k+kmi) is calculated by searching the map used for calculation of the y-direction risk potential R2_py2_*mi*_vj_v_r(k:k) depending on the transformed y coordinate deviation dy2_*mi*_vj_v_r(k:k+kmi) described above.

Next, a risk potential R2_*p*_mi_vj_v_r(k:k+kmi) at the predicted time k+kmi is calculated by the following formula (187). Note that, in the present embodiment, the risk potentials R2_*p*_mi_vj_v_r(k:k) and R2_*p*_mi_vj_v_r(k:k+kmi) correspond to interference degree parameters.

[MATH. 187]

$$R2\_p\_mi\_vj\_v\_r(k{:}k{+}kmi) = R2\_px\_mi\_vj\_v\_r(k{:}k{+}kmi) \cdot R2\_py\_mi\_vj\_v\_r(k{:}K{+}kmi) \quad (187)$$

A right side track boundary function σ2_r_mi_r and a left side track boundary function σ2_*l*_mi_r at the predicted position Z2_*mi* of the pedestrian M1 are defined as shown in the following formulas (188) and (189).

[MATH. 188]

$$\sigma 2\_r\_mi\_r(k) = y2\_mi\_r(k) - a2\_rbr(k) \cdot x2\_mi\_r(k) - b2\_rbr(k) \quad (188)$$

[MATH. 189]

$$\sigma 2\_l\_mi\_r(k) = y2\_mi\_r(k) - a2\_rbl(k) \cdot x2\_mi\_r(k) - b2\_rbl(k) \quad (189)$$

Further, a right side track boundary risk potential R2_*p*_rbr_mi_r is calculated by the following formulas (190) and (191), and a left side track boundary risk potential R2_*p*_rbl_mi_r is calculated by the following formulas (192) and (193). Note that, in the present embodiment, the right side and left side track boundary risk potentials R2_*p*_rbr_mi_r and R2_*p*_rbl_mi_r correspond to the interference degree parameters.

[MATH. 190]

When $\sigma 2\_r\_mi\_r(k) \leq \sigma 2\_mrg$ $$R2\_p\_rbr\_mi\_r(k) = \Omega\_cross(a2\_rbr(k)) \cdot |\sigma 2\_r(k) - \sigma 2\_mrg| \quad (190)$$

[MATH. 191]

When $\sigma 2\_mrg < \sigma 2\_r\_mi\_r(k)$ $$R2\_p\_rbr\_mi\_r(k) = 0 \quad (191)$$

[MATH. 192]

When $-\sigma 2\_mrg \leq \sigma 2\_l\_mi\_r(k)$ $$R2\_p\_rbl\_mi\_r(k) = \Omega\_cross(a2\_rbl(k)) \cdot |\sigma 2\_l(k) + \sigma 2\_mrg| \quad (192)$$

[MATH. 193]

When $\sigma 2\_l\_mi\_r(k) < -\sigma 2\_mrg$ $$R2\_p\_rbl\_mi\_r(k) = 0 \quad (193)$$

Next, an x coordinate deviation δxh1_*r* before the predetermined time Th1 and a y coordinate deviation δyh1_*r* before the predetermined time Th1 are calculated by the following formulas (194) and (195).

[MATH. 194]

$$\delta xh1\_r(k) = x2\_m1h1\_r(k) - x2\_h1(k) \quad (194)$$

[MATH. 195]

$$\delta yh1\_r(k) = y2\_m1h1\_r(k) - y2\_h1(k) \quad (195)$$

Further, an x coordinate deviation δxh2_*r* before the predetermined time Th2 and a y coordinate deviation δyh2_*r* before the predetermined time Th2 are calculated by the following formulas (196) and (197).

[MATH. 196]

$$\delta xh2\_r(k) = x2\_m1h2\_r(k) - x2\_h2(k) \quad (196)$$

[MATH. 197]

$$\delta yh2\_r(k) = y2\_m1h2\_r(k) - y2\_h2(k) \qquad (196)$$

In addition, a trace potential Tr_r is calculated by the following formula (198).

[MATH. 198]

$$\mathrm{Tr}\_r(k) = \sum_{N=1}^{2}\left(\delta xhN(k)^2 + \delta yhN(k)^2\right) \qquad (198)$$

As shown in the above formulas (194) to (198), the trace potential Tr_r is calculated as a value corresponding to a sum of squares error between the two estimated positions Z2_m1h1_r and Z2_m1h2_r and the two actual measurement positions Z2_h1 and Z2_h2. Thus, the smaller the trace potential Tr, the smaller the differences between the two estimated positions Z2_m1h1_r and Z2_m1h2_r and the two actual measurement positions Z2_h1 and Z2_h2.

Finally, the first evaluation function J2_1 is calculated by the following formula (199).

[MATH. 199]

$$\begin{aligned}J2\_1(k) = \sum_{j=1}^{n}&\bigl(R2\_p\_m11\_vj\_v\_r(k\!:\!k) + R2\_p\_m12\_vj\_v\_r(k\!:\!k) + \\ &R2\_p\_m13\_vj\_v\_r(k\!:\!k) + R2\_p\_m11\_vj\_v\_r(k\!:\!k+km11) + \\ &R2\_p\_m12\_vj\_v\_r(k\!:\!k+km12) + R2\_p\_m13\_vj\_v\_r(k\!:\!k+km13)\bigr) + \\ &R2\_p\_rbr\_m11\_r(k) + R2\_p\_rbl\_m11\_r(k) + \\ &R2\_p\_rbr\_m12\_r(k) + R2\_p\_rbl\_m12\_r(k) + \\ &R2\_p\_rbr\_m13\_r(k) + R2\_p\_rbl\_m13\_r(k) + \omega\_tr\cdot\mathrm{Tr}\_r(k)\end{aligned} \qquad (199)$$

In the above formula (199), ω_tr is a predetermined weighting factor, and n represents the number of interference objects located in front of the pedestrian M1. As shown in the formula (199), the first evaluation function J2_1 is calculated as a sum of a sum total of the risk potentials R2_p_mi_vj_v_r of three predicted positions Z2_mi (i=11 to 13) at the current control time k and the predicted time k+kmi (i=11 to 13), the right side and left side track boundary risk potentials R2_p_rbr_mi_r and R2_p_rbl_mi_r, and a product ω_tr·Tr_r of the weighting factor and the trace potential.

Next, a description will be given of a method of calculating the second evaluation function J2_2 in the second evaluation function calculator 122 described above. As described below, the second evaluation function calculator 122 calculates the second evaluation function J2_2 by a method almost similar to that of the first evaluation function calculator 121 by using an application second predicted position Z2_m2_r from the trajectory determiner 200. The application predicted position Z2_m2_r is obtained by applying the reference input r to the second predicted position Z2_m2.

The second evaluation function calculator 122 first calculates an x coordinate deviation dx2_m2_vj_r(k:k+km2) and a y coordinate deviation dy2_m2_vj_r(k:k+km2) at the predicted time k+km2 by the following formulas (200) and (201).

[MATH. 200]

$$dx2\_m2\_vj\_r(k\!:\!k+km2) = x2\_m2\_r(k) - x2\_vj(k\!:\!k+km2) \qquad (200)$$

[MATH. 201]

$$dy2\_m2\_vj\_r(k\!:\!k+km2) = y2\_m2\_r(k) - y2\_vj(k\!:\!k+km2) \qquad (200)$$

In the above formula (200), x2_vj(k:k+km2) is an X coordinate value of a predicted position W2_vj(k:k+km2) of the traffic participant, and in the above formula (201), y2_vj(k:k+km2) is a Y coordinate value of the predicted position W2_vj(k:k+km2) of the traffic participant.

Further, a transformed x coordinate deviation dx2_m2_vj_v_r(k:k+km2) and a transformed y coordinate deviation dy2_m2_vj_v_r(k:k+km2) at the predicted time k+km2 are calculated by the following formulas (202) and (203).

[MATH. 202]

$$\begin{aligned}dx2\_m2\_vj\_v\_r(k\!:\!k+km2) =& \\ dx2\_m2\_vj\_r(k\!:\!k+km2)&\cdot\cos(\theta2\_vj(k\!:\!k+km2)) + \\ dy2\_m2\_vj\_r(k\!:\!k+km2)&\cdot\sin(\theta2\_vj(k\!:\!k+km2))\end{aligned} \qquad (202)$$

[MATH. 203]

$$\begin{aligned}dy2\_m2\_vj\_v\_r(k\!:\!k+km2) =& \\ dy2\_m2\_vj\_r(k\!:\!k+km2)&\cdot\cos(\theta2\_vj(k\!:\!k+km2)) - \\ dx2\_m2\_vj\_r(k\!:\!k+km2)&\cdot\sin(\theta2\_vj(k\!:\!k+km2))\end{aligned} \qquad (203)$$

Next, an x-direction risk potential R2_px2_m2_vj_v_r(k:k+km2) is calculated by searching a map (not illustrated) depending on the transformed x coordinate deviation dx2_m2_vj_v_r(k:k+km2) described above. In this case, a map similar to that in FIG. 30 described above is used.

In addition, a y-direction risk potential R2_py2_m2_vj_v_r(k:k+km2) is calculated by searching a map (not illustrated) depending on the transformed y coordinate deviation dy2_m2_vj_v_r(k:k+km2) described above. In this case, a map similar to that in FIG. 31 described above is used.

Next, a risk potential R2_ρ_m2_vj_v_r(k:k+km2) at the predicted time k+km2 is calculated by the following formula (204).

[MATH. 204]

$$R2\_\rho\_m2\_vj\_v\_r(k\!:\!k+km2) = R2\_px\_m2\_vj\_v\_r(k\!:\!k+km2)\cdot R2\_py\_m2\_vj\_v\_r(k\!:\!k+km2) \qquad (204)$$

In addition, a right side track boundary function σ2_r_m2_r and a left side track boundary function σ2_l_m2_r at the second predicted position Z2_m2 of the pedestrian M1 are defined as shown in the following formulas (205) and (206).

[MATH. 205]

$$\sigma2\_r\_m2\_r(k) = y2\_m2\_r(k) - a2\_rbr(k)\cdot x2\_m2\_r(k) - b2\_rbr(k) \qquad (205)$$

[MATH. 206]

$$\sigma2\_l\_m2\_r(k) = y2\_m2\_r(k) - a2\_rbl(k)\cdot x2\_m2\_r(k) - b2\_rbl(k) \qquad (205)$$

Further, a right side track boundary risk potential R2_p_rbr_m2_r is calculated by the following formulas (207) and (208), and a left side track boundary risk potential R2_p_rbl_m2_r is calculated by the following formulas (209) and (210).

[MATH. 207]

When $\sigma2\_r\_m2\_r(k) \leq \sigma2\_mrg$ $$R2\_p\_rbr\_m2\_r(k) = |\sigma2\_r\_m2\_r(k) - \sigma2\_mrg| \qquad (207)$$

[MATH. 208]

When $\sigma2\_mrg < \sigma2\_r\_m2\_r(k)$ $$R2\_p\_rbl\_m2\_r(k) = 0$$

[MATH. 209]

When $-\sigma2\_mrg \leq \sigma2\_l\_m2\_r(k)$ $$R2\_p\_rbl\_m2\_r(k) = |\sigma2\_l\_m2\_r(k) + \sigma2\_mrg\sigma| \qquad (209)$$

[MATH. 210]

When $\sigma2\_l\_m2\_r(k) < -\sigma2\_mrg$ $$R2\_p\_rbl\_m2\_r(k) = 0 \qquad (210)$$

Finally, the second evaluation function J2_2 is calculated by the following formula (211).

[MATH. 211]

$$J2\_2(k) = \sum_{j=1}^{n} R2\_p\_m2\_vj\_v\_r(k{:}k+km2) + R2\_p\_rbr\_m2\_r(k) + R2\_p\_rbl\_m2\_r(k) \qquad (211)$$

As shown in the formula (211), the second evaluation function J2_2 is calculated as a sum of a sum total of the risk potentials R2_ρ_m2_vj_v_r at the second predicted position Z2_m2, and the right side and left side track boundary risk potentials R2_p_rbr_m2_r and R2_p_rbl_m2_r.

Next, a description will be given of a method of calculating the third evaluation function J2_3 in the third evaluation function calculator 123 described above. As described below, the third evaluation function calculator 123 calculates the third evaluation function J2_3 by a method similar to that of the second evaluation function calculator 122 by using an application third predicted position Z2_m3_r from the trajectory determiner 200. The application predicted position Z2_m3_r is obtained by applying the reference input r to the third predicted position Z2_m3.

The third evaluation function calculator 123 first calculates an x coordinate deviation dx2_m3_vj_r(k:k+km3) and a y coordinate deviation dy2_m3_vj_r(k:k+km3) at the predicted time k+km3 by the following formulas (212) and (213).

[MATH. 212]

$$dx2\_m3\_vj\_r(k{:}k+km3) = x2\_m3\_r(k) - x2\_vj(k{:}k+km3) \qquad (212)$$

[MATH. 213]

$$dy2\_m3\_vj\_r(k{:}k+km3) = y2\_m3\_r(k) - y2\_vj(k{:}k+km3) \qquad (213)$$

In the above formula (212), x2_vj(k:k+km3) is an X coordinate value of a predicted position W2_vj(k:k+km3) of the traffic participant, and in the above formula (213), y2_vj(k:k+km3) is a Y coordinate value of the predicted position W2_vj(k:k+km3) of the traffic participant.

Further, a transformed x coordinate deviation dx2_m3_vj_v_r(k:k+km3) and a transformed y coordinate deviation dy2_m3_vj_v_r(k:k+km3) at the predicted time k+km3 are calculated by the following formulas (214) and (215).

[MATH. 214]

$$dx2\_m3\_vj\_v\_r(k{:}k+km3) = dx2\_m3\_vj\_r(k{:}k+km3) \cdot \cos(\theta2\_vj(k{:}k+km3)) + dy2\_m3\_vj\_r(k{:}k+km3) \cdot \sin(\theta2\_vj(k{:}k+km3)) \qquad (214)$$

[MATH. 215]

$$dy2\_m3\_vj\_v\_r(k{:}k+km3) = dy2\_m3\_vj\_r(k{:}k+km3) \cdot \cos(\theta2\_vj(k{:}k+km3)) - dx2\_m3\_vj\_r(k{:}K+km3) \cdot \sin(\theta2\_vj(k{:}K+km3)) \qquad (214)$$

Next, an x-direction risk potential R2_px2_m3_vj_v_r(k:k+km3) is calculated by searching a map (not illustrated) depending on the transformed x coordinate deviation dx2_m3_vj_v_r(k:k+km3) described above. In this case, a map similar to that in FIG. 30 described above is used.

In addition, a y-direction risk potential R2_py2_m3_vj_v_r(k:k+km3) is calculated by searching a map (not illustrated) depending on the transformed y coordinate deviation dy2_m3_vj_v_r(k:k+km3) described above. In this case, a map similar to that in FIG. 31 described above is used.

Next, a risk potential R2_ρ_m3_vj_v_r(k:k+km3) at the predicted time k+km3 is calculated by the following formula (216).

[MATH. 216]

$$R2\_p\_m3\_vj\_v\_r(k{:}k+km3) = R2\_px\_m3\_vj\_v\_r(k{:}k+km3) \cdot R2\_py\_m3\_vj\_v\_r(k{:}K+km3) \qquad (216)$$

In addition, a right side track boundary function σ2_r_m3_r and a left side track boundary function σ2_l_m3_r at the third predicted position Z2_m3 of the pedestrian M1 are defined as shown in the following formulas (217) and (218).

[MATH. 217]

$$\sigma2\_r\_m3\_r(k) = y2\_m3\_r(k) - a2\_rbr(k) \cdot x2\_m3\_r(k) - b2\_rbr(k) \qquad (217)$$

[MATH. 218]

$$\sigma2\_l\_m3\_r(k) = y2\_m3\_r(k) - a2\_rbl(k) \cdot x2\_m3\_r(k) - b2\_rbl(k) \qquad (218)$$

Further, a right side track boundary risk potential R2_p_rbr_m3_r is calculated by the following formulas (219) and (220), and a left side track boundary risk potential R2_p_rbl_m3_r is calculated by the following formulas (221) and (222).

[MATH. 219]

When $\sigma2\_r\_m3\_r(k) \leq \sigma2\_mrg$ $$R2\_p\_rbr\_m3\_r(k) = |\sigma2\_r\_m3\_r(k) - \sigma2\_mrg| \qquad (219)$$

[MATH. 220]

When $\sigma2\_r\_mrg < \sigma2\_r\_m3\_r(k)$ $$R2\_p\_rbr\_m3\_r(k) = 0$$

[MATH. 221]

When $-\sigma 2\_mrg \leq \sigma 2\_l\_m3\_r(k)$ $$R2\_p\_rbl\_m3\_r(k)=|\sigma 2\_l\_m3\_r(k)+\sigma 2\_mrg| \qquad (221)$$

[MATH. 222]

When $\sigma 2\_l\_m3\_r(k)<-\sigma 2\_mrg$ $$R2\_p\_rbl\_m3\_r(k)=0 \qquad (222)$$

Finally, the third evaluation function J2_3 is calculated by the following formula (223).

[MATH. 223]

$$J2\_3(k) = \sum_{j=1}^{n} R2\_p\_m3\_vj\_v\_r(k:k+km3) + \qquad (223)$$
$$R2\_p\_rbr\_m3\_r(k) + R2\_p\_rbl\_m3\_r(k)$$

As shown in the formula (223), the third evaluation function J2_3 is calculated as a sum of a sum total of the risk potentials $R2\_\rho\_m3\_vj\_v\_r$ at the third predicted position $Z2\_m3$, and the right side and left side track boundary risk potentials $R2\_p\_rbr\_m3\_r$ and $R2\_p\_rbl\_m3\_r$.

Figure 40:
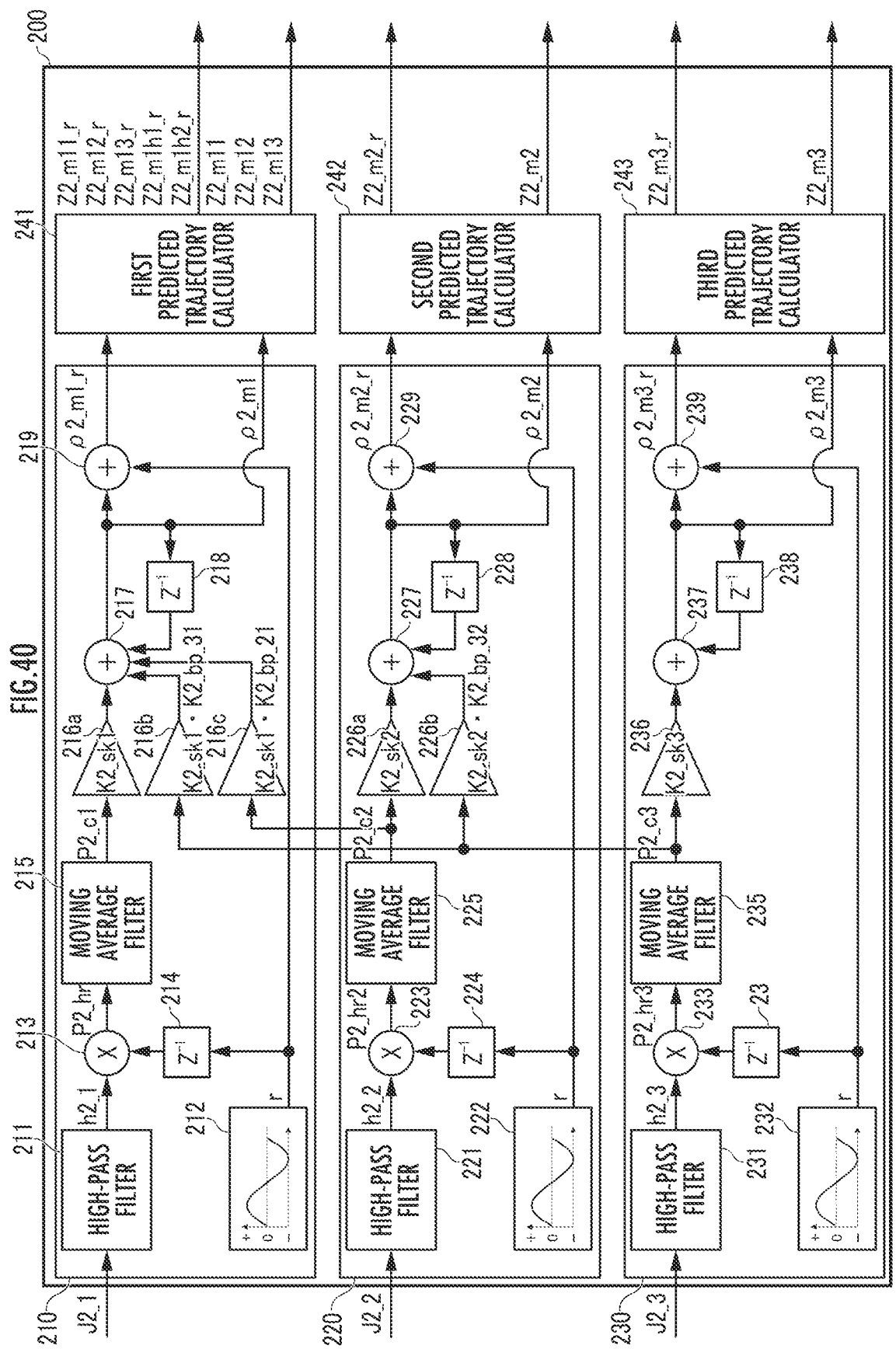
FIG. 40 is a block diagram illustrating a functional configuration of a trajectory determiner of the second embodiment.

Next, the trajectory determiner 200 mentioned above will be described. As illustrated in FIG. 40, the trajectory determiner 200 includes first to third extreme value search controllers 210 to 230 and first to third predicted trajectory calculators 241 to 243.

First, the first extreme value search controller 210 will be described. As described below, the first extreme value search controller 210 calculates a predicted curvature $\rho 2\_m1$ and an application predicted curvature $\rho 2\_m1\_r$ by a method similar to that of the first extreme value search controller 31 of the first embodiment. The predicted curvature $\rho 2\_m1$ corresponds to the reciprocal of the curvature radius $R2\_m1$ of the first predicted trajectory in FIG. 29 described above.

As illustrated in FIG. 40, the first extreme value search controller 210 includes a high-pass filter 211, a reference input generator 212, two delay elements 214 and 218, a multiplier 213, a moving average filter 215, three amplification elements 216a, 216b, and 216c, and two addition elements 217 and 219.

In the high-pass filter 211, a filter value $h2\_1$ is calculated by the following formula (224).

[MATH. 224]

$$h2\_1(k)=J2\_1(k)-J2\_1(k-1) \qquad (224)$$

The reference input generator 212 generates the reference input r described above. The reference input r is input to the multiplier 213 via the delay element 214, and the multiplier 213 calculates an intermediate value P2_hr1 by the following formula (225).

[MATH. 225]

$$P2\_hr1(k)=h2\_1(k)\cdot r2\_1(k-1) \qquad (225)$$

In the moving average filter 215, a moving average value $P2\_c1$ is calculated by the following formula (226). Note that, in the present embodiment, the moving average value $P2\_c1$ corresponds to the amount of correction.

[MATH. 226]

$$P2\_c1(k) = \frac{1}{n\_r+1}\sum_{i=0}^{n\_r} P2\_hr1(k-i) \qquad (226)$$

Next, to the addition element 217, the moving average value $P2\_c1$ is input in a state of being amplified by a predetermined gain K2_sk1 by the amplification element 216a, the moving average value $P2\_c2$ described later is input in a state of being amplified by a gain K2_sk1·K2_bp_21 by the amplification element 216c, and the moving average value $P2\_c3$ described later is input in a state of being amplified by a gain K2_sk1·K2_bp_32 by the amplification element 216b.

Figure 41:
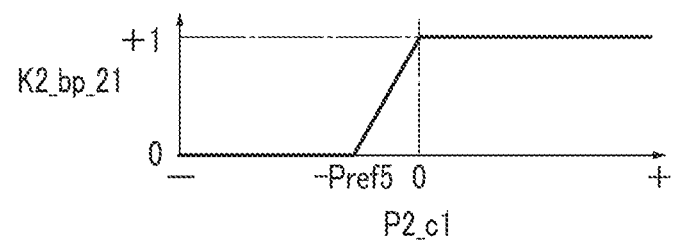
FIG. 41 is a diagram illustrating a map used for calculation of a gain.

Here, when $P2\_c2 \geq 0$, a gain K2_bp_21 is calculated by searching a map illustrated in FIG. 41 depending on the moving average value $P2\_c1$. Pref5 in FIG. 41 is a positive predetermined value. In the map, the gain K2_bp_21 is set to a value 1 in a range of $0<P2\_c1$, is set to a value 0 in a range of $P2\_c1<-$Pref5, and is set to be closer to the value 1 as the moving average value $P2\_c1$ is larger in a range of $-$Pref5$\leq P2\_c1 \leq 0$.

Figure 42:
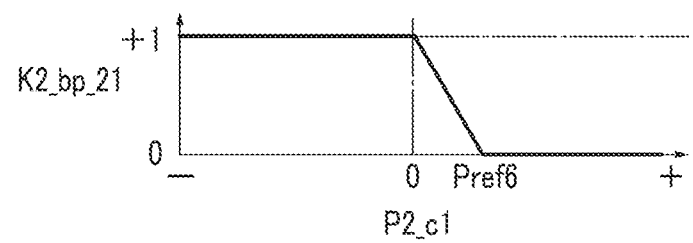
FIG. 42 is a diagram illustrating a map used for calculation of the gain.

Furthermore, when $P2\_c2<0$, the gain K2_bp2_21 is calculated by searching a map illustrated in FIG. 42 depending on the moving average value $P2\_c1$. Pref6 in FIG. 42 is a positive predetermined value, and Pref5 and Pref6 may be the same value, or may be different values from each other. In the map, the gain K2_bp2_21 is set to a value 1 in a range of $P2\_c1<0$, is set to a value 0 in a range of Pref6$<P2\_c1$, and is set to be closer to the value 0 as the moving average value $P2\_c1$ is larger in a range of $0 \leq P2\_c1 \leq$Pref6.

Figure 43:
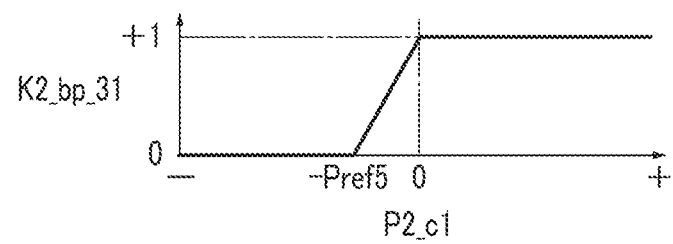
FIG. 43 is a diagram illustrating a map used for calculation of a gain.

Further, when $P2\_c2 \geq 0$ & $P2\_c3 \geq 0$, a gain K2_bp2_31 is calculated by searching a map illustrated in FIG. 43 depending on the moving average value $P2\_c1$. In the map, the gain K2_bp2_31 is set to a value 1 in the range of $0<P2\_c1$, is set to a value 0 in the range of $P2\_c1<-$Pref5, and is set to be closer to the value 1 as the moving average value $P2\_c1$ is larger in the range of $-$Pref5$\leq P2\_c1 \leq 0$.

Figure 44:
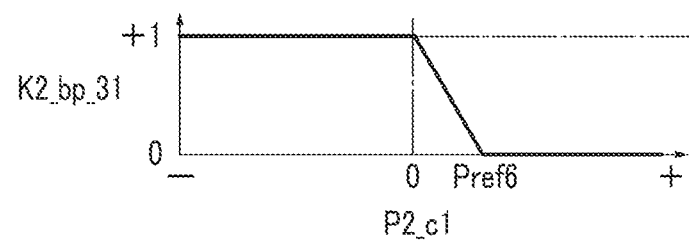
FIG. 44 is a diagram illustrating a map used for calculation of the gain.

Furthermore, when $P2\_c2<0$ & $P2\_c3<0$, the gain K2_bp2_31 is calculated by searching a map illustrated in FIG. 44 depending on the moving average value $P2\_c1$. In the map, the gain K2_bp2_31 is set to a value 1 in the range of $P2\_c1<0$, is set to a value 0 in the range of Pref6$<P2\_c1$, and is set to be closer to the value 0 as the moving average value $P2\_c1$ is larger in the range of $0 \leq P2\_c1 \leq$Pref6.

Further, the gain K2_bp2_31 is calculated as a value 0 when signs of the two moving average values $P2\_c2$ and $P2\_c3$ are different from each other. Descriptions will be given later of a reason why the two gains K2_bp_21 and K2_bp_31 are calculated as described above, a reason why a value $P2\_c2 \cdot$K2_sk1·K2_bp_21 is input from the second extreme value search controller 220 to the first extreme value search controller 210, and a reason why a value $P2\_c3 \cdot$K2_sk1·K2_bp_31 is input from the third extreme value search controller 230 to the first extreme value search controller 210.

Further, the predicted curvature $\rho 2\_m1$ is input to the addition element 217 via the delay element 218. Then, in the addition element 217, the predicted curvature $\rho 2\_m1$ is calculated by the following formula (227).

[MATH. 227]

$$\rho 2\_m1(k)=\rho 2\_m2(k-1)+K2\_sk1 \cdot (P2\_c1(k)+$$
$$K2\_bp\_21(k) \cdot P2\_c2(k)+K2\_bp\_31(k) \cdot P2\_c3(k)) \qquad (227)$$

Further, in the addition element 219, the application predicted curvature ρ2_m1_r is calculated by the following formula (228).

[MATH. 228]

$$\rho2\_m1\_r(k)=\rho2\_m1(k)+r(k) \quad (228)$$

Then, the predicted curvature ρ2_m1 and the application predicted curvature ρ2_m1_r calculated as described above are input from the first extreme value search controller 210 to the first predicted trajectory calculator 241.

Next, the second extreme value search controller 220 will be described. As described below, the second extreme value search controller 220 calculates a predicted curvature ρ2_m2 and an application predicted curvature ρ2_m2_r by a method similar to that of the second extreme value search controller 32 of the first embodiment. The predicted curvature ρ2_m2 corresponds to the reciprocal of the curvature radius R2_m2 of the second predicted trajectory described above.

As illustrated in FIG. 40, the second extreme value search controller 220 includes a high-pass filter 221, a reference input generator 222, two delay elements 224 and 228, a multiplier 223, a moving average filter 225, two amplification elements 226a and 226b, and two addition elements 227 and 229.

In the high-pass filter 221, a filter value h2_2 is calculated by the following formula (229).

[MATH. 229]

$$h2\_2(k)=J2\_2(k)-J2\_2(k-1) \quad (229)$$

The reference input generator 222 generates the reference input r. The reference input r is input to the multiplier 223 via the delay element 224, and the multiplier 223 calculates an intermediate value P2_hr2 by the following formula (230).

[MATH. 230]

$$P2\_hr2(k)=h2\_2(k)\cdot r2\_2(k-1) \quad (230)$$

In the moving average filter 225, a moving average value P2_c2 is calculated by the following formula (231). Note that, in the present embodiment, the moving average value P2_c2 corresponds to the amount of correction.

[MATH. 231]

$$P2\_c2(k) = \frac{1}{n2\_r+1}\sum_{i=0}^{n2\_r} P2\_hr2(k-i) \quad (231)$$

Next, to the addition element 227, the moving average value P2_c2 is input in a state of being amplified by a predetermined gain K2_sk2 by the amplification element 226a, and the moving average value P2_c3 described later is input in a state of being amplified by a gain K2_sk2·K2_bp_32 by the amplification element 226b.

Figure 45:
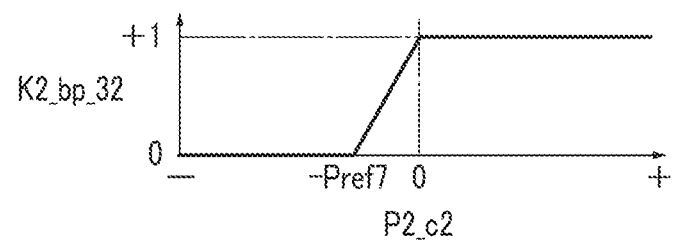
FIG. 45 is a diagram illustrating a map used for calculation of a gain.

Here, when P2_c3≥0, a gain K2_bp_32 is calculated by searching a map illustrated in FIG. 45 depending on the moving average value P2_c2. Pref7 in FIG. 45 is a positive predetermined value. In the map, the gain K2_bp_32 is set to a value 1 in a range of 0<P2_c2, is set to a value 0 in a range of P2_c2<−Pref7, and is set to be closer to the value 1 as the moving average value P2_c2 is larger in a range of −Pref7≤P2_c2≤0.

Figure 46:
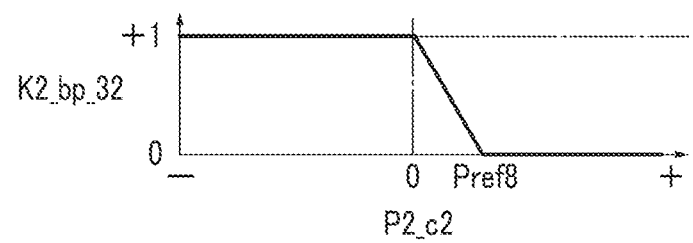
FIG. 46 is a diagram illustrating a map used for calculation of the gain.

Furthermore, when P2_c3<0, the gain K2_bp_32 is calculated by searching a map illustrated in FIG. 46 depending on the moving average value P2_c2. Pref8 in FIG. 46 is a positive predetermined value. Here, Pref7 and Pref8 may be the same value, or may be different values from each other.

In the map, the gain K2_bp_32 is set to a value 1 in a range of P2_c2<0, and is set to a value 0 in a range of Pref8<P2_c2, and is set to be closer to the value 0 as the moving average value P2_c2 is larger in a range of 0≤P2_c2≤Pref8. Descriptions will be given later of a reason why the gain K2_bp_32 is calculated as described above and a reason why a value P2_c3·K2_sk2·K2_bp_32 is input from the third extreme value search controller 230 to the second extreme value search controller 220.

Further, the predicted curvature ρ2_m2 is input to the addition element 227 via the delay element 228. Then, in the addition element 227, the predicted curvature ρ2_m2 is calculated by the following formula (232).

[MATH. 232]

$$\rho2\_m2(k)=\lambda\_fgt\cdot\rho2\_m2(k-1)+k2\_sk2\cdot(P2\_c2(k)+K2\_bp\_32(k)\cdot P2\_c3(k)) \quad (232)$$

In the above formula (232), λ_fgt is a forgetting factor and is set so that 0<fgt<1 holds. The forgetting factor λ_fgt is a value for returning the second predicted trajectory to a straight line (that is, for bringing the predicted curvature ρ2_m2 close to a value 0) when the risk potential is zero.

Further, in the addition element 229, the application predicted curvature ρ2_m2_r is calculated by the following formula (233).

[MATH. 233]

$$\rho2\_m2\_r(k)=\rho2\_m2(k)+r(k) \quad (233)$$

Then, the predicted curvature ρ2_m2 and the application predicted curvature ρ2_m2_r calculated as described above are input from the second extreme value search controller 220 to the second predicted trajectory calculator 242.

Next, the third extreme value search controller 230 will be described. As described below, the third extreme value search controller 230 calculates a predicted curvature ρ2_m3 and an application predicted curvature ρ2_m3_r by a method similar to that of the third extreme value search controller 33 of the first embodiment. The predicted curvature ρ2_m3 corresponds to the reciprocal of the curvature radius R2_m3 of the third predicted trajectory described above.

As illustrated in FIG. 40, the third extreme value search controller 230 includes a high-pass filter 231, a reference input generator 232, two delay elements 234 and 238, a multiplier 233, a moving average filter 235, an amplification element 236, and two addition elements 237 and 239.

In the high-pass filter 231, a filter value h2_3 is calculated by the following formula (234).

[MATH. 234]

$$h2\_3(k)=J2\_3(k)-J2\_3(k-1) \quad (234)$$

The reference input generator 232 generates the reference input r. The reference input r is input to the multiplier 233 via the delay element 234, and the multiplier 233 calculates an intermediate value P2_hr3 by the following formula (235).

[MATH. 235]

$$P2\_hr3(k)=h2\_3(k)\cdot r2\_3(k-1) \quad (235)$$

In the moving average filter 235, a moving average value P2_c3 is calculated by the following formula (236). Note that, in the present embodiment, the moving average value P2_c3 corresponds to the amount of correction.

[MATH. 236]

$$P2\_c3(k) = \frac{1}{n2\_r+1} \sum_{i=0}^{n2\_r} P2\_hr3(k-i) \quad (236)$$

Next, to the addition element 237, the moving average value P2_c3 is input in a state of being amplified by a predetermined gain K2_sk3 by the amplification element 236, and the predicted curvature ρ2_m3 is input via the delay element 238.

Then, in the addition element 237, the predicted curvature ρ2_m3 is calculated by the following formula (237).

[MATH. 237]

$$\rho2\_m3(k) = \lambda\_fgt \cdot \rho2\_m3(k-1) + K2\_sk3 \cdot P2\_c3(k) \quad (237)$$

The forgetting factor λ, fgt in the above formula (237) is a value for returning the third predicted trajectory to a straight line (that is, for bringing the predicted curvature ρ2_m3 close to a value 0) when the risk potential is zero.

Further, in the addition element 239, the application predicted curvature ρ2_m3_r is calculated by the following formula (238).

[MATH. 238]

$$\rho2\_m3\_r(k) = \rho2\_m3(k) + r(k) \quad (238)$$

Then, the predicted curvature ρ2_m3 and the application predicted curvature ρ2_m3_r calculated as described above are input from the third extreme value search controller 230 to the third predicted trajectory calculator 243.

Next, the first predicted trajectory calculator 241 mentioned above will be described. The first predicted trajectory calculator 241 calculates the three predicted positions Z2_m11 to Z2_m13 and three application predicted positions Z2_m11_r to Z2_m13_r on the basis of the principle described above by using the predicted curvature ρ2_m1 and the application predicted curvature ρ2_m1_r from the first extreme value search controller 210.

First, the X coordinate value x2_m11 and the Y coordinate value y2_m11 of the predicted position Z2_m11, the X coordinate value x2_m12 and the Y coordinate value y2_m12 of the predicted position Z2_m12, and the X coordinate value x2_m13 and the Y coordinate value y2_m13 of the predicted position Z2_m13 are calculated by the formulas (124) to (125), and (130) to (135) described above.

Next, the curvature radius R2_m1_r of the first predicted trajectory is calculated by the following formulas (239) and (240).

[MATH. 239]

When $\|\rho2\_m1\| > \rho2\_min$ $$R2\_m1\_r(k) = 1/\rho2\_m1\_r(k) \quad (239)$$

[MATH. 240]

When $|\rho2\_m1| \leq \rho2\_min$ $$R2\_m1\_r(k) = \mathrm{Sign}(\rho2\_m1\_r(k))/\rho2\_min \quad (240)$$

In the above formulas (239) and (240), ρ2_min is a predetermined minimum curvature (positive value).

Next, a rotation angle θ2_m1_r of the first predicted trajectory is calculated by the following formula (241).

[MATH. 241]

$$\theta2\_m1\_r(k) = L2\_m1(k)/R2\_m1\_r(k) \quad (241)$$

Further, an X coordinate value x2_m11_r and a Y coordinate value y2_m11_r of the application predicted position Z2_m11_r are calculated by the following formulas (242) and (243).

[MATH. 242]

$$x2\_m11\_r(k) = R2\_m1\_r(k) \cdot \sin(\theta2\_m1\_r(k)/3) \quad (242)$$

[MATH. 243]

$$y2\_m11\_r(k) = R2\_m1\_r(k) \cdot (1-\cos(\theta2\_m1\_r(k)/3)) \quad (243)$$

Next, an X coordinate value x2_m12_r and a Y coordinate value y2_m12_r of the application predicted position Z2_m12_r are calculated by the following formulas (244) and (245).

[MATH. 244]

$$x2\_m12\_r(k) = R2\_m1\_r(k) \cdot \sin(2\theta2\_m1\_r(k)/3) \quad (244)$$

[MATH. 245]

$$y2\_m12\_r(k) = R2\_m1\_r(k) \cdot (1-\cos(2\theta2\_m1\_r(k)/3)) \quad (245)$$

In addition, an X coordinate value x2_m13_r and a Y coordinate value y2_m13_r of the application predicted position Z2_m13_r are calculated by the following formulas (246) and (247).

[MATH. 246]

$$x2\_m13\_r(k) = R2\_m1\_r(k) \cdot \sin(\theta2\_m1\_r(k)) \quad (246)$$

[MATH. 247]

$$y2\_m13\_r(k) = R2\_m1\_r(k) \cdot (1-\cos(\theta2\_m1\_r(k))) \quad (247)$$

Further, an X coordinate value x2_m1h1_r and a Y coordinate value y2_m1h1_r of the estimated position Z2_m1h1_r before the predetermined time Th1 are calculated by the following formulas (248) and (249).

[MATH. 248]

$$x2\_m1h1\_r(k) = R2\_m1\_r(k) \cdot \sin(\theta2\_mh1\_r(k)) \quad (248)$$

[MATH. 249]

$$y2\_m1h1\_r(k) = R2\_m1\_r(k) \cdot (1-\cos(\theta2\_mh1\_r(k))) \quad (249)$$

Next, an X coordinate value x2_m1h2_r and a Y coordinate value y2_m1h2_r of the estimated position Z2_m1h2_r before the predetermined time Th2 are calculated by the following formulas (250) and (251).

[MATH. 250]

$$x2\_m1h2\_r(k) = R2\_m1\_r(k) \cdot \sin(\theta2\_mh2\_r(k)) \quad (250)$$

[MATH. 251]

$$y2\_m1h2\_r(k) = R2\_m1\_r(k) \cdot (1-\cos(\theta2\_mh2\_r(k))) \quad (251)$$

Next, the second predicted trajectory calculator 242 mentioned above will be described. The second predicted trajectory calculator 242 calculates the second predicted position Z2_m2 and the application second predicted position Z2_m2_r on the basis of the principle described above by using the predicted curvature ρ2_m2 and the application predicted curvature ρ2_m2_r from the second extreme value search controller 220.

First, the X coordinate value x2_m2 and the Y coordinate value y2_m2 of the second predicted position Z2_m2 are calculated by the formulas (142) to (147) described above.

Next, the curvature radius R2_m2_r of the second predicted trajectory is calculated by the following formulas (252) and (253).

[MATH. 252]

When |ρ2_m2|>ρ2_min $$R2\_m2\_r(k)=1/ρ2\_m2\_r(k) \tag{252}$$

[MATH. 253]

When |ρ2_m2|≤ρ2_min $$R2\_m2\_r(k)=\text{Sign}(ρ2\_m2\_r(k))/ρ2\_min \tag{253}$$

Next, a rotation angle θ2_m2_r of the second predicted trajectory is calculated by the following formula (254).

[MATH. 254]

$$θ2\_m2\_r(k)=L2\_m2(k)/R2\_m2\_r(k) \tag{254}$$

Further, the X' coordinate value x'_m2_r and the Y' coordinate value y'_m2_r of the application second predicted position Z2_m2_r in the X'-Y' coordinate system (see FIG. 29) are calculated by the following formulas (255) and (256).

[MATH. 255]

$$x2'\_m2\_r(k)=R2\_m2\_r(k)\cdot\sin(θ2\_m2\_r(k)) \tag{255}$$

[MATH. 256]

$$y2'\_m2\_r(k)=R2\_m2\_r(k)\cdot(1-\cos(θ2\_m2\_r(k))) \tag{256}$$

Next, an X coordinate value x2_m2_r and a Y coordinate value y2_m2_r of the application second predicted position Z2_m2_r in the X-Y coordinate system (see FIG. 29) are calculated by the following formulas (257) and (258).

[MATH. 257]

$$x2\_m2\_r(k)=x2'\_m2\_r(k)\cdot\cos(θ2\_m1(k))-y2'\_m2\_r(k)\cdot\sin(θ2\_m1(k))+x2\_m13(k) \tag{257}$$

[MATH. 258]

$$y2\_m2\_r(k)=x2'\_m2\_r(k)\cdot\sin(θ2\_m1(k))-y2'\_m2\_r(k)\cdot\cos(θ2\_m1(k))+y2\_m13(k) \tag{258}$$

Next, the third predicted trajectory calculator 243 mentioned above will be described. The third predicted trajectory calculator 243 calculates the third predicted position Z2_m3 and the application third predicted position Z2_m3_r on the basis of the principle described above by using the predicted curvature ρ2_m3 and the application predicted curvature ρ2_m3_r from the third extreme value search controller 230.

First, the X coordinate value x2_m3 and the Y coordinate value y2_m3 of the third predicted position Z2_m3 are calculated by the formulas (148) to (153) described above.

Next, the curvature radius R2_m3_r of the third predicted trajectory is calculated by the following formulas (259) and (260).

[MATH. 259]

When |ρ2_m3|>ρ2_min $$R2\_m3\_r(k)1/ρ2\_m3\_r(k) \tag{259}$$

[MATH. 260]

When |ρ2_m3|<ρ2_min $$R2\_m3\_r(k)=1/ρ2\_m3\_r(k) \tag{260}$$

Next, a rotation angle θ2_m3_r of the third predicted trajectory is calculated by the following formula (261).

[MATH. 261]

$$θ2\_m3\_r(k)=L2\_m3(k)/R2\_m3\_r(k) \tag{261}$$

Further, an x" coordinate value x"_m3_r and a Y" coordinate value y"_m3_r of the application third predicted position Z2_m3_r in the X"-Y" coordinate system (see FIG. 29) are calculated by the following formulas (262) and (263).

[MATH. 262]

$$x2"\_m3\_r(k)=R2\_m3\_r(k)\cdot\sin(θ2\_m3\_r(k)) \tag{262}$$

[MATH. 263]

$$y2"\_m3\_r(k)=R2\_m3\_r(k)\cdot(1-\cos(θ2\_m3\_r(k))) \tag{263}$$

Next, an X coordinate value x2_m3_r and a Y coordinate value y2_m3_r of the application third predicted position Z2_m3_r in the X-Y coordinate system (see FIG. 29) are calculated by the following formulas (264) and (265).

[MATH. 264]

$$x2\_m3\_r(k) = x2"\_m3\_r(k)\cdot\cos(θ2\_m1(k)+θ2\_m2(k)) - y2"\_m3\_r(k)\cdot\sin(θ2\_m1(k)+θ2\_m2(k)) + x2\_m2(k) \tag{264}$$

[MATH. 265]

$$y2\_m3\_r(k) = x2"\_m2\_r(k)\cdot\cos(θ2\_m1(k)+θ2\_m2(k)) + y2"\_m2\_r(k)\cdot\cos(θ2\_m1(k)+θ2\_m2(k)) + y2\_m2(k) \tag{265}$$

As described above, in the trajectory determiner 200, the first to third extreme value search controllers 210 to 230 calculate the predicted curvatures ρ2_m1 to ρ2_m3 of the first to third predicted trajectories, and on the basis of these predicted curvatures ρ2_m1 to ρ2_m3, calculate the five predicted positions Z2_mi (i=11 to 13, 2, and 3), the five application predicted positions Z2_mi_r (i=11 to 13, 2, and 3), and the estimated positions Z2_m1h1 and Z2_m1h2 before the predetermined time Th1 and before the predetermined time Th2 described above.

Next, a description will be given of a reason why the value P2_c2·K2_sk1·K2_bp_21 and the value P2_c3·K2_sk1·K2_bp_31 described above are input to the first extreme value search controller 210, a reason why the value P2_c3·K2_sk2·K2_bp_32 is input to the second extreme value search controller 220, and a reason why the three gains K2_bp_21, K2_bp_31, and K2_bp_32 are set as described above.

For example, in a case where the first to third extreme value search controllers 210 to 230 calculate the predicted curvatures ρ2_m1 to ρ2_m3 independently of each other, a state as described below may occur.

Figure 47:
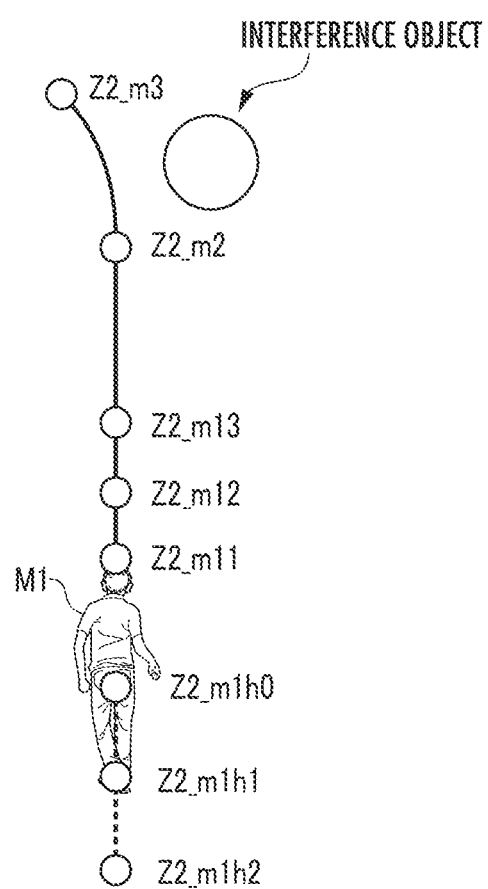
FIG. 47 is a diagram illustrating an example of a result of determination of first to third predicted trajectories in a case where an interference object exists in the right front of the pedestrian.

That is, as illustrated in FIG. 47, in a case where the interference object exists in the right front of the pedestrian M1, the first predicted trajectory (the current position to the predicted position $Z2\_m13$) and the second predicted trajectory (the predicted position $Z2\_m13$ to the second predicted position $Z2\_m2$) may be determined linearly, while the third predicted trajectory from the second predicted position $Z2\_m2$ to the third predicted position $Z2\_m3$ may be determined in an arc shape.

On the other hand, in a normal case, the pedestrian M1 does not move on a trajectory as illustrated in FIG. 47, and generally moves while starting turning in advance to avoid interference with the interference object before reaching the second predicted position $Z2\_m2$.

Figure 48:
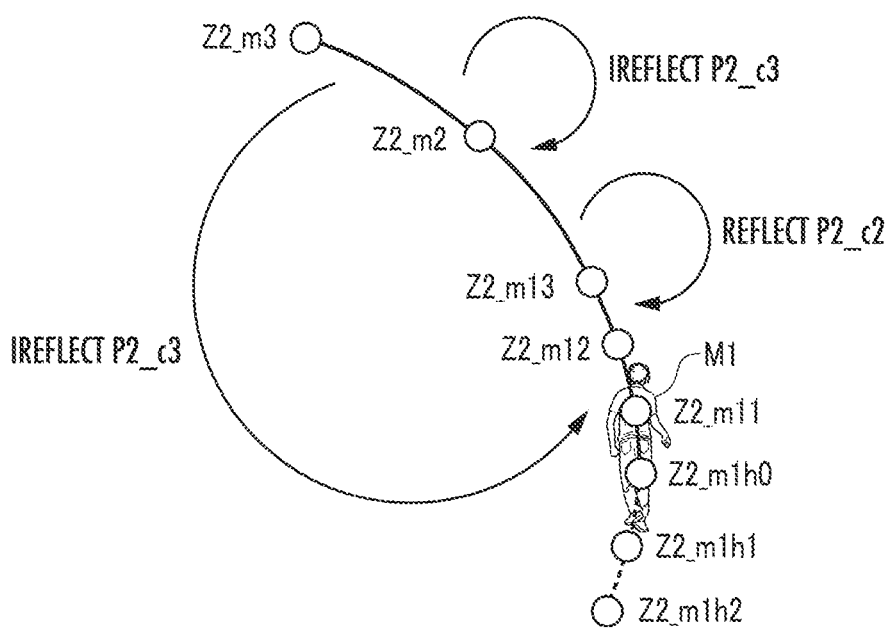
FIG. 48 is a diagram illustrating an example of the result of determination of the first to third predicted trajectories of the pedestrian.

Thus, the trajectory determiner 200 needs to predict and determine such a movement trajectory of the pedestrian M1. For example, as illustrated in FIG. 48, in a case where the first predicted trajectory, the second predicted trajectory, and the third predicted trajectory are determined to be the same turning direction, that is, in a case where signs of the three moving average values $P2\_c1$ to $P2\_c3$ are the same as each other, it is necessary to calculate the predicted curvature $\rho2\_m1$ while reflecting the two moving average values $P2\_c2$ and $P2\_c3$ and to calculate the predicted curvature $\rho2\_m2$ while reflecting the moving average value $P2\_c3$.

On the other hand, for example, as illustrated in FIG. 49, in a case where the first predicted trajectory and the second predicted trajectory are determined to be opposite turning directions and the second predicted trajectory and the third predicted trajectory are determined to be opposite turning directions, that is, in a case where the signs of the moving average values $P2\_c1$ and $P2\_c2$ are different from each other and signs of the moving average values $P2\_c2$ and $P2\_c3$ are different from each other, when the predicted curvature $\rho2\_m1$ is calculated while reflecting the two moving average values $P2\_c2$ and $P2\_c3$, the avoidance margin for the interference object is reduced. Further, the same problem also occurs in a case where the predicted curvature $\rho2\_m2$ is calculated while reflecting the moving average value $P2\_c3$. Thus, it is necessary to calculate the predicted curvature $\rho2\_m1$ not to reflect the two moving average values $P2\_c2$ and $P2\_c3$ and to calculate the predicted curvature $\rho2\_m2$ not to reflect the moving average value $P2\_c3$.

For the above reason, the two gains $K2\_bp\_21$ and $K2\_bp\_31$ are set as described above, and the values $P2\_c2 \cdot K2\_sk1 \cdot K2\_bp\_21$ and $P2\_c3 \cdot K2\_sk1 \cdot K2\_bp\_31$ described above are input to the first extreme value search controller 210.

For the same reason, the gain $K2\_bp\_32$ is set as described above, and the value $P2\_c3 \cdot K2\_sk2 \cdot K2\_bp\_32$ is input to the second extreme value search controller 220. With the above configuration, a relationship among the signs of the three moving average values $P2\_c1$ to $P2\_c3$, the two values $P2\_c2 \cdot K2\_bp\_21$ and $P2\_c3 \cdot K2\_bp\_31$, and reflection states of the moving average values $P2\_c2$ and $P2\_c3$ with respect to the predicted curvature $\rho2\_m1$ includes 12 patterns C1 to C12 shown in FIG. 50. In this case, the relationship is as the pattern C1 (or C2), in a state of FIG. 48 described above, and is as any one of the patterns C9 to C12, in a state of FIG. 49 described above.

In addition, a relationship among the signs of the two moving average values $P2\_c2$ and $P2\_c3$, a value $P2\_c3 \cdot K2\_bp\_32$, and a reflection state of the moving average value $P2\_c3$ with respect to the predicted curvature $\rho2\_m2$ includes six patterns D1 to D6 shown in FIG. 51.

As described above, the trajectory determiner 200 of the present embodiment calculates the five predicted positions $Z2\_m11$, $Z2\_m12$, $Z2\_m13$, $Z2\_m2$, and $Z2\_m3$, and then inputs these values to a vehicle controller 40.

The vehicle controller 40 controls the motor 5 and the actuator 6 depending on the five predicted positions $Z2\_m11$, $Z2\_m12$, $Z2\_m13$, $Z2\_m2$, and $Z2\_m3$. As a result, the host vehicle 3 can travel while avoiding interference with the pedestrian M1 on the basis of the first to third predicted trajectories of the pedestrian M1.

As described above, according to the trajectory generation device 100 of the second embodiment, in each of the first to third predicted trajectories, risk potentials $R2\_\rho\_mi\_vj\_v\_r$, $R2\_p\_rbr\_mi\_r$, and $R2\_p\_rbl\_mi\_r$ representing the degree of interference with the interference object are calculated, and the first to third evaluation functions $J2\_1$ to $J2\_3$ are calculated to include the sum total of these risk potentials $R2\_\rho\_mi\_vj\_v\_r$, $R2\_p\_rbr\_mi\_r$, and $R2\_p\_rbl\_mi\_r$.

Then, the predicted curvatures $\rho2\_m1$ to $\rho2\_m3$ are calculated so that these first to third evaluation functions $J2\_1$ to $J2\_3$ have the minimum values, and on the basis of these predicted curvatures $\rho2\_m1$ to $\rho2\_m3$, the first to third predicted trajectories are determined. That is, the five predicted positions $Z2\_mi$ (i=11, 12, 13, 2, and 3) are determined so that the first to third evaluation functions $J2\_1$ to $J2\_3$ have the minimum values.

In this case, as described above, the first evaluation function $J2\_1$ is calculated as a sum total of a sum total of risk potentials representing the degree of interference between the pedestrian M1 and the interference object, and the product $\omega\_tr \cdot Tr\_r$ of the weighting factor and the trace potential, and the second and third evaluation functions $J2\_2$ and $J2\_3$ are calculated as sum totals of the risk potentials representing the degree of interference between the pedestrian M1 and the interference object. For that reason, by determining such first to third evaluation functions $J2\_1$ to $J2\_3$ to have minimum values, the first to third predicted trajectories are determined so that the degree of interference with the interference object decreases.

Further, in a case where the moving average value $P2\_c1$ in the first extreme value search controller 31 and the moving average value $P2\_c2$ in the second extreme value search controller 32 have the same sign, the predicted curvature $\rho2\_m1$ is determined while reflecting the moving average value $P2\_c2$ (see FIGS. 48 and 50).

In a case where the moving average value $P2\_c2$ in the second extreme value search controller 32 and the moving average value $P2\_c3$ in the third extreme value search controller 33 have the same sign, the predicted curvature $\rho2\_m2$ is determined while reflecting the moving average value $P2\_c3$ (see FIGS. 48 and 51).

In this case, the three moving average values $P2\_c1$ to $P2\_c3$ are calculated as amounts of correction for respectively correcting the three predicted curvatures $\rho2\_m1$ to $\rho2\_m3$, that is, amounts of correction for correcting the first to third predicted trajectories. Thus, in a case where signs of the amounts of correction for the first predicted trajectory and the second predicted trajectory are the same, the first predicted trajectory is further corrected in the same direction as a correction direction for the second predicted trajectory farther from the current position of the pedestrian M1.

Similarly, in a case where signs of the amounts of correction for the second predicted trajectory and the third predicted trajectory are the same, the second predicted trajectory is further corrected in the same direction as a correction direction for the third predicted trajectory farther from the current position of the pedestrian M1.

Here, in a case where the interference object exists in the traveling direction of the pedestrian M1, the predicted trajectory farther from the current position is a trajectory closer to the interference object than the predicted trajectory closer to the current position of the pedestrian M1. Thus, by generating the predicted trajectory farther from the interference object (that is, closer to the pedestrian M1) while reflecting the amount of correction for correcting the predicted trajectory closer to the interference object, it is possible to further increase an avoidance margin for avoiding interference with the interference object in the predicted trajectory farther from the interference object. As described above, since an avoidance action of the pedestrian M1 with respect to the interference object can be predicted more quickly, the future travel trajectory of the vehicle 3 can be appropriately determined so that the interference with the pedestrian M1 can be avoided also in the host vehicle 3 in which the feasible travel trajectory is limited when the travel trajectory of the host vehicle 3 is determined on the basis of a predicted action of the pedestrian M1.

On the other hand, in a case where the amounts of correction for the two adjacent predicted trajectories have different signs, the two predicted trajectories are corrected in directions different from each other to avoid the interference object. Thus, under such a condition, when the amount of correction for correcting the predicted trajectory farther from the current position of the pedestrian M1 is reflected in the predicted trajectory closer to the current position, the avoidance margin for the interference object is reduced in the predicted trajectory closer to the current position. As a result, a change in the avoidance action of the pedestrian M1 with respect to the interference object is predicted to be small, and in the host vehicle 3 in which the feasible travel trajectory is limited when the travel trajectory of the host vehicle 3 is determined on the basis of the predicted action of the pedestrian M1, it becomes difficult to secure a sufficient margin by which the interference with the pedestrian M1 can be avoided, and the future travel trajectory of the host vehicle 3 cannot be appropriately determined.

On the other hand, in the case of the present embodiment, in a case where the moving average value $P2\_c1$ and the moving average value $P2\_c2$ have different signs, the predicted curvature $\rho2\_m1$ is determined without reflecting the moving average value $P2\_c2$ (see FIGS. 49 and 50). Similarly, in a case where the moving average value $P2\_c2$ and the moving average value $P2\_c3$ have different signs, the predicted curvature $\rho2\_m2$ is determined without reflecting the moving average value $P2\_c3$ (see FIGS. 49 and 51). As a result, it is possible to appropriately secure the avoidance margin for the interference object in the predicted trajectory closer to the current position.

In addition, the first predicted trajectory is determined as a combination of three predicted trajectories shorter than the second predicted trajectory and the third predicted trajectory. As a result, also in the first predicted trajectory having a shorter distance to the pedestrian M1 as compared with the second predicted trajectory and the third predicted trajectory, it is possible to appropriately secure the avoidance margin for avoiding interference with the interference object.

Further, the first evaluation function $J2\_1$ is calculated as including the product $\omega\_tr \cdot Tr\_r$ of the weighting factor and the trace potential in addition to the sum total of the risk potentials as shown in the formula (199) described above. The trace potential $Tr\_r$ is calculated as the value corresponding to the sum of squares error between the two estimated positions $Z2\_m1h1\_r$ and $Z2\_m1h2\_r$ and the two actual measurement positions $Z2\_h1$ and $Z2\_h2$.

Thus, by determining the first predicted trajectory so that the first evaluation function $J2\_1$ has the minimum value, the first predicted trajectory can be determined so that the differences between the two estimated positions $Z2\_m1h1\_r$ and $Z2\_m1h2\_r$ and the two actual measurement positions $Z2\_h1$ and $Z2\_h2$ are reduced. As a result, the first predicted trajectory can be determined while considering the followability to a past trajectory of the pedestrian M1.

Note that the second embodiment is an example in which the host vehicle 3 is the first mobile body, but instead of this, a two-wheeled vehicle, a robot, an aircraft, a ship, or the like may be the first mobile body.

In addition, the second embodiment is an example in which the trajectory generation device 100 of the present invention is mounted on the four-wheeled vehicle 3 capable of automatic driving, but instead of this, the trajectory generation device may be mounted on a mobile body (for example, a two-wheeled vehicle, a robot, an aircraft, a ship, or the like) other than the four-wheeled vehicle, or the trajectory generation device may be used alone.

In addition, the second embodiment is an example in which the pedestrian M1 is the second mobile body, but instead of this, a two-wheeled vehicle, a robot, an aircraft, a ship, or the like may be the second mobile body.

In addition, the second embodiment is an example in which the traffic participant is the interference object, but instead of this, a two-wheeled vehicle, a robot, an aircraft, a ship, or the like may be the interference object.

REFERENCE SIGNS LIST 1 trajectory generation device
ECU 2 (surrounding situation recognizer, predicted trajectory generator, interference degree parameter calculator, correction amount determiner, calculation processing device)
3 host vehicle (mobile body, first mobile body)
4 information detection device (surrounding situation recognizer)
21 first evaluation function calculator (interference degree parameter calculator)
22 second evaluation function calculator (interference degree parameter calculator)
23 third evaluation function calculator (interference degree parameter calculator)
30 trajectory determiner (predicted trajectory generator, correction amount determiner)
TP1 traffic participant (interference object)
$R\_\rho\_mi\_vj\_v\_r$ risk potential (interference degree parameter)
$R\_p\_rbr\_mi\_r$ right side track boundary risk potential (interference degree parameter)
$R\_p\_rbl\_mi\_r$ left side track boundary risk potential (interference degree parameter)
$P\_c1$ moving average value (amount of correction)
$P\_c2$ moving average value (amount of correction)
$P\_c3$ moving average value (amount of correction)
100 trajectory generation device
121 first evaluation function calculator (interference degree parameter calculator)
122 second evaluation function calculator (interference degree parameter calculator)
123 third evaluation function calculator (interference degree parameter calculator)

200 trajectory determiner (predicted trajectory generator, correction amount determiner)
R2_p_mi_vj_v_r risk potential (interference degree parameter)
R2_p_rbr_mi_r right side track boundary risk potential (interference degree parameter)
R2_p_rbl_mi_r left side track boundary risk potential (interference degree parameter)
P2_c1 moving average value (amount of correction)
P2_c2 moving average value (amount of correction)
P2_c3 moving average value (amount of correction)
M1 pedestrian (mobile body, second mobile body)
TP4 traffic participant (interference object)

What is claimed is:

1. A trajectory generation device that generates one future trajectory of a mobile body, the trajectory generation device comprising at least one processor and a memory comprising instructions, that when executed by the at least one processor, cause the at least one processor to implement:
   a surrounding situation recognizer that recognizes a surrounding situation of the mobile body;
   a predicted trajectory generator that generates a plurality of predicted trajectories by dividing the one future trajectory of the mobile body into a plurality of trajectories as the plurality of predicted trajectories, by using a plurality of trajectory models that models a trajectory of the mobile body, on a basis of a result of recognition of the surrounding situation by the surrounding situation recognizer;
   an interference degree parameter calculator that calculates a plurality of interference degree parameters representing a degree of interference of an interference object around the mobile body with the mobile body by using the plurality of predicted trajectories;
   a correction amount determiner that determines a plurality of amounts of correction for respectively correcting the plurality of predicted trajectories to cause the degree of interference represented by the plurality of interference degree parameters to be decreased; and
   a controller that controls the mobile body to travel along the plurality of predicted trajectories, wherein
   the predicted trajectory generator generates the plurality of predicted trajectories by using the plurality of trajectory models and the plurality of amounts of correction on the basis of the result of recognition of the surrounding situation, and in a case where two of the amounts of correction for correcting two of the predicted trajectories adjacent to each other are determined to correct the two predicted trajectories in an identical direction, the predicted trajectory generator generates one of the predicted trajectories closer to a current position of the mobile body out of the two predicted trajectories while reflecting one of the amounts of correction for correcting one of the predicted trajectories farther from the current position of the mobile body.

2. The trajectory generation device according to claim 1, wherein
   in a case where the two of the amounts of correction are determined to correct the two predicted trajectories in directions different from each other, the predicted trajectory generator generates one of the predicted trajectories closer to the current position of the mobile body independently of one of the amounts of correction for correcting one of the predicted trajectories farther from the current position of the mobile body.

3. The trajectory generation device according to claim 2, wherein
   the one of the predicted trajectories closer to the current position of the mobile body is generated in a state of being divided into a plurality of predicted trajectories shorter than the one of the predicted trajectories farther from the current position of the mobile body.

4. The trajectory generation device according to claim 3, wherein
   the mobile body includes the surrounding situation recognizer, the predicted trajectory generator, the interference degree parameter calculator, and the correction amount determiner.

5. The trajectory generation device according to claim 3, wherein
   the mobile body is a second mobile body other than a first mobile body including the surrounding situation recognizer, the predicted trajectory generator, the interference degree parameter calculator, and the correction amount determiner, and
   the predicted trajectory generator generates the plurality of predicted trajectories by using a past position of the second mobile body, the plurality of trajectory models, and the plurality of amounts of correction.

6. The trajectory generation device according to claim 5, wherein
   the predicted trajectory generator generates one of the predicted trajectories closer to the current position of the mobile body to cause a difference to be reduced between a time series of the past position of the mobile body and a time series of a plurality of estimated positions on a trajectory when the one of the predicted trajectories closer to the current position of the mobile body is extended to a past position side of the mobile body along the one of the predicted trajectories.

7. The trajectory generation device according to claim 2, wherein
   the mobile body includes the surrounding situation recognizer, the predicted trajectory generator, the interference degree parameter calculator, and the correction amount determiner.

8. The trajectory generation device according to claim 2, wherein
   the mobile body is a second mobile body other than a first mobile body including the surrounding situation recognizer, the predicted trajectory generator, the interference degree parameter calculator, and the correction amount determiner, and
   the predicted trajectory generator generates the plurality of predicted trajectories by using a past position of the second mobile body, the plurality of trajectory models, and the plurality of amounts of correction.

9. The trajectory generation device according to claim 8, wherein
   the predicted trajectory generator generates one of the predicted trajectories closer to the current position of the mobile body to cause a difference to be reduced between a time series of the past position of the mobile body and a time series of a plurality of estimated positions on a trajectory when the one of the predicted trajectories closer to the current position of the mobile body is extended to a past position side of the mobile body along the one of the predicted trajectories.

10. The trajectory generation device according to claim 1, wherein
   one of the predicted trajectories closer to the current position of the mobile body is generated in a state of being divided into a plurality of predicted trajectories shorter than one of the predicted trajectories farther from the current position of the mobile body.

11. The trajectory generation device according to claim 10, wherein
the mobile body includes the surrounding situation recognizer, the predicted trajectory generator, the interference degree parameter calculator, and the correction amount determiner.

12. The trajectory generation device according to claim 10, wherein
the mobile body is a second mobile body other than a first mobile body including the surrounding situation recognizer, the predicted trajectory generator, the interference degree parameter calculator, and the correction amount determiner, and
the predicted trajectory generator generates the plurality of predicted trajectories by using a past position of the second mobile body, the plurality of trajectory models, and the plurality of amounts of correction.

13. The trajectory generation device according to claim 12, wherein
the predicted trajectory generator generates one of the predicted trajectories closer to the current position of the mobile body to cause a difference to be reduced between a time series of the past position of the mobile body and a time series of a plurality of estimated positions on a trajectory when the one of the predicted trajectories closer to the current position of the mobile body is extended to a past position side of the mobile body along the one of the predicted trajectories.

14. The trajectory generation device according to claim 1, wherein
the mobile body includes the surrounding situation recognizer, the predicted trajectory generator, the interference degree parameter calculator, and the correction amount determiner.

15. The trajectory generation device according to claim 1, wherein
the mobile body is a second mobile body other than a first mobile body including the surrounding situation recognizer, the predicted trajectory generator, the interference degree parameter calculator, and the correction amount determiner, and
the predicted trajectory generator generates the plurality of predicted trajectories by using a past position of the second mobile body, the plurality of trajectory models, and the plurality of amounts of correction.

16. The trajectory generation device according to claim 15, wherein
the predicted trajectory generator generates one of the predicted trajectories closer to the current position of the mobile body to cause a difference to be reduced between a time series of the past position of the mobile body and a time series of a plurality of estimated positions on a trajectory when the one of the predicted trajectories closer to the current position of the mobile body is extended to a past position side of the mobile body along the one of the predicted trajectories.

17. The trajectory generation device according to claim 1, wherein
the predicted trajectory generator generates the plurality of predicted trajectories by dividing the one future trajectory of the mobile body into a plurality of consecutive trajectories.

18. A trajectory generation method for generating one future trajectory of a mobile body by a calculation processing device, the trajectory generation method comprising:
a surrounding situation recognition step of recognizing a surrounding situation of the mobile body;
a predicted trajectory generation step of generating a plurality of predicted trajectories by dividing the one future trajectory of the mobile body into a plurality of trajectories as the plurality of predicted trajectories, by using a plurality of trajectory models that models a trajectory of the mobile body, on a basis of a result of recognition of the surrounding situation by the surrounding situation recognition step;
an interference degree parameter calculation step of calculating a plurality of interference degree parameters representing a degree of interference of an interference object around the mobile body with the mobile body by using the plurality of predicted trajectories;
a correction amount determination step of determining a plurality of amounts of correction for respectively correcting the plurality of predicted trajectories to cause the degree of interference represented by the plurality of interference degree parameters to be decreased; and
a controlling step of controlling the mobile body to travel along the plurality of predicted trajectories,
executed by the calculation processing device, wherein
in the predicted trajectory generation step, the plurality of predicted trajectories is generated by using the plurality of trajectory models and the plurality of amounts of correction on the basis of the result of recognition of the surrounding situation, and in a case where two of the amounts of correction for correcting two of the predicted trajectories adjacent to each other are determined to correct the two predicted trajectories in an identical direction, one of the predicted trajectories closer to a current position of the mobile body out of the two predicted trajectories is generated while reflecting one of the amounts of correction for correcting one of the predicted trajectories farther from the current position of the mobile body.

* * * * *